US012348087B2

(12) United States Patent
Rossi

(10) Patent No.: US 12,348,087 B2
(45) Date of Patent: Jul. 1, 2025

(54) ROTOR FOR AXIAL FLUX MOTOR AND METHOD OF MANUFACTURE

(71) Applicant: Magelec Propulsion LTD., Shanghai (CN)

(72) Inventor: Nerio Rossi, Shanghai (CN)

(73) Assignee: Omni Powertrain Technologies, LLC, Houston, TX (US)

( * ) Notice: Subject to any disclaimer, the term of this patent is extended or adjusted under 35 U.S.C. 154(b) by 313 days.

(21) Appl. No.: 17/667,421

(22) Filed: Feb. 8, 2022

(65) Prior Publication Data
US 2022/0255379 A1 Aug. 11, 2022

Related U.S. Application Data

(60) Provisional application No. 63/147,090, filed on Feb. 8, 2021.

(51) Int. Cl.
*H02K 1/27* (2022.01)
*H02K 1/2793* (2022.01)
*H02K 15/03* (2006.01)
*H02K 15/12* (2006.01)
*H02K 21/24* (2006.01)

(52) U.S. Cl.
CPC ........... *H02K 1/2793* (2013.01); *H02K 15/03* (2013.01); *H02K 15/12* (2013.01); *H02K 21/24* (2013.01)

(58) Field of Classification Search
CPC .. H02K 1/2793; H02K 1/2795; H02K 1/2796; H02K 15/03; H02K 15/12; H02K 21/24; H02K 1/28; H02K 1/30; H02K 1/32; H02K 9/16
See application file for complete search history.

(56) References Cited

U.S. PATENT DOCUMENTS 4,257,835 A * 3/1981 Bompard .............. F16D 69/023
428/218
5,329,828 A 7/1994 Hurth
5,962,942 A * 10/1999 Pullen .................. H02K 1/2795
310/156.37
(Continued)

FOREIGN PATENT DOCUMENTS

CN 212258580 U 12/2020
DE 102008023999 A1 * 11/2009 ............. H02K 1/276
(Continued)

OTHER PUBLICATIONS

EP3136565 Machine Translation (Year: 2017).*
(Continued)

*Primary Examiner* — Tran N Nguyen
*Assistant Examiner* — Masoud Vaziri
(74) *Attorney, Agent, or Firm* — Haynes and Boone, LLP; Mark A. Tidwell

(57) ABSTRACT

A rotor for an axial flux motor and a method of manufacture includes a rotor core having a rotor hub with a plurality of spaced apart fingers radially extending from the rotor hub and forming a magnet pocket between adjacent fingers and into which a magnet is inserted, where the rotor core is formed of a plurality of layers of material arranged into a layer stack, with each layer having a set of primary fibers extending in a select direction that is a different direction from the set of primary fiber layers of an adjacent layer in the layer stack.

15 Claims, 34 Drawing Sheets

(56) References Cited

U.S. PATENT DOCUMENTS

| | | | |
|---|---|---|---|
| 6,922,004 B2 | 7/2005 | Hashimoto et al. | |
| 7,714,479 B2 | 5/2010 | Seneff et al. | |
| 10,862,353 B2 * | 12/2020 | Hattori | H02K 1/02 |
| 10,951,089 B2 | 3/2021 | Hu et al. | |
| 11,075,555 B2 | 7/2021 | Sasaki et al. | |
| 11,128,186 B2 | 9/2021 | Ravaud | |
| 11,177,726 B2 | 11/2021 | Schuler et al. | |
| 11,552,516 B2 | 1/2023 | Kim | |
| 2002/0074895 A1 | 6/2002 | Klode | |
| 2002/0189397 A1 | 12/2002 | Sakamoto et al. | |
| 2007/0096581 A1 | 5/2007 | Zepp et al. | |
| 2009/0072639 A1 * | 3/2009 | Seneff | H02K 15/03 |
| | | | 310/156.31 |
| 2010/0018788 A1 | 1/2010 | Katsuta et al. | |
| 2011/0243770 A1 | 10/2011 | Müller | |
| 2014/0062246 A1 | 3/2014 | Langford et al. | |
| 2014/0256493 A1 | 9/2014 | Knoblauch | |
| 2015/0180296 A1 | 6/2015 | Ravaud et al. | |
| 2017/0366050 A1 | 12/2017 | Hattori et al. | |
| 2018/0191215 A1 | 7/2018 | Long | |
| 2018/0323689 A1 * | 11/2018 | Schuler | H02K 1/2798 |
| 2019/0044401 A1 | 2/2019 | Sasaki et al. | |
| 2019/0234405 A1 * | 8/2019 | Homma | F04C 2/102 |
| 2019/0280575 A1 | 9/2019 | Inomoto et al. | |
| 2020/0028393 A1 | 1/2020 | Ravaud | |

FOREIGN PATENT DOCUMENTS

| | | | | |
|---|---|---|---|---|
| DE | 102015114041 A1 | | 3/2017 | |
| EP | 3091640 A1 | * | 11/2016 | |
| EP | 3136565 A1 | * | 3/2017 | B29C 70/48 |
| FR | 3027468 A1 | | 4/2016 | |
| GB | 2456067 A | * | 7/2009 | H02K 1/2793 |
| JP | S60 234445 A | | 11/1985 | |
| JP | 2001268830 A | | 9/2001 | |
| JP | 2005012891 A | * | 1/2005 | |
| JP | 2006304474 A | | 11/2006 | |
| JP | 2010158168 A | | 7/2010 | |
| JP | 2011509064 A | | 3/2011 | |
| JP | 5120538 B2 | | 1/2013 | |
| JP | 5439508 U | | 3/2014 | |
| KR | 101659238 B1 | | 9/2016 | |

OTHER PUBLICATIONS

JP 2005012891 A Machine Translation (Year: 2005).*
GB-2456067-A—Machine Translation (Year: 2009).*
EP-3091640-A1—Machine Translation (Year: 2016).*
DE-102008023999-A1—Machine Translation (Year: 2009).*
Search Report issued for International Patent Application No. PCT/US2022/051738, dated Mar. 1, 2023, ISA/US, 13 pages.
Search Report and Written Opinion issued for International Patent Application No. PCT/US2022/015694, dated Jul. 14, 2022, 12 pages, ISR/US.
Office Action issued for Japanese Patent Application No. 2023-573011, dated Jul. 31, 2024, 7 pages (with translation).
Supplementary Partial Search Report issued for European Patent Application No. 22750593, dated Nov. 11, 2024, 15 pages.

* cited by examiner

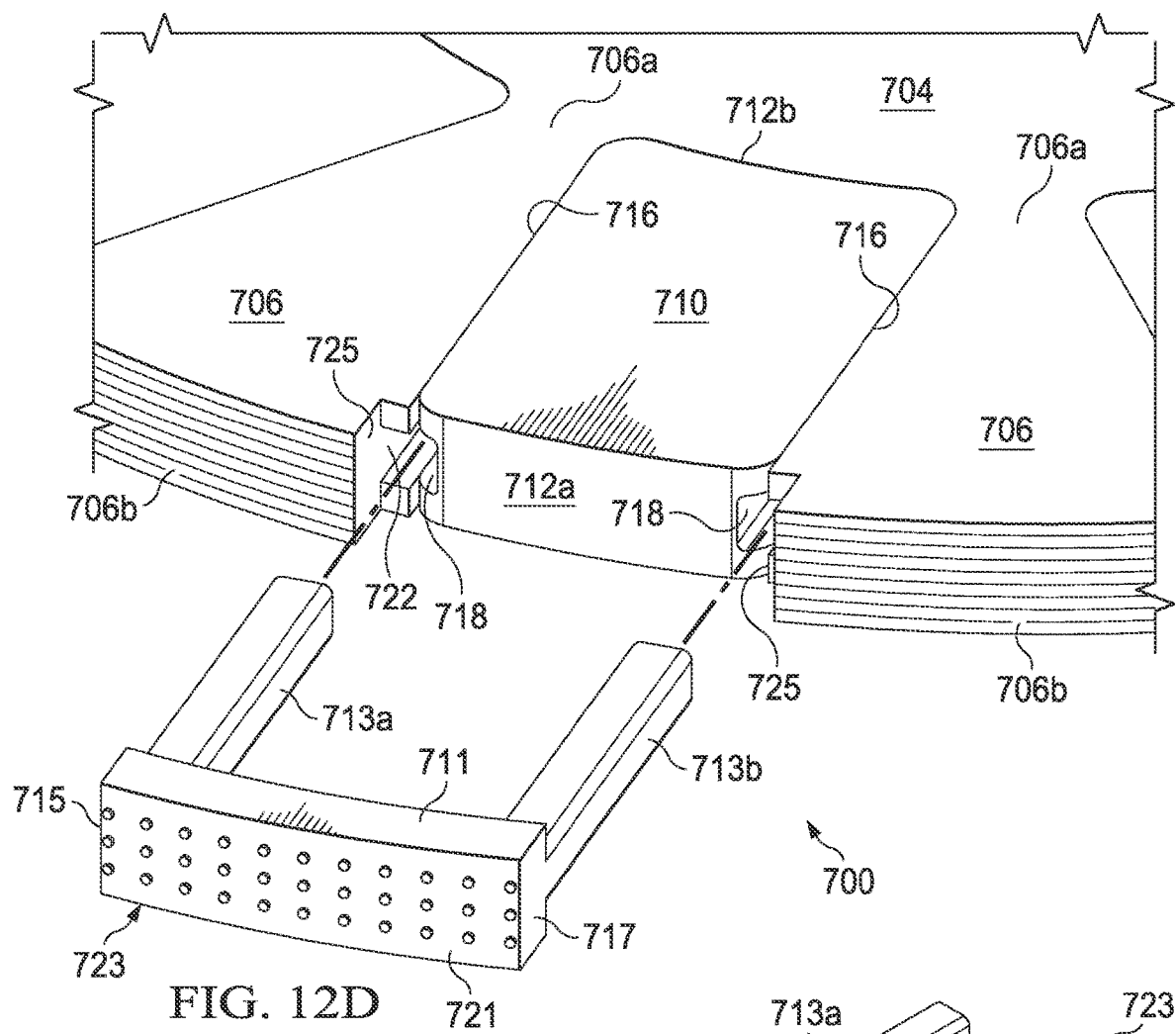
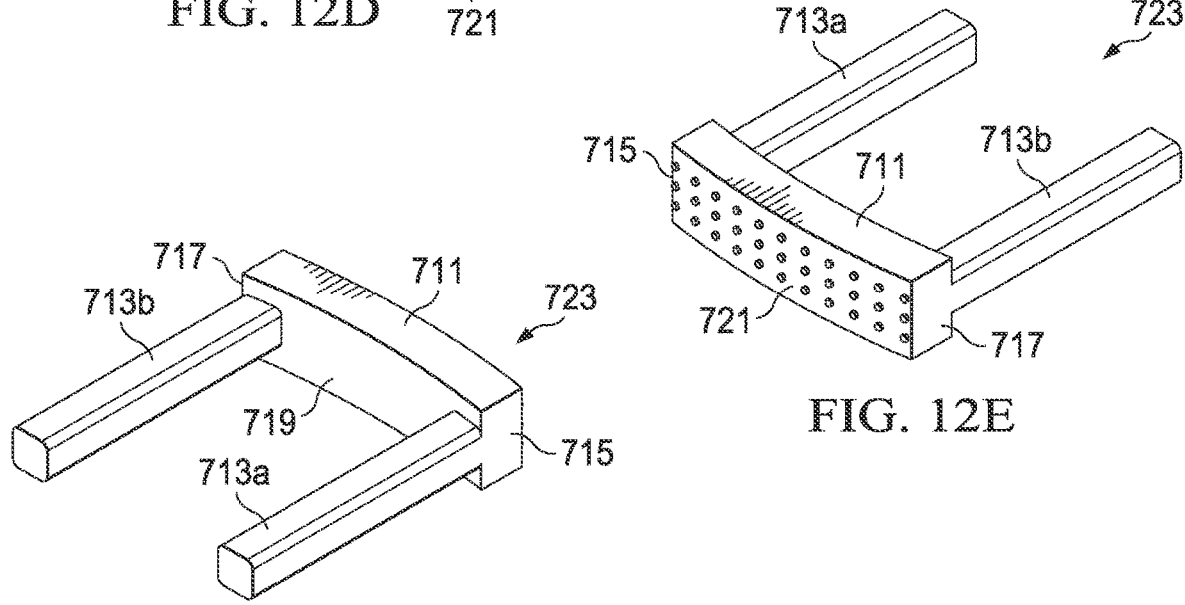

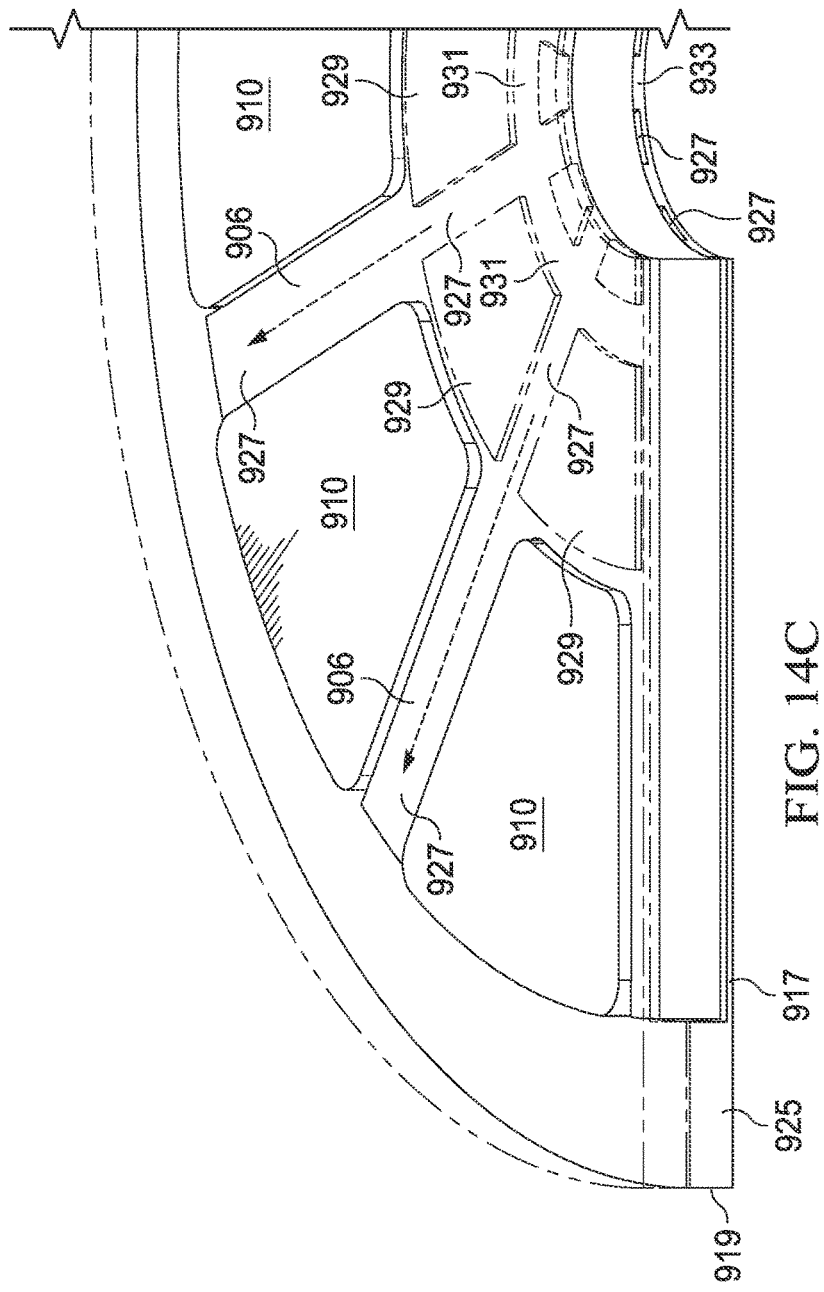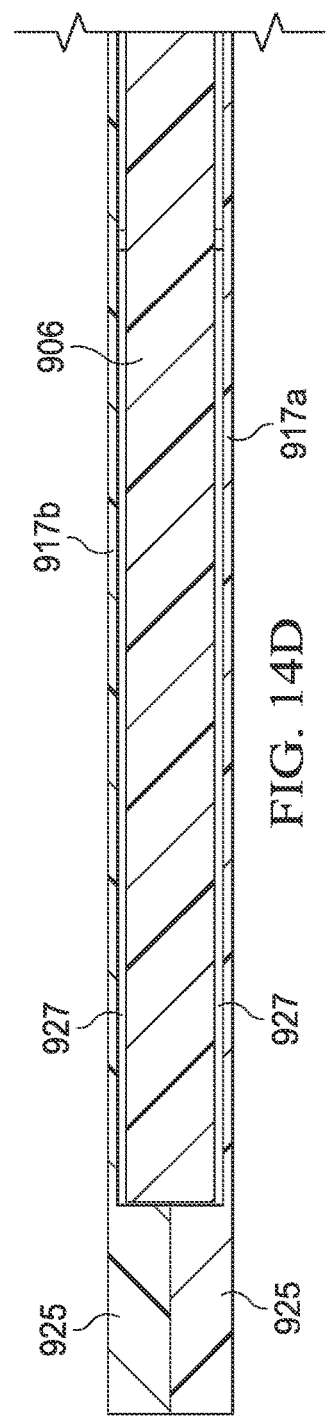

ROTOR FOR AXIAL FLUX MOTOR AND METHOD OF MANUFACTURE

CROSS-REFERENCE TO RELATED APPLICATIONS

This application claims priority to U.S. Provisional Application No. 63/147,090, filed on Feb. 8, 2021, the benefit of which is claimed and the disclosure of which is incorporated herein by reference in its entirety.

BACKGROUND OF THE INVENTION

Field of the Disclosure

The present invention relates in general to electric motors, and particularly to axial flux motors wherein a rotor and a stator are coaxially arranged. More specifically, the present invention relates to a rotor used in such axial flux motor and a method of producing the rotor.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

FIG. 12D is a partial assemble perspective view of another embodiment of the rotor assembly of FIG. 11C but with alternative connector assemblies.

FIGS. 12E and 12F are perspective views of a connector assembly utilized in the rotor assembly of FIG. 12D.

FIG. 14C is a partial cut-away assembly view of the rotor assembly of FIG. 14A illustrating cooling channels.

FIG. 14D is a cut-away plan view of a rotor finger of the rotor assembly of FIG. 14A.

DETAILED DESCRIPTION OF THE EMBODIMENTS

Disclosed herein is a rotor assembly for an axial flux motor where the rotor core is formed of plurality of fiber layers stacked and bonded together. Each layer of the stack is oriented so that the primary fibers of the layer extend in a select direction and wherein the sets of primary fibers of adjacent fiber layers extend in different directions. Each layer is cut so as to have the shape of a rotor hub with a plurality of radially extending, spaced apart fingers so that the stacked and bonded layers form magnet pockets between adjacent fingers. A magnet is positioned in each magnet pocket of the rotor core. In one or more embodiments, the fingers of the rotor core may be triangular or wedge shaped, thereby creating rectangular magnet pockets for receipt of rectangular magnets. A radial spacer may be inserted in the magnet pocket radially outward from the magnet to reduce stress on the magnet, especially stress that might be created by a radial retaining ring. Likewise, to reduce magnet stresses, each magnet may be grooved along at least its side edges where hardened resin or offset connectors in the form of pins or blades may be utilized to center the magnet in the pocket so as to be spaced apart from the fingers. In some embodiments, radial spacers and offset connectors may be integrally formed. In one or more embodiments, the magnet pockets may be trapezoidal in shape tapering outward so that the fingers radially retain like-shaped magnets in the magnet pockets. In one or more embodiments, air flow channels may be formed along fingers and between magnets to enhance cooling. In one or more embodiments, a retainer cover may be disposed on either side of the rotor core to axially secure magnets in the pockets. In this regard, one or both covers may further include an outer radial lip that also secures magnets radially. The retaining cover may include integrally formed magnet seats and/or air flow channels.

Figure 1:
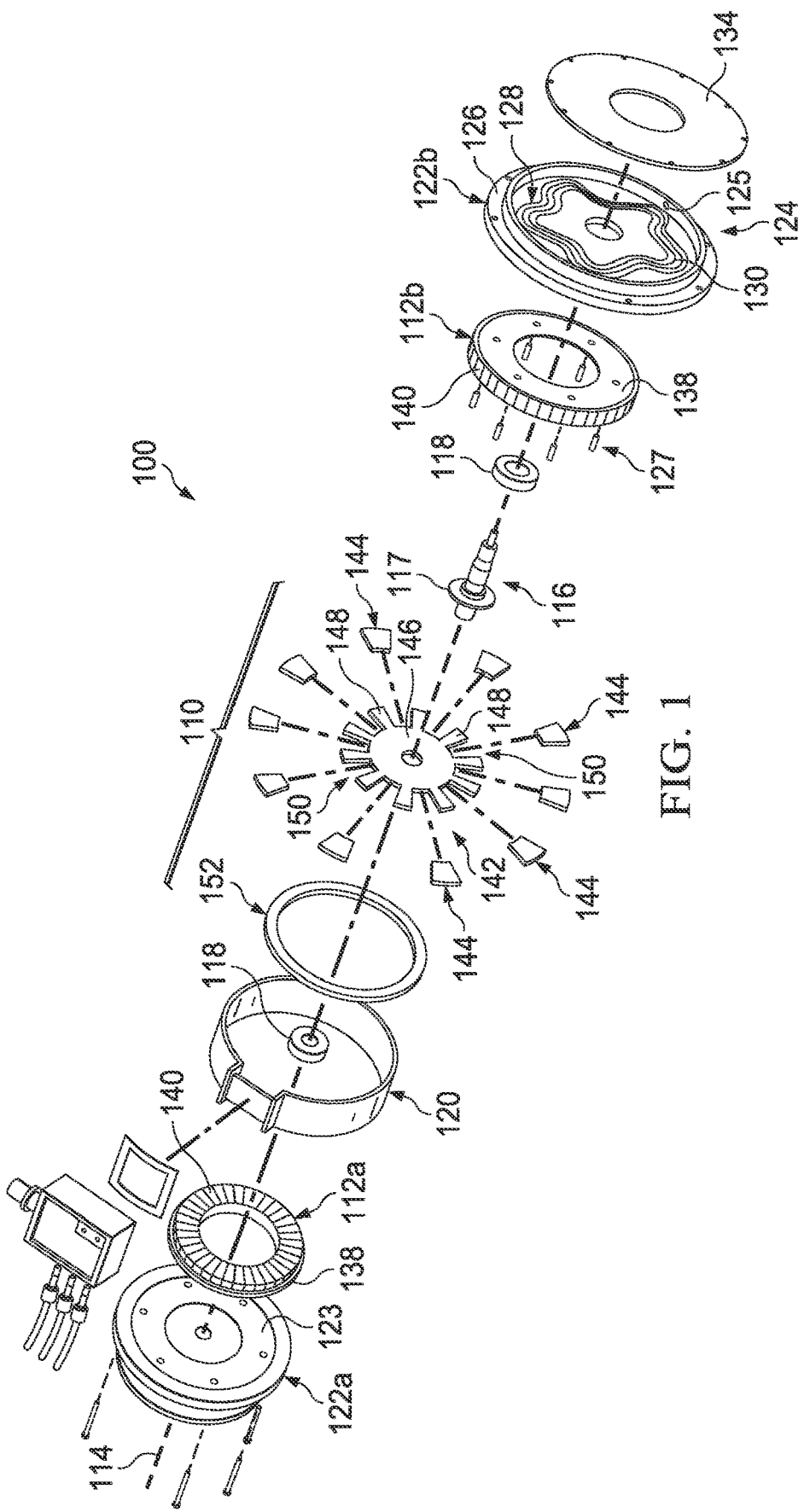
FIG. 1 is an exploded perspective view of an axial flux motor of the disclosure.

Referring to FIG. 1, there is shown an axial flux type electric motor assembly 100. Electric motor assembly 100 includes at least one rotor assembly 110 and at least one stator assembly 112 disposed axially from one another along a motor axis 114. In the illustrated embodiment, a rotor spindle or shaft 116 extends along axis 114 and supports rotor assembly 110. Rotor shaft 116 may include a spindle flange 117 that attaches to rotor assembly 110. Rotor shaft 116 may in turn be supported by one or more bearings 118.

Although only a single stator assembly 112 may be utilized, in the illustrated embodiment, two stator assemblies 112a, 112b are shown and positioned on opposing sides of rotor assembly 110 along axis 114.

A motor housing 120 and opposing stator support or end plates 122 enclose rotor assembly 110 and the one or more stator assemblies 112. In one or more embodiments, at least one end plate 122 supports a stator assembly 112 on an interior surface 123 of the end plate 122. In the illustrated embodiment, end plate 122a supports stator assembly 112a and end plate 122b supports stator assembly 112b.

To the extent an end plate 122 supports a stator assembly 112, the end plate 122 may include cooling a cooling mechanism 124 positioned along the exterior surface 126 of the end plate 122.

In one or more embodiments, cooling mechanism 124 may form one or more coolant flow paths 128 along the exterior surface 126 of end plate 122. Coolant flow path 128 may be one or more cooling channels 130 formed in the exterior surface 126 of end plate 122.

In the illustrated embodiment, a plurality of fluidically connected cooling channels 130 are illustrated and are generally positioned to extend around the end plate 122 opposite the stator assembly 112 mounted on the interior surface 123 of end plate 122. Although not limited to a particular configuration, in one embodiment, cooling channels 130 may form star shape along the exterior surface 126 to maximize cooling while allowing fasteners 127 to secure various motor components to end plate 122 from the interior surface 123 without extending through end plate 122 to the exterior surface 126 of end plate 122. In other words, threaded bores for engagement by fasteners 127 may be formed on the interior surface 123 of end plate 122, but the bores do not extend all the way through end plate 122. It will be appreciated that such an arrangement minimizes the likelihood that fluid within the interior of motor assembly 100 could leak or migrate out or that vice-versa. In other embodiments, coolant flow path 128 may be formed of tubing (not shown) positioned on the exterior surface 126. In yet other embodiments, coolant flow path 128 may be formed of ribs or fins (now shown) extending from exterior surface 128, while in other embodiments, coolant flow path 128 may simply be a coolant chamber formed between end plate 122 and an outer plate 134. Notwithstanding the foregoing, it will be appreciated that cooling channels 130 formed in the exterior surface 126 of end plate 122 may be particularly desirable to minimize the overall axial length of electric motor assembly 100. In any event, one or more ports 125 in fluid communication with flow path 128 may be utilized to introduce and extracted coolant from the from cooling mechanism 124.

Each stator assembly 112 is generally formed of a stator core 138 and stator windings 140 as may be known to persons of skill in the art. In this regard, stator windings 140 may be formed of electric wire. The disclosure is not limited to a particular configuration for stator assembly 112.

Figure 2A:
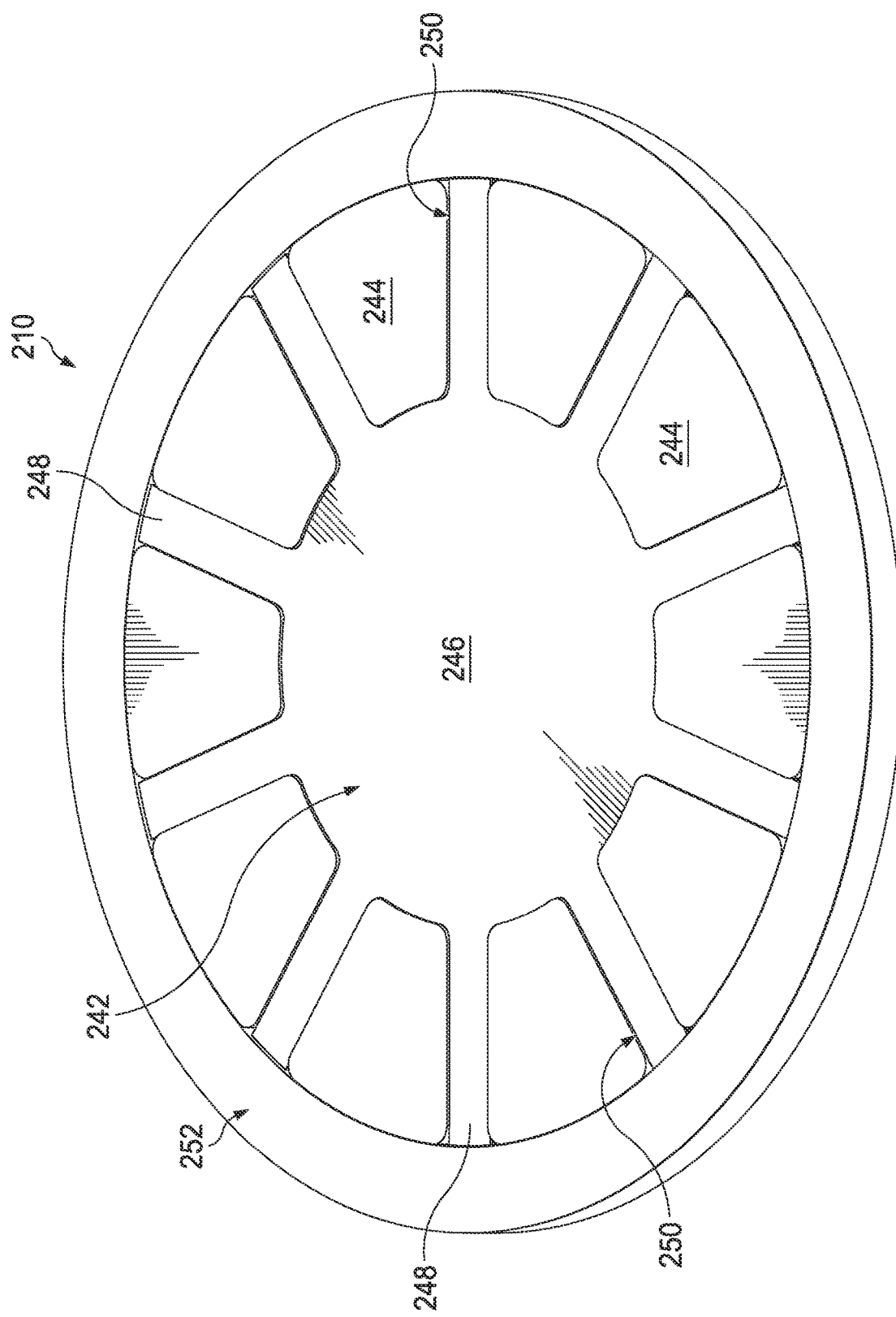
FIG. 2A is a perspective view of one embodiment of a rotor assembly.
Figure 2B:
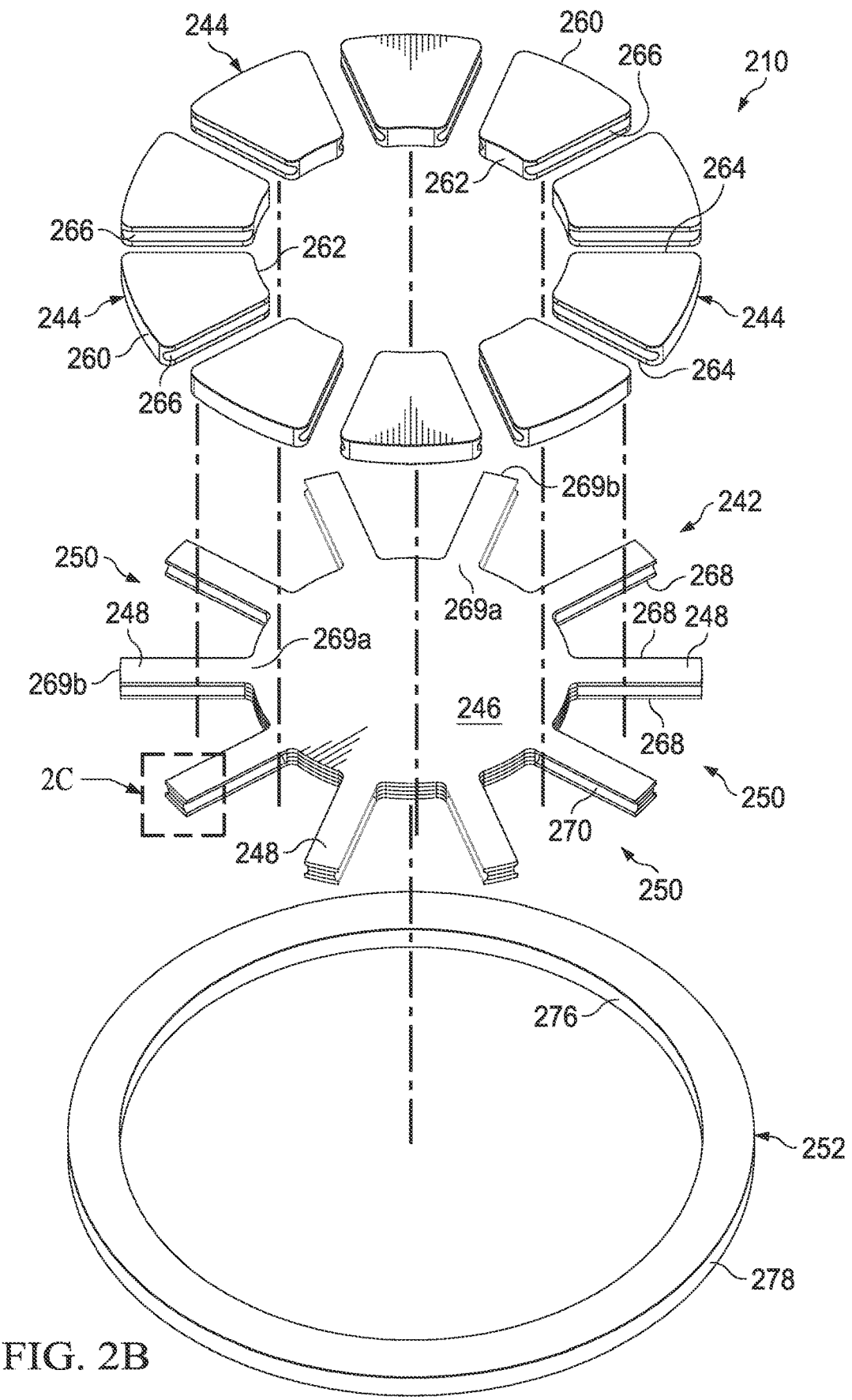
FIG. 2B is an exploded perspective view of the rotor assembly of FIG. 2A.

With reference to FIGS. 2A and 2B and ongoing reference to FIG. 1, rotor assembly 110 is generally formed of a rotor core or yoke 142 disposed to carry a plurality of magnets 144. In one or more embodiments, rotor core 142 is spider shaped and formed of a hub 146 from which fingers 148 radially extend. Fingers 148 are spaced apart from one another around the perimeter of hub 146 so as to form magnet pockets 150 between adjacent fingers 148. In one or more embodiments, rotor assembly 110 further includes a rotor ring 152 disposed radially outward from fingers 148. In one or more embodiments, rotor ring 152 and rotor core 142 may be separate components, such as is shown in FIGS. 1, 2A and 2B, while in other embodiments, rotor ring 152 and rotor core 142 may be integrally formed.

In one or more embodiments, rotor core 142 is formed of a non-conducting composite material. Similarly, in one or more embodiments, rotor ring 152 is formed of a non-conducting composite material.

Turning to FIGS. 2A-2B, embodiments of a rotor assembly 110 are shown and generally described as rotor assembly 210. Rotor assembly 210 generally includes a rotor core or yoke 242 disposed to carry a plurality of magnets 244. In one or more embodiments, rotor core 242 is spider shaped and formed of a hub 246 from which fingers 248 radially extend. Fingers 248 are spaced apart from one another around the perimeter of hub 246 so as to form magnet pockets 250 between adjacent fingers 248. Rotor assembly further includes a rotor ring 252 disposed radially outward from fingers 248. Although not limited to a particular number of fingers 248 and pockets 250, in the illustrated embodiment, rotor core 242 includes ten fingers 248 and ten magnet pockets 250.

In the illustrated embodiment of rotor assembly 210, fingers 248 are generally rectangular in shape so that magnet pockets 250 are generally wedge shaped.

As such, in this illustrated embodiment, magnets 244 are generally wedge shaped, where each magnet 244 has a radially outer edge 260 of a greater length than a radially inner edge 262 which edges 260, 262 are joined by side edges 264. In one or more embodiments, as best seen in FIG. 2B, at least one and preferably each side edge 264 of a magnet 244 includes a groove or slot 266 extending along at least a portion of the length of side edge 264 between radially outer edge 260 and radially inner edge 262. In one or more embodiments, each groove 266 fully extends between radially outer edge 260 and radially inner edge 262, while in other embodiments groove 266 extends from radially outer edge 260 and is spaced apart from radially inner edge 262. In yet other embodiments, groove 266 is spaced apart from radially outer edge 260 and extends from radially inner edge 262. Finally in other embodiments, groove 266 is formed along side edge 264 to be spaced apart from both radially outer edge 260 and radially inner edge 262.

Similarly, each finger 248 of hub 246 has a side edge 268 that extends from a proximal end 269a adjacent the hub 246 to a distal end 269b at the periphery of the rotor core 242. In one or more embodiments, the side edges 268 of each finger may be generally smooth without any feature formed therealong. In one or more other embodiments, each side edge 268 of a finger 248 includes a groove or slot 270 extending along at least a portion of the length of side edge 268 between the proximal end 269a and the distal end 269b of finger 248.

In one or more embodiments, each groove 270 fully extends between the proximal end 269a and the distal end 269b of finger 248, while in other embodiments groove 270 extends from distal end 269b and is spaced apart from proximal end 269a. In yet other embodiments, groove 270 is spaced apart from distal end 269b and extends from proximal end 269a. Finally in other embodiments, groove 270 is formed along side edge 268 to be spaced apart from both the distal end 269b and the proximal end 269a of finger 248.

In one or more embodiments, rotor ring 252 is a preformed ring that is positioned around rotor core 242. In some embodiments, rotor ring 252 is a continuous, solid ring. In this regard, rotor ring 252 may be formed of a composite material, such as a fiber material. Rotor ring 252 has a radially inner edge 276 and a radially outer edge 278, where radially inner edge 276 may abut fingers 248 when positioned around rotor core 242. In one or more embodiments, the radially inner edge 276 of solid, pre-formed rotor ring 252 is formed As will be appreciated, each of the carbon fiber material and glass fiber material may be formed of a substrate on which the fibers are carried.

Figure 2C:
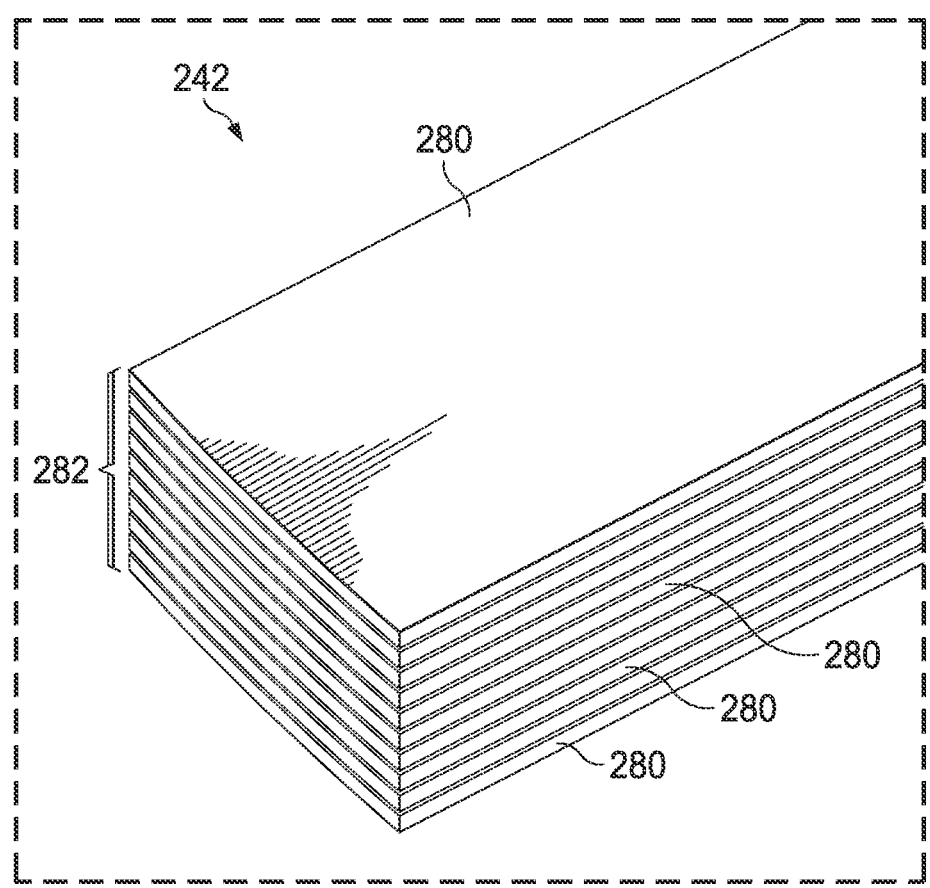
FIG. 2C is an enlarge perspective view of a portion of the rotor core illustrating the layered construction of the rotor core.

Turning to FIG. 2C, in one or more embodiments, rotor core or yoke 242 may be formed of a multiplicity of layers 280 of fiber material arranged in a stack 282 or "book" as shown. Each fiber layer 280 may be a material having a set of primary fibers.

Figure 3A:
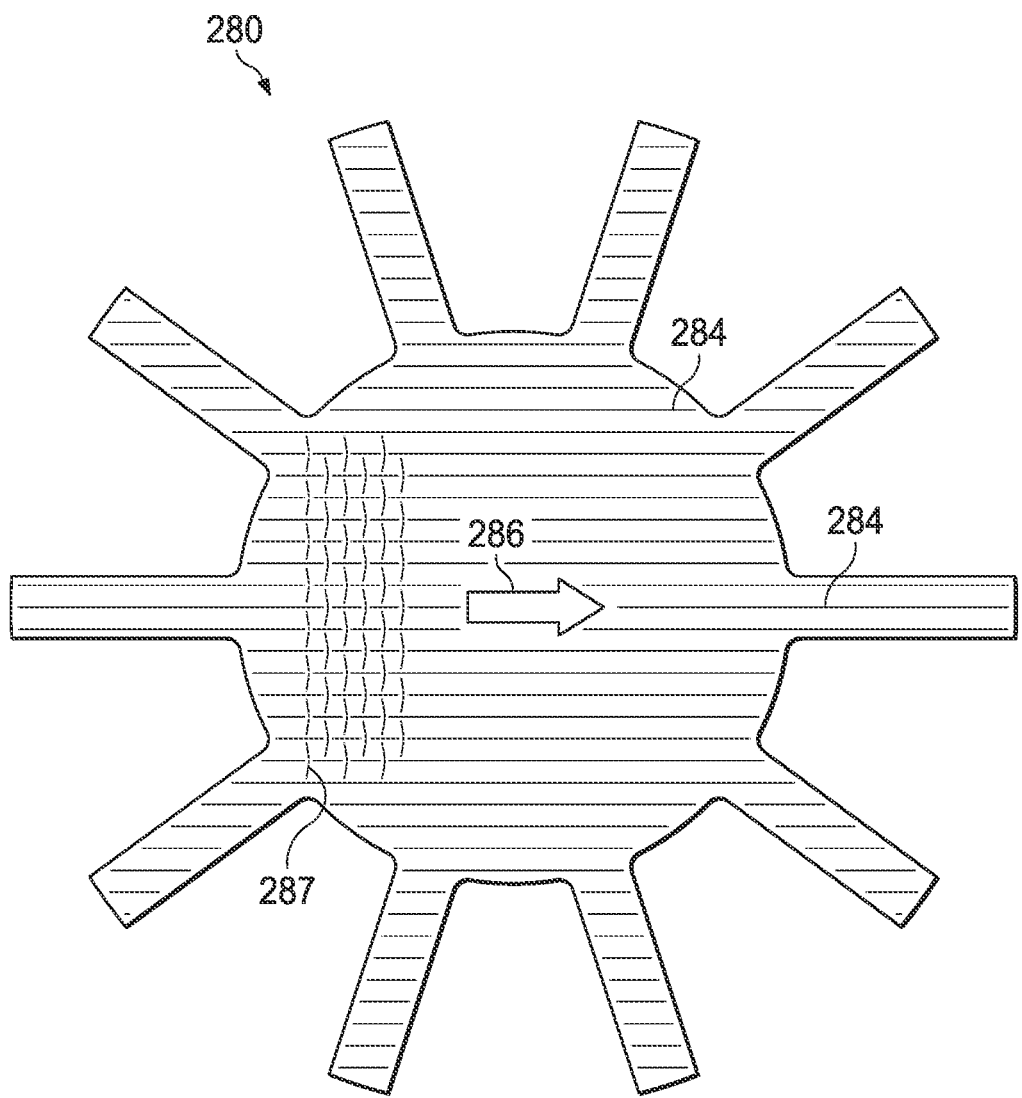
FIG. 3A is a plan view of one layer of rotor core illustrating a first fiber direction of the layer.
Figure 3B:
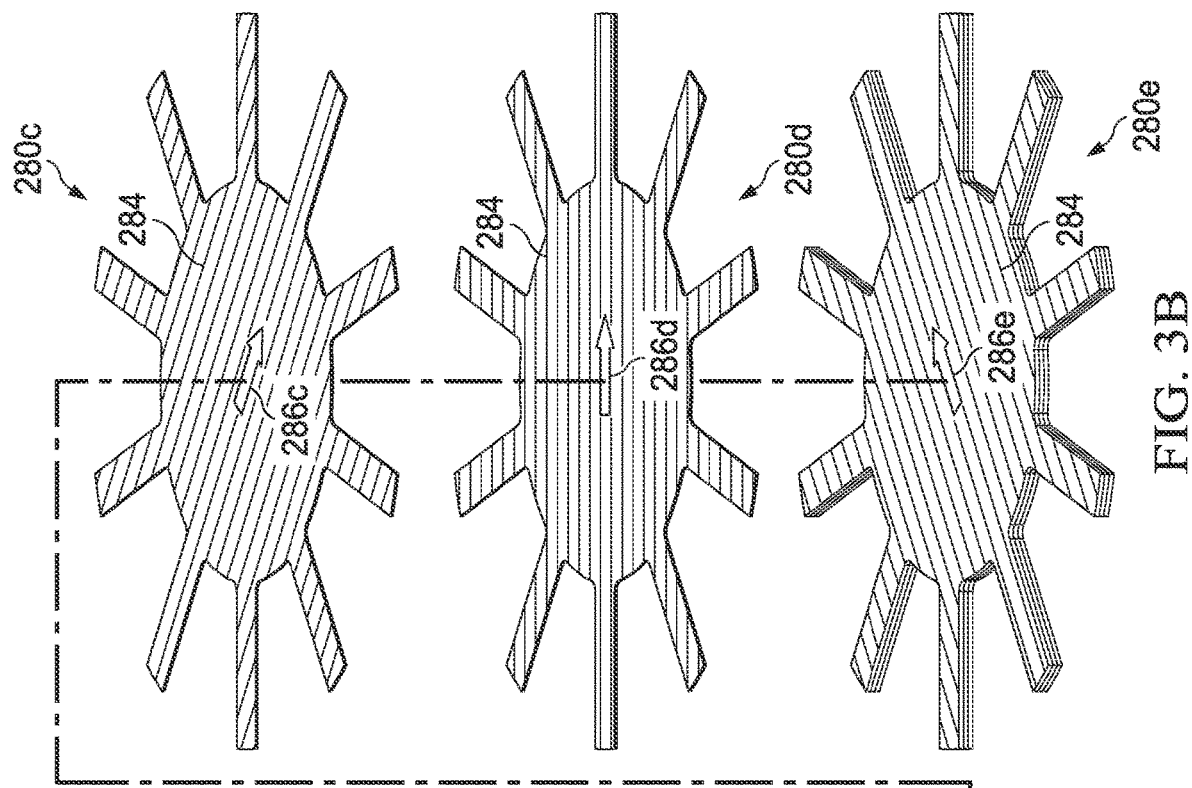
FIG. 3B is an exploded view of one embodiment of the rotor core in which adjacent layers have different fiber directions.

Turning to FIG. 3A and with ongoing reference to FIG. 2C, a layer 280 of the fiber material that forms stack 282 is illustrated in more detail. Specifically, as shown, each layer 280 may be characterized as having at least a primary set of fibers 284 extending in a first direction, as generally indicated by the arrow 286. Fibers 284 need not be limited to a particular type of fiber, but may include glass fiber, carbon fiber or other fibers known in the art. In one or more embodiments, the fibers may be short fibers or long fibers so long at the primary fibers are generally aligned in a distinct direction. Likewise, the material carrying the fibers need not be limited to a particular type of material. In one or more embodiments, the material may be cloth or woven. In other embodiments, the material may be polymer material, such as a sheet of plastic. Each layer 280 may further include one or more secondary sets of fibers 287, such as may be arranged in a cross-weave. However, it is the primary set of fibers that are utilized in the assembly of the stack 282 of rotor core 242, as is best illustrated in FIG. 3B. In one or more embodiments, each layer 280 may be formed by punching the layer 280 from a sheet of fiber material. In other embodiments, each layer 280 may be cut from a sheet of fiber material, such as through precision laser cutting or the like. Although not a requirement, in one or more embodiments the fiber material sheet may be pre-impregnated with a bonding material or adhesive for use in manufacturing hub 246. Likewise, in one or more embodiments, to assist in manufacturing as described herein, an indicator, such as arrow 286, may be stamped or otherwise imprinted on the layer 280 at the time it is cut or punched in order to indicate the direction of the primary set of fibers 284.

In FIG. 3B, a partially exploded view of stack 282 is shown. In each case, as individual layers 280 are formed into the stack 282, the layer 280 is rotated though a predetermined angle so that adjacent layers 280 have their primary sets of fibers 284 extending in different directions. It has been found that by arranging layers as described in the ordered directions as described herein, the performance life of rotor assembly 210 can be significantly enhanced. Thus, as shown, a first layer 280a has the primary sets of fibers 284 extending in a first direction as indicated by arrow 286a, and the adjacent second layer 280b has the primary sets of fibers 284 extending in a second direction as indicated by arrow 286b. Likewise, a third layer 280c has the primary sets of fibers 284 extending in a third direction as indicated by arrow 286c, and the adjacent fourth layer 280d has the primary sets of fibers 284 extending in a fourth direction as indicated by arrow 286d. In preferred embodiments, this rotational sequence of layers 280 continues as the stack 282 is formed. Thus, a fifth layer 280e adjacent the fourth layer 280d is therefore arranged so that the primary sets of fibers 284 of the fifth layer 280e extends in a fifth direction as indicated by arrow 286e.

It will be appreciated that while it is desirable to maximize the number of directions 286 of layers 280 in stack 282, in one or more embodiments, the plurality of layers 280 are at least arranged so that sets of fibers 284 extend in at least three different directions with successive or adjacent layers extending in different directions.

In one or more embodiments of a stack 282 having three directions 286, successive layers are rotated sixty degrees from one another. It will be appreciated that the number of fingers 248 may determine degree of rotation of each layer 280. Thus, in one or more embodiments, the number of different directions 286 for the sets of fibers 284 is equivalent one half the number of fingers 248 to the extent fibers are generally uniform in cross-section or where fibers are not uniform in cross-section (such that a fiber extending in one direction does not have the same material properties as extending 180 degrees in the opposite direction). Thus, in other embodiments, the number of different directions 286 for the sets of fibers 284 is equivalent the number of fingers 248. In the embodiment illustrated in FIG. 3B, it will be appreciated that five directions 286 are illustrated based on the ten fingers 248 of the rotor core 242. Thus, a sixth layer (not shown) that is adjacent the fifth layer 280e, would have fibers 284 of the sixth layer that extend in the first direction as indicated by arrow 286a. In one or more embodiments of a stack 282 having five directions 286, successive layers are rotated 18 degrees from one another. In one or more embodiments, successive layers are rotated sixty degrees from one another. While uniform angular rotations of successive layers are used in the example, it will be appreciated that the disclosure is not limited to any particular angular rotation of successive layers, if any rotation at all.

During the assembly of rotor core 242, it will be appreciated that each layer 280 may be machine cut, stamped or otherwise formed from a fiber cloth or bolt of fiber material. In the case of each layer 280, in one or more embodiments, the direction of the primary set of fibers 284 for is marked or otherwise indicated by a reference point so that each layer 280 may be oriented as described above relative to successive adjacent layers. It will also be appreciated that each individual layer 280 may be formed so that when combined into stack 282, various three dimensional shapes or features may be present, such as slots 270.

While rotor ring 252 (see FIGS. 2A and 2B) is preferably a solid, pre-formed ring that is positioned around rotor core 242, in one or more other embodiments, rotor ring 252 may also be formed of layers of fiber material formed into a ring stack as generally described above with respect to rotor core 242. In such case, in preferred embodiments, a multiplicity of continuous rings may be cut from fiber material and formed into a stack. The ring layers are preferably continuous to ensure an even application of hoop stress about the ring, which is particularly desirable given the high rotational speeds to which the rotor assembly 210 will be subjected during use. Consecutive ring layers may be angularly oriented relative to one another so that fiber direction is offset from adjacent layers of fiber material as described. In one or more embodiments, a layer 280 may be cut to include a ring such that the ring and fingers of the layer 280 are integrally formed.

Figure 4A:
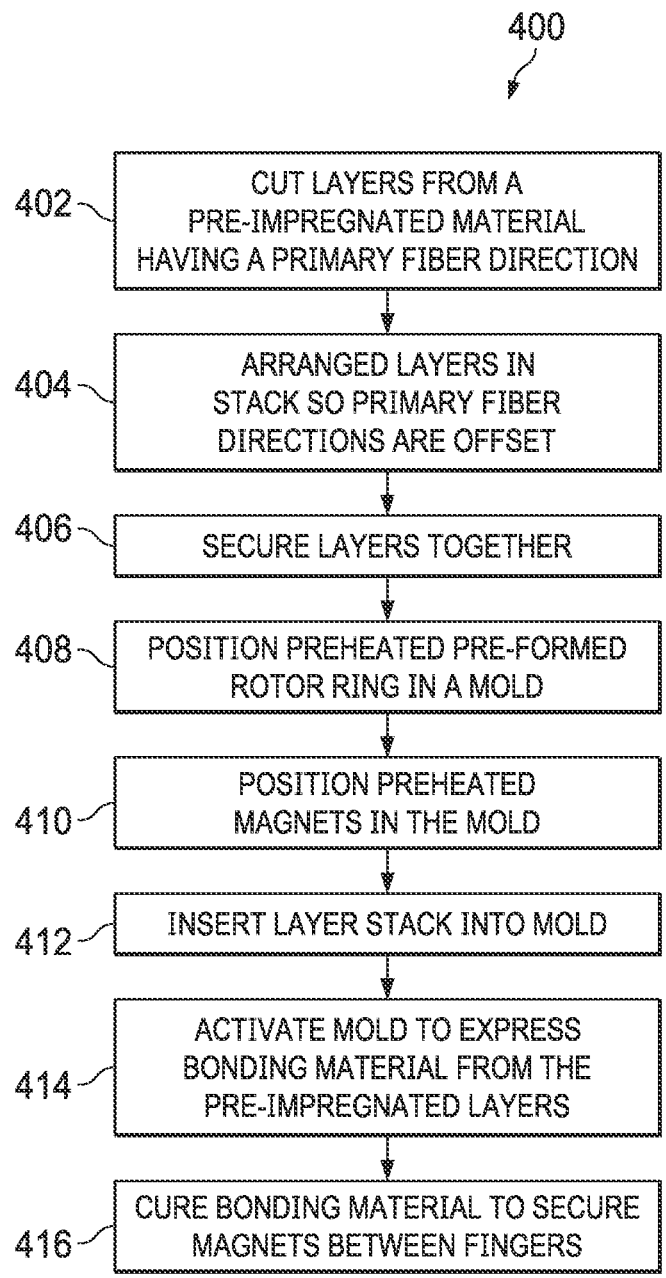
FIG. 4A illustrates a method and device for manufacturing the rotor assembly of FIGS. 2 and 3.
Figure 4B:
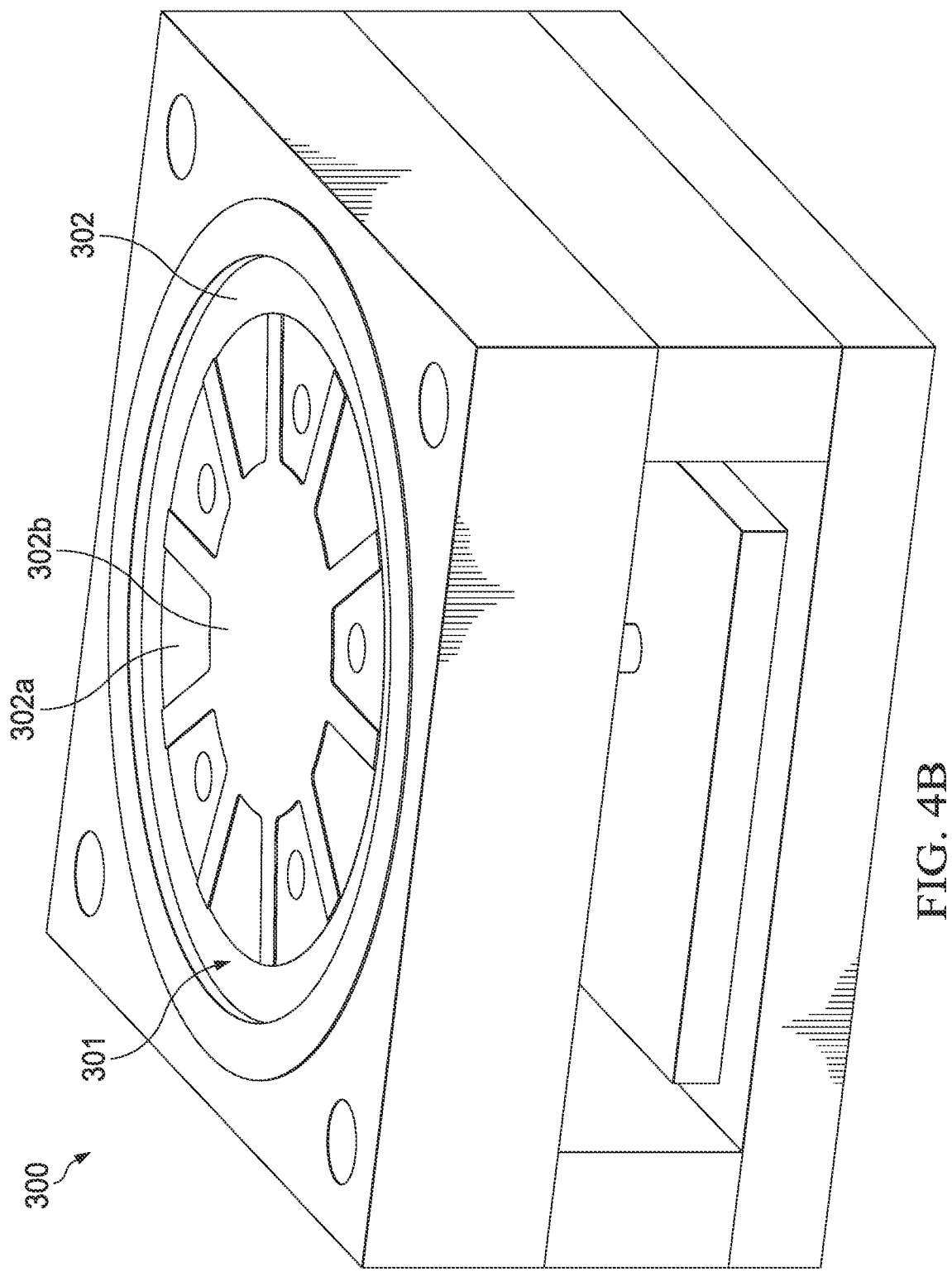
FIG. 4B illustrates a mold utilized in formation of embodiments of the rotor assembly described herein.

In FIG. 4A, a method 400 of manufacturing rotor assembly 210 is illustrated. As described above, a first step 402 in method 400 is to cut a multiplicity of layers 280 from a fiber material. The fiber material is selected to have at least a primary fiber extending in an identifiable primary fiber direction. In one or more embodiments of step 402, once a layer 280 is cut, the layer may be marked with a label, printed indicator or other device that provides and indication of the direction of the primary fiber. In one or more embodiments, the material is pre-impregnated with adhesive or a bonding material. In step 404, the multiplicity of layers 280 are arranged in a stack 282 so that fingers 148 align. In one or more embodiments of step 404, each layer is axially rotated relative to the adjacent layer so that the primary fibers 284 of one layer 280 are angularly offset from the primary fibers 284 of an adjacent layer 280.

In one or more embodiments, the material forming each layer 280 is glass fiber material with glass fiber forming the primary fiber. In other embodiments, the material forming each layer 280 is carbon fiber material with carbon fiber forming the primary fiber. In other embodiments, other types of fiber may be utilized in the material forming each layer 280.

In step 406, once the stack 282 is formed, heat and/or pressure may be applied to the stack 282 in order to activate the adhesive or bonding material to form the composite rotor core 242. In this regard, minimal heat and/or pressure may be applied only to the degree necessary to initially secure the individual layers 280 to one another, but without expressing the pre-impregnated adhesive or bonding material from the stack 282. In one or more embodiments, a mold 300 such as that shown in FIGS. 4C-4E may be utilized to apply such initial heat and/or pressure to stack 282 in order to form rotor core 242. Notably, in the prior art, rotor assemblies, and in particular the rotor core, are generally formed of milled metal or milled composite materials, as opposed to forming the rotor core 242 as described herein. In any event, mold 300 includes a mold cavity 301 with reliefs or other orienting features 302 to allow the stack 282 to be positioned within mold 300.

In addition to utilizing mold 300 to form rotor core 242, mold 300 may also utilized to assemble the other components of rotor assembly 210 together, namely the rotor ring 252 and the magnets. 244. In this regard, mold 300 may also include reliefs, projections or other orienting features 302 mentioned above, such as the illustrated magnet seats 302a for receiving and positioning the magnets and a rotor core seat 302b for receipt and alignment of stack 282 of rotor core 242. Notably, magnet seats 302a may be a raised relief or depression relative to rotor core seat 302b, depending on the features desired for rotor assembly 210 (such as cooling channels discussed below). In any event, in addition to initially bonding the layers 280 of stack 282 together to form the rotor core 242, as will be described, the mold 300 may be used to activate the adhesive or bonding material to bond the rotor ring 252 and magnets 244 to the rotor core 242. Notably, in one or more embodiments, the orienting features 302 are disposed so that magnets 244 are spaced apart from the fingers 248 leaving a gap so that the magnets 244 are not in physical contact with the fingers 248. As will be appreciated, as bonding material is expressed during the formation steps below, the bonding material will flow into this gap and maintain the spaced apart relationship once manufacturing is complete, thereby minimizing stresses on the magnets during use of the rotor assembly 210.

Figure 4C:
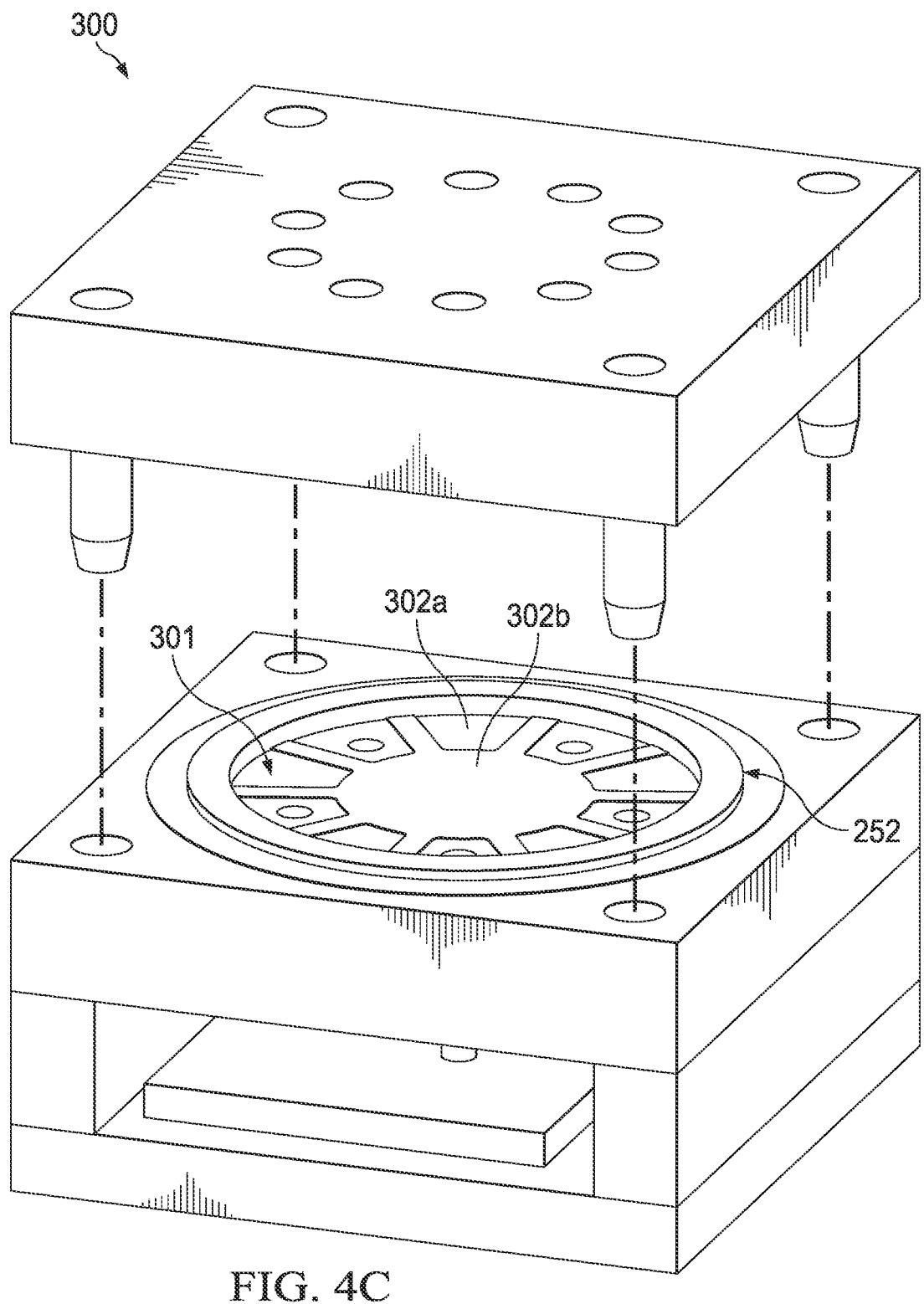
FIG. 4C illustrates insertion of the retaining ring in a mold during manufacturing the rotor assembly of FIGS. 2 and 3.

Thus, turning to FIG. 4C, in step 408, a solid, pre-formed rotor ring 252 may be positioned within the mold 300. In one or more embodiments of step 408, the rotor ring 252 is preheated prior to inserting it in mold 300. Likewise, mold 300 may be preheated for receipt of rotor ring 252. It will be appreciated that mold 300 includes mold cavity 301 with an outer diameter 306 disposed to receive and seat rotor ring 252.

Figure 4D:
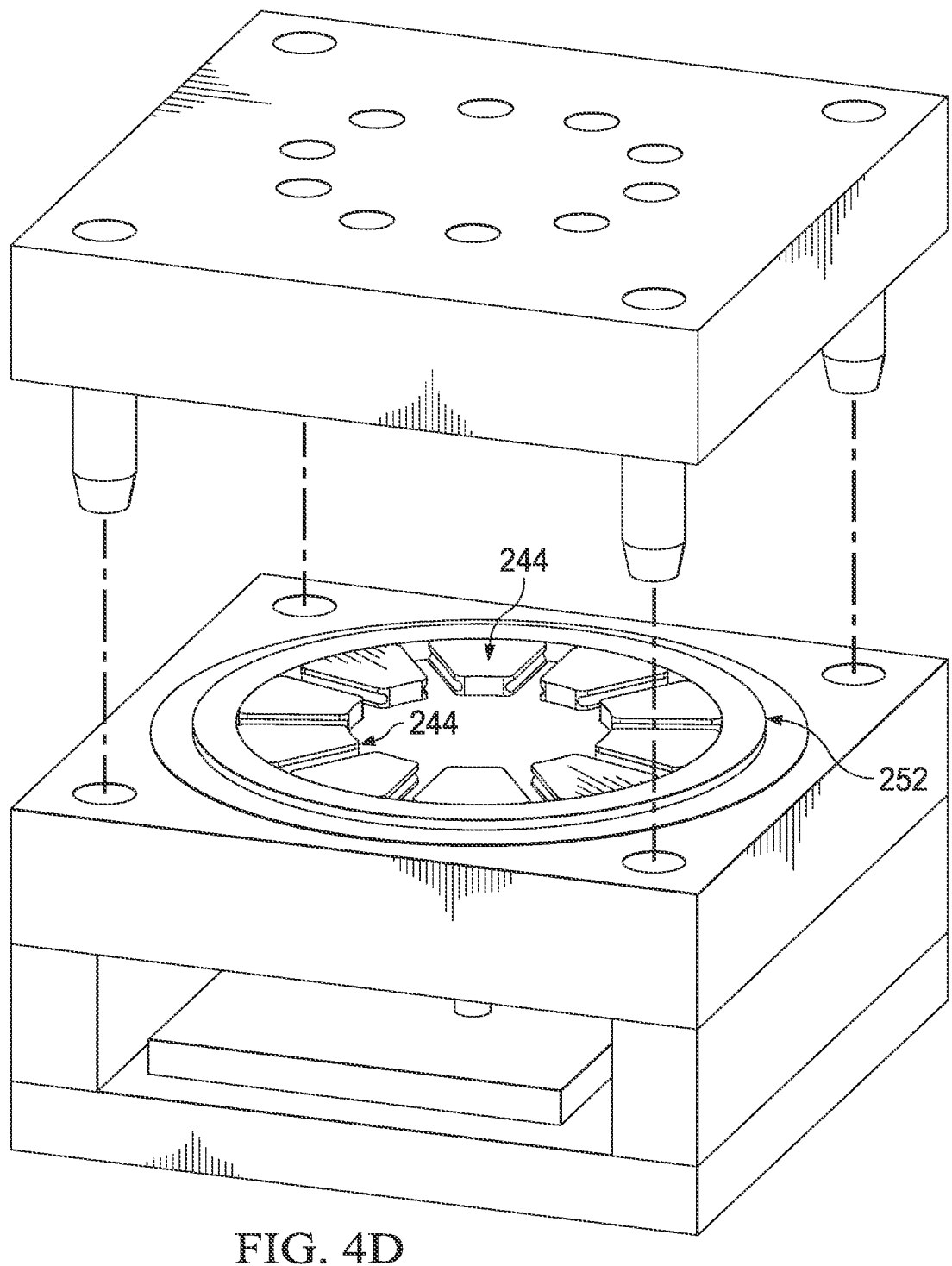
FIG. 4D illustrates insertion of the magnets in a mold during manufacturing the rotor assembly of FIGS. 2 and 3.

In step 410, as illustrated in FIG. 4D, magnets 244 are inserted into mold 300. Each magnet 244 may be aligned on or in a magnet seat 302a. In one or more embodiments, the magnets 244 are preheated prior to inserting it in mold 300.

Figure 4E:
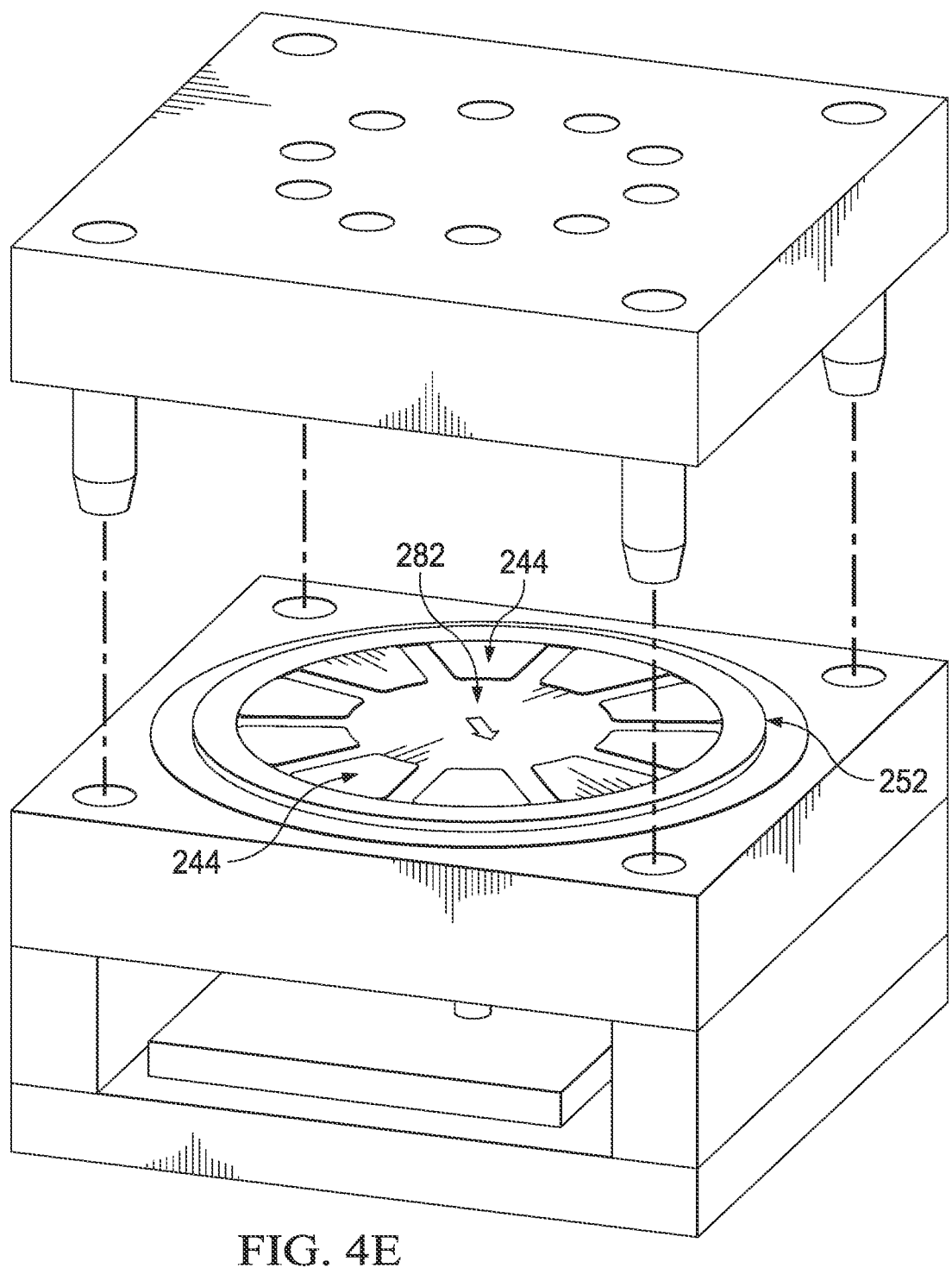
FIG. 4E illustrates insertion of the rotor core (spider stack) in a mold during manufacturing the rotor assembly of FIGS. 2 and 3.

Finally, in step 412, as illustrated in FIG. 4E, stack 282 of layers 280 is inserted into mold 300. As mentioned above, in one or more embodiments, stack 282 may be at least partially preassembled by applying enough heated or pressure to secure layers 280 to one another prior to insertion into mold 300 for step 412. In other embodiments of step 412, stack 282 may be simply inserted into mold 300 without this preassembly step. In this regard, it will be appreciated that unlike the rotor ring 252 and the magnets 244, stack 282 is preferably not preheated so as to avoid expressing the pre-impregnated adhesive/bonding material prior to insertion into mold 300. While the foregoing is the preferred order for inserting rotor assembly 210 components into mold 300, the method of manufacture is not limited to a particular order. Notably, where the rotor ring 252 is formed of a stack of fiber material as described above, the rotor ring 252 is positioned in the mold 300 at the same time as the stack 282, and in such case, the rotor ring 252 is not preheated.

In any event, in step 414, once the rotor assembly 210 components are inserted into mold 300, the mold 300 may be closed and activated to apply heat and/or pressure as is known in the art. It will be appreciated that the heated adhesive/bonding material will be at least partially expressed from the stack 282 to engage the magnets and the rotor ring, to bond the magnets in the magnet pockets and to bond the rotor ring to the distal ends of the rotor fingers. In this regard, all of the magnets are bonded simultaneously to the rotor core, which significantly reduces the period of time require for manufacture of rotor assembly 210. By bonding all of the magnets to the rotor core at the same time, drawbacks of the prior art are overcome, particularly where it is found in the prior art that each magnet is inserted separately into a magnet pocket and secured.

In step 416, the rotor assembly 210 may be allowed to cure in the mold or may be removed from the mold for curing as is known in the art. It will be appreciated that upon curing, in one or more embodiments, the hardened bonding material may secure the magnets 244 in a spaced apart relationship to the fingers 248 of the rotor core 242.

Figure 5:
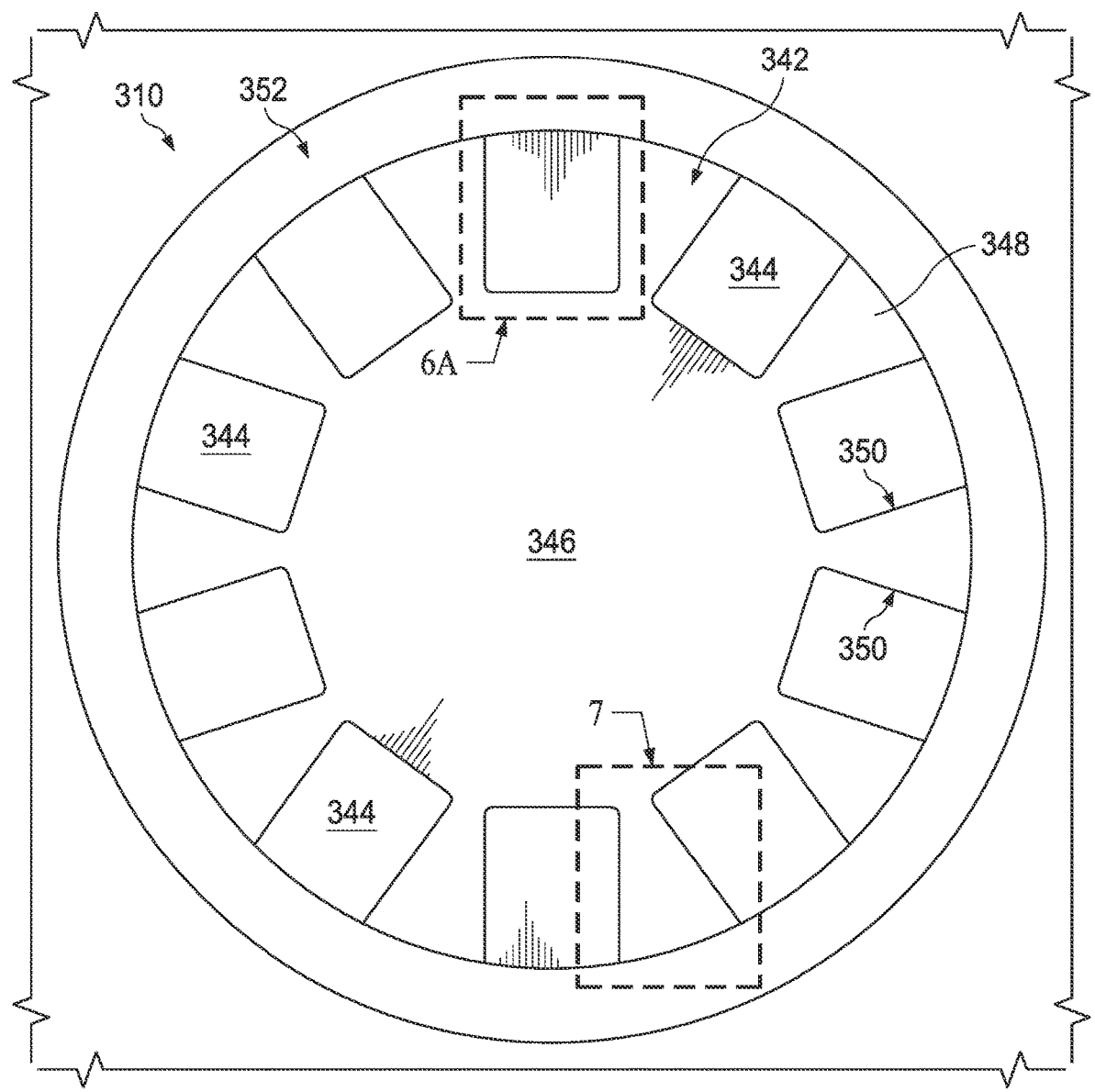
FIG. 5 is a plan view of a rotor assembly of the disclosure.

Turning to FIG. 5, another embodiment of rotor assembly 110 of FIG. 1 is shown and generally designated as rotor assembly 310. Rotor assembly 310 is generally formed of a rotor core or yoke 342 disposed to carry a plurality of magnets 344. In one or more embodiments, rotor core 342 is spider shaped and formed of a hub 346 from which fingers 348 radially extend. Fingers 348 are spaced apart from one another around the perimeter of hub 346 so as to form magnet pockets 350 between adjacent fingers 348. Rotor assembly 310 further includes a rotor ring 352 disposed radially outward from fingers 348. In one or more embodiments, rotor ring 352 and rotor core 342 may be separate components, such as is shown in FIG. 5, while in other embodiments, rotor ring 352 and rotor core 342 may be integrally formed.

In one or more embodiments, rotor core 342 is formed of a non-conducting composite material. Similarly, in one or more embodiments, rotor ring 352 is formed of a non-conducting composite material.

Figure 3B:
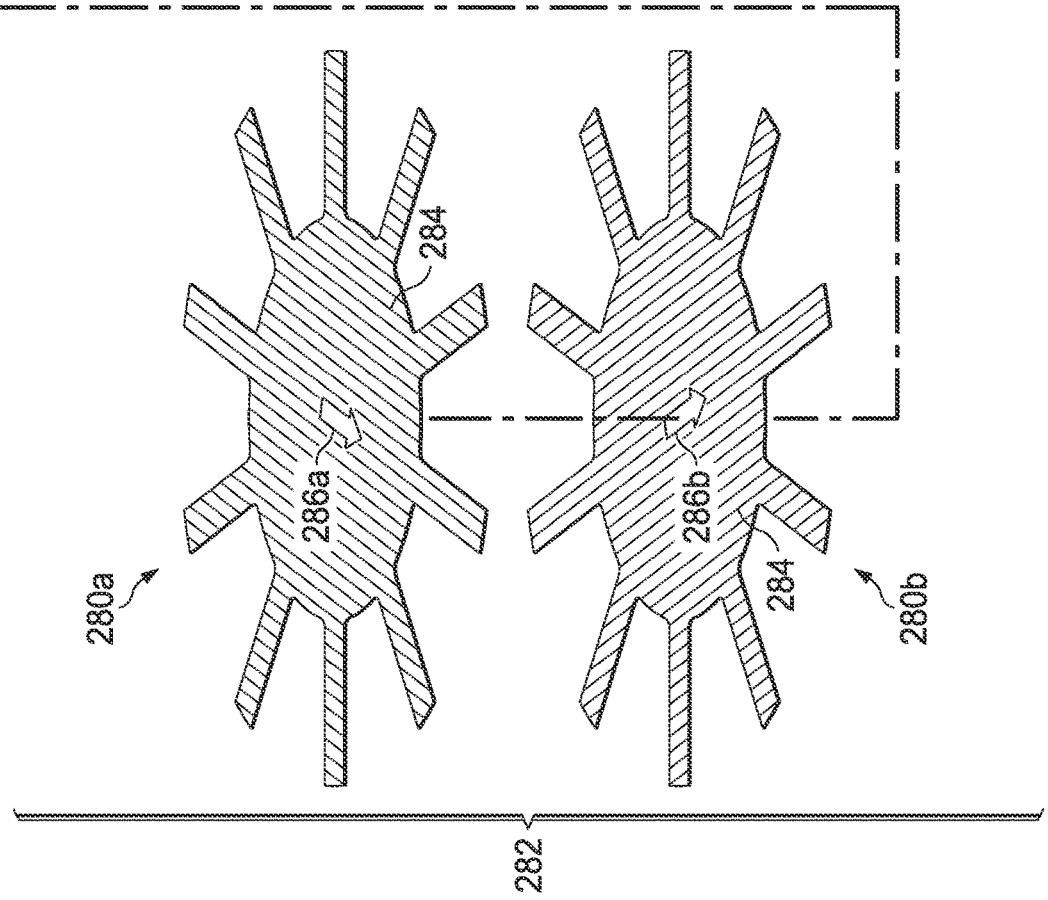

In the illustrated embodiment of rotor assembly 310, fingers 348 are generally wedge shaped so that magnet pockets 350 are generally rectangular in shape. As such, in this illustrated embodiment, magnets 344 are generally rectangular in shape. This arrangement is desirable because it reduces machining required of the magnets 344 and the magnets can be more readily inserted into the magnet pockets 350. In this regard, this arrangement is more readily produced from the methods described above with respect to FIGS. 2, 3 and 4 than traditional methods because traditional methods of machining would create a greater stress at the proximal end of finger 348 during manufacture, whereas a rotor assembly 310 formed in a mold, such as mold 300 described above, would substantially eliminate such stresses during manufacture.

Figure 6A:
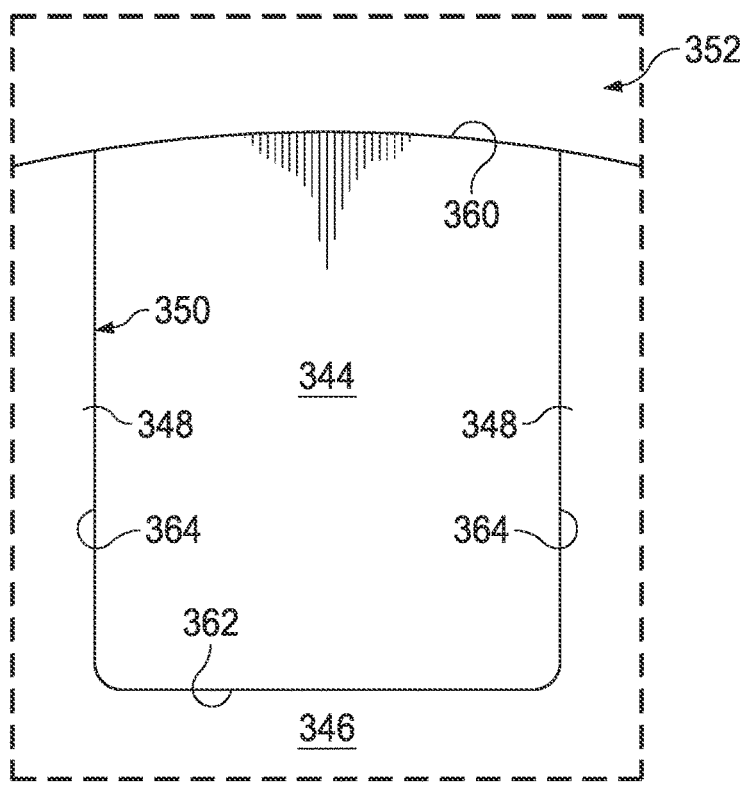
FIG. 6A is an enlarged elevation view of a magnet in a magnet pocket of the rotor assembly of FIG. 5.

Turning to FIGS. 6A-6D with ongoing reference to FIG. 5, magnets 344 may be inserted into magnet pockets 350 in a variety of arrangements. In FIG. 6A, magnet 344 is inserted into the magnet pocket 350 between adjacent fingers 348 of rotor core 342. Rotor ring 352 is positioned radially outward from magnet 344. Magnet 344 includes a radial outer edge 360, a radial inner edge 362 and side edges 364 joining the outer edge 360 and the inner edge 362. In one or more embodiments, one or both of radial outer edge 360 and radial inner edge 362 may be arcuate in shape. In the embodiments of FIGS. 6A-6D, side edges 364 are parallel thereby creating the generally rectangular shape of magnet 344.

Figure 6B:
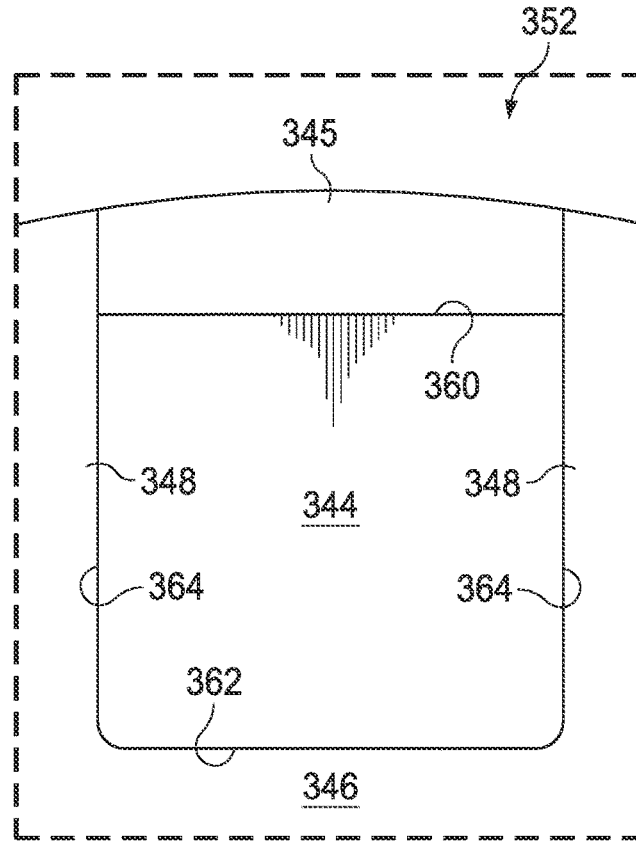
FIG. 6B is an enlarged elevation view of the magnet of FIG. 6A with a spacer positioned radially outward from the magnet.

In FIG. 6B, a spacer or wedge 345 is shown disposed in magnet pocket 350 between rotor ring 352 and magnet 344. It has been found that where magnets 344 contact rotor ring 352 directly, undesirable stresses occur at the corners of magnets 344 where the magnets 344 abut the rotor ring 352. By employing spacers 345, the stresses occurring in the rotor assembly 310 at these points are significantly reduced. Spacer 345 may be formed of a variety of materials. In one or more embodiments, spacers 345 may be formed of a metallic or conducting material, while in other embodiments, spacers 345 may be formed of a composite material or a non-conducting material, such as polymers. In yet other embodiments, spacer 345 may be formed of the same or similar magnetic material as magnets 344.

Figure 6C:
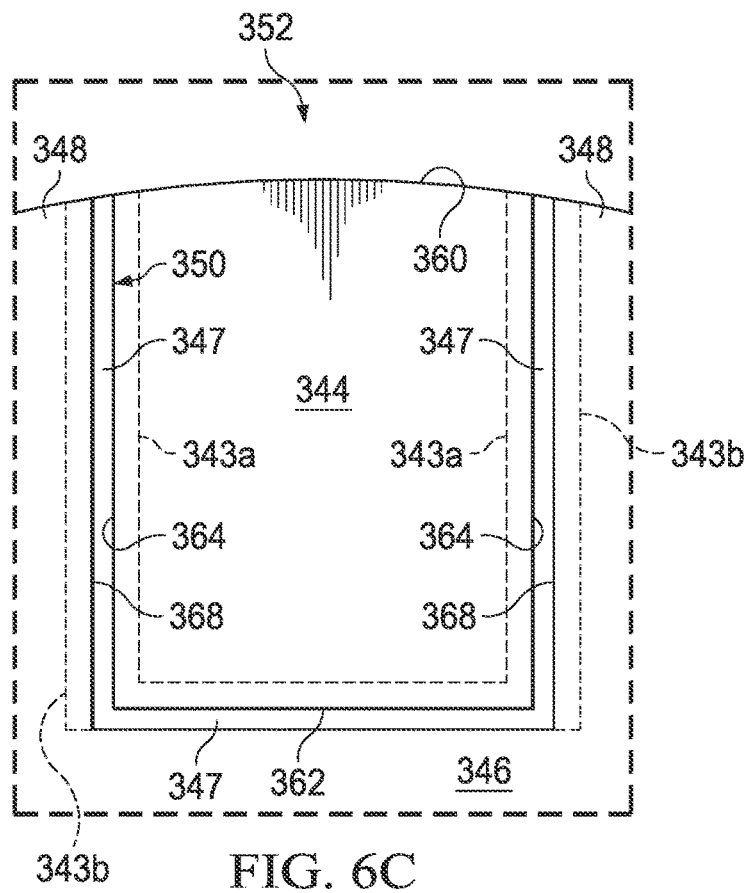
FIG. 6C is an enlarged elevation view of a grooved magnet in a grooved magnet pocket with the magnet spaced apart from the spider edges.

In FIG. 6C, magnet 344 is positioned in magnet pocket 350 so as to be spaced apart from the fingers 348 defining magnet pocket 350 such than an open space or gap 347 is formed about magnet 344 and each of the sides of rotor core 342 (as defined by the fingers 348 and the hub 346). This allows adhesive/bonding material expressed during the molding process as described above to flow into the open space 347 to better bond to the magnet 344. In one or more embodiments, to further enhance bonding, one or more edges 364 of magnet 344 may include a groove or recess 343a into which the adhesive/bonding material may flow. Alternatively, or in addition thereto, one or more edges 368 of fingers 348 may also include a groove or recess 343b into which the adhesive/bonding material may flow. Any of the grooves 343 as described in FIG. 6C may extend fully or partially such as is generally described above with respect to FIG. 2B. In any event, it will be appreciated that when a rotor assembly 310 having the features described in FIG. 6C is manufactured as described above in manufacturing process 400, the magnets 344 are positioned in mold 300 so that the magnets 344 are spaced apart (see gap 347) from the finger 348 edges and from abutment with the rotor hub 346, thereby permitting a uniform flow of bonding material therebetween. This will reduce the stress on magnets 244 during the high revolution per minute (RPM) operation of rotor assembly 310.

Figure 6D:
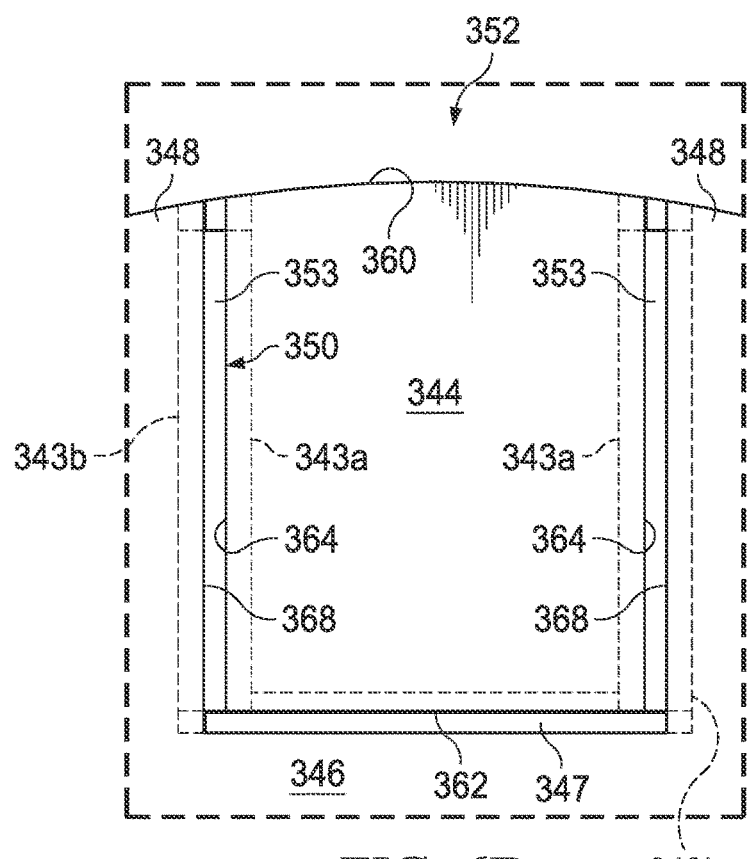
FIG. 6D is an enlarged elevation of the grooved magnet of FIG. 6C illustrating a magnet retaining member inserted between the magnet and the spider.

In FIG. 6D, a connector or fastening mechanism 353, such as a pin or blade, may be inserted into adjacent grooves 343a, 343b of a magnet 344 and a finger 348, respectively, to thereby secure the magnet 344 in the magnet pocket 350 but spaced apart from the fingers 348 of rotor core 342.

Figure 7:
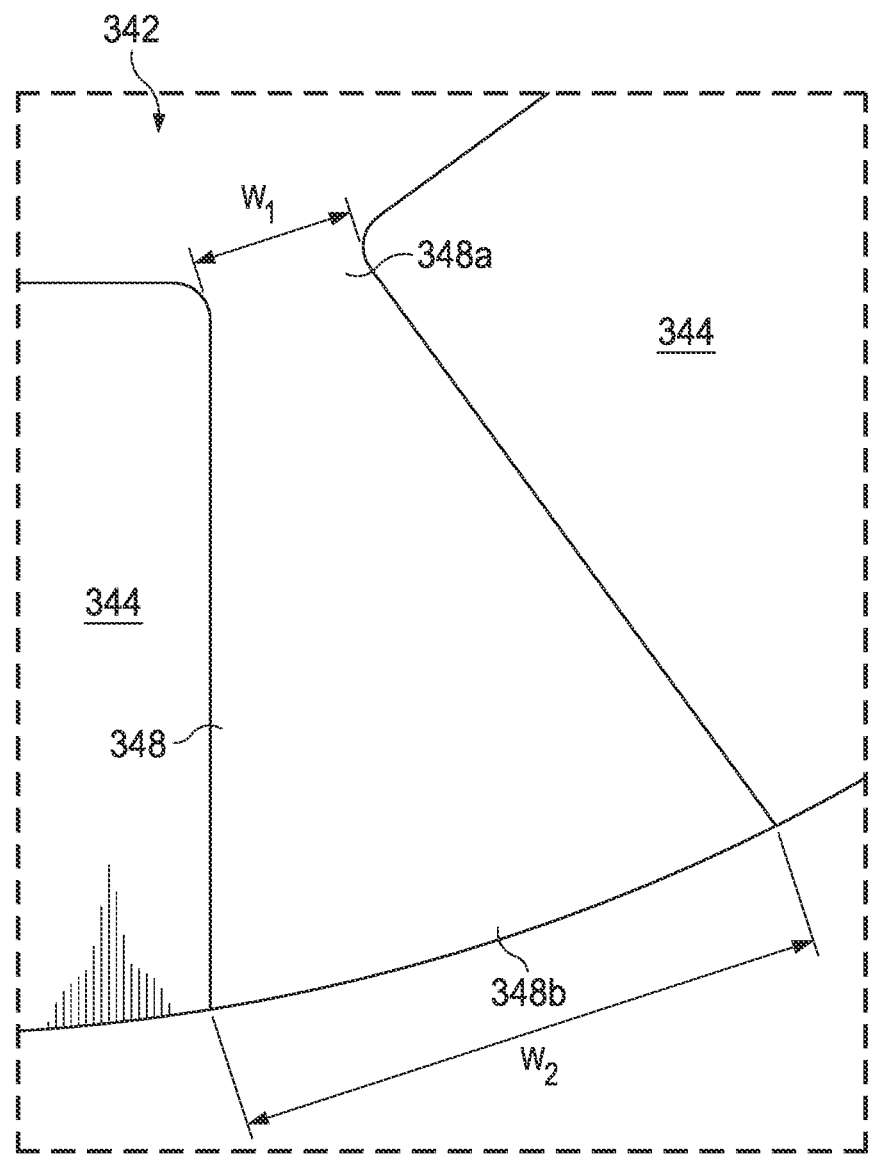
FIG. 7 is an enlarged elevation of wedge-shaped spider fingers of the rotor core enabling rectangular shaped magnets.

FIG. 7 is an enlarged elevation of wedge-shaped spider fingers 348 of the rotor core 342 shown in FIG. 5. To maximize the total surface area of magnets 344 about the perimeter of rotor core 342, the proximal end 348a of finger 348 is substantially narrower than the distal end 348b of finger 348 as illustrated by the respective widths W1 and W2. Forming rotor core 342 by traditional methods of machining would create undesirable stress on the proximal ends 348a of the fingers 348 during machining. Thus, in one or more embodiments, such a rotor core 342 is formed by stacking a multiplicity of fiber material layers 280 as described above, eliminating the need for machining.

Figure 8:
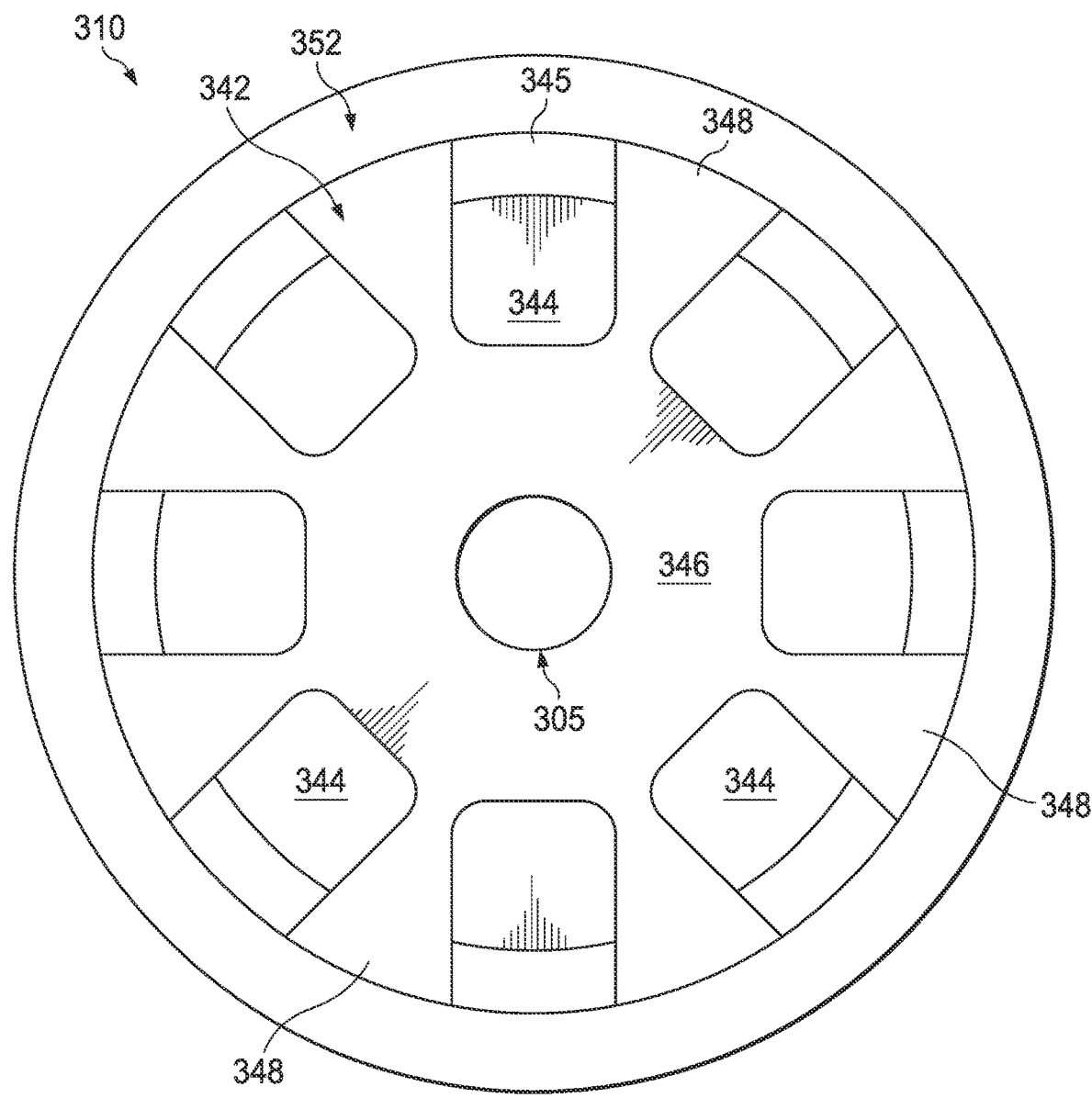
FIG. 8 is a plan view of a rotor core assembly having spacers inserted between the magnets and the outer ring.

Turning to FIG. 8, an elevation view of a rotor assembly 310, similar to FIG. 5 is shown, but with spacers 345 inserted in magnet pockets 350 between the magnets 344 and the rotor ring 352. As described above with respect to FIG. 6B, spacers 345 absorb the stresses that would otherwise be transferred from rotor ring 352 during operation of rotor assembly 310. It has been found that such stresses can reduce the operational life of magnets 344 and impact the electrical output of axial flux motors during operation. An aperture 305 may be formed in central hub 346 for receipt of a rotor shaft (see FIG. 1).

Figure 9A:
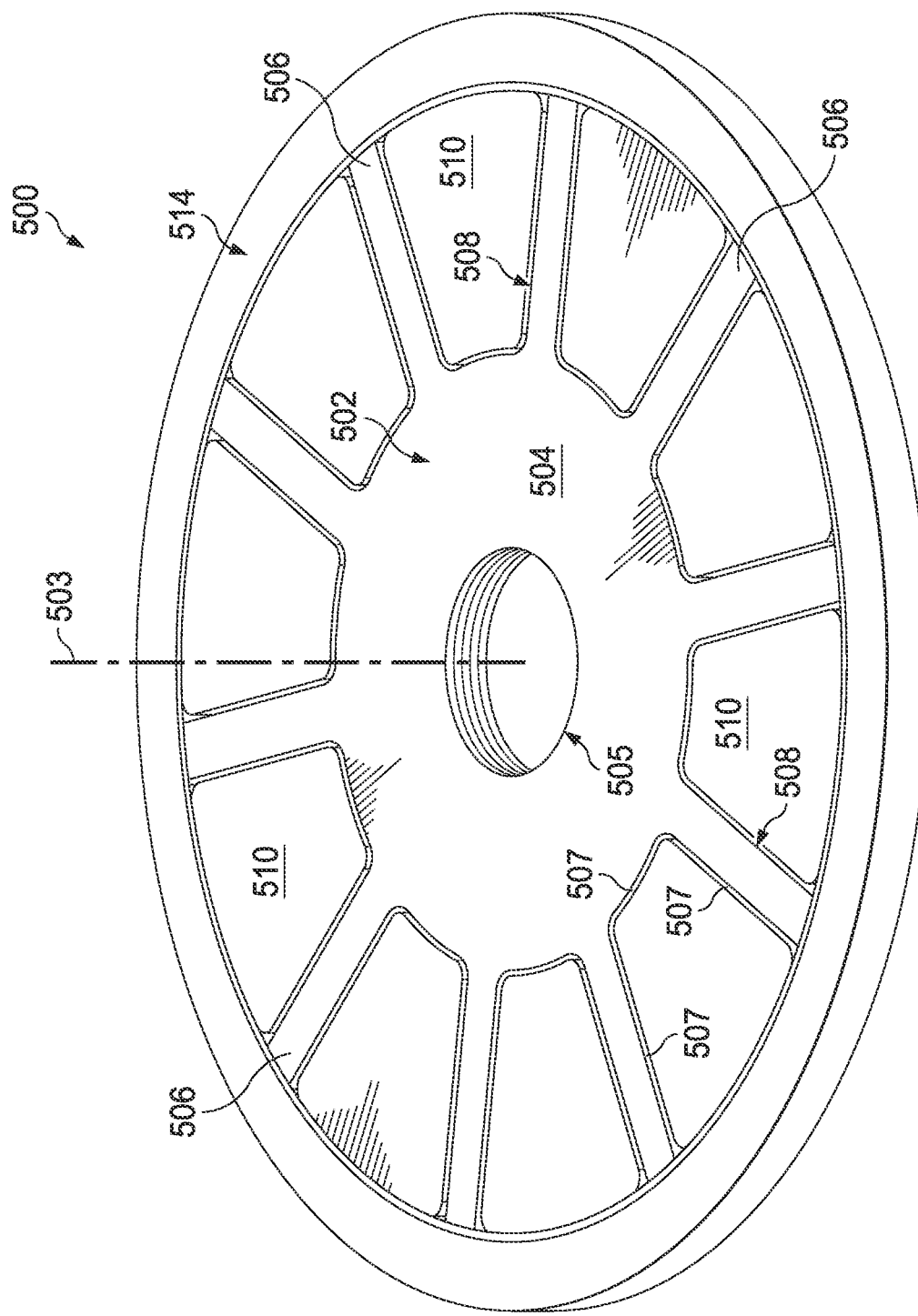
FIG. 9A is a perspective view of another embodiment of a rotor assembly.

FIGS. 9A-9E illustrate another embodiment of a rotor assembly 500 in accordance with this disclosure. In FIG. 9A, rotor assembly 500 includes a spider shaped rotor core 502 formed along a rotor axis 503 and having a central hub 504 from which fingers 506 radially extend. An aperture 505 may be formed in central hub 504 for receipt of a rotor shaft (see FIG. 1). Fingers 506 are spaced apart from one another around the perimeter of hub 504 so as to form magnet pockets 508 between adjacent fingers 506. Each magnet pocket 508 is disposed to receive a magnet 510. A rotor ring 514 is disposed radially outward from fingers 506. Although not limited to a particular number of fingers 506 and pockets 508, in the illustrated embodiment, rotor core 502 includes ten fingers 506 and ten magnet pockets 508. In one or more embodiments, magnets 510 may be positioned in magnet pockets 508 so as to be spaced apart from adjacent fingers 506 and/or central hub 504 so as to form a gap 507 therebetween.

In one or more embodiments, rotor core 502 may be formed of a plurality of fiber layers bonded together in a fiber layer stack as generally described above, while in other embodiments, rotor core 502 may be formed in other ways.

Figure 9B:
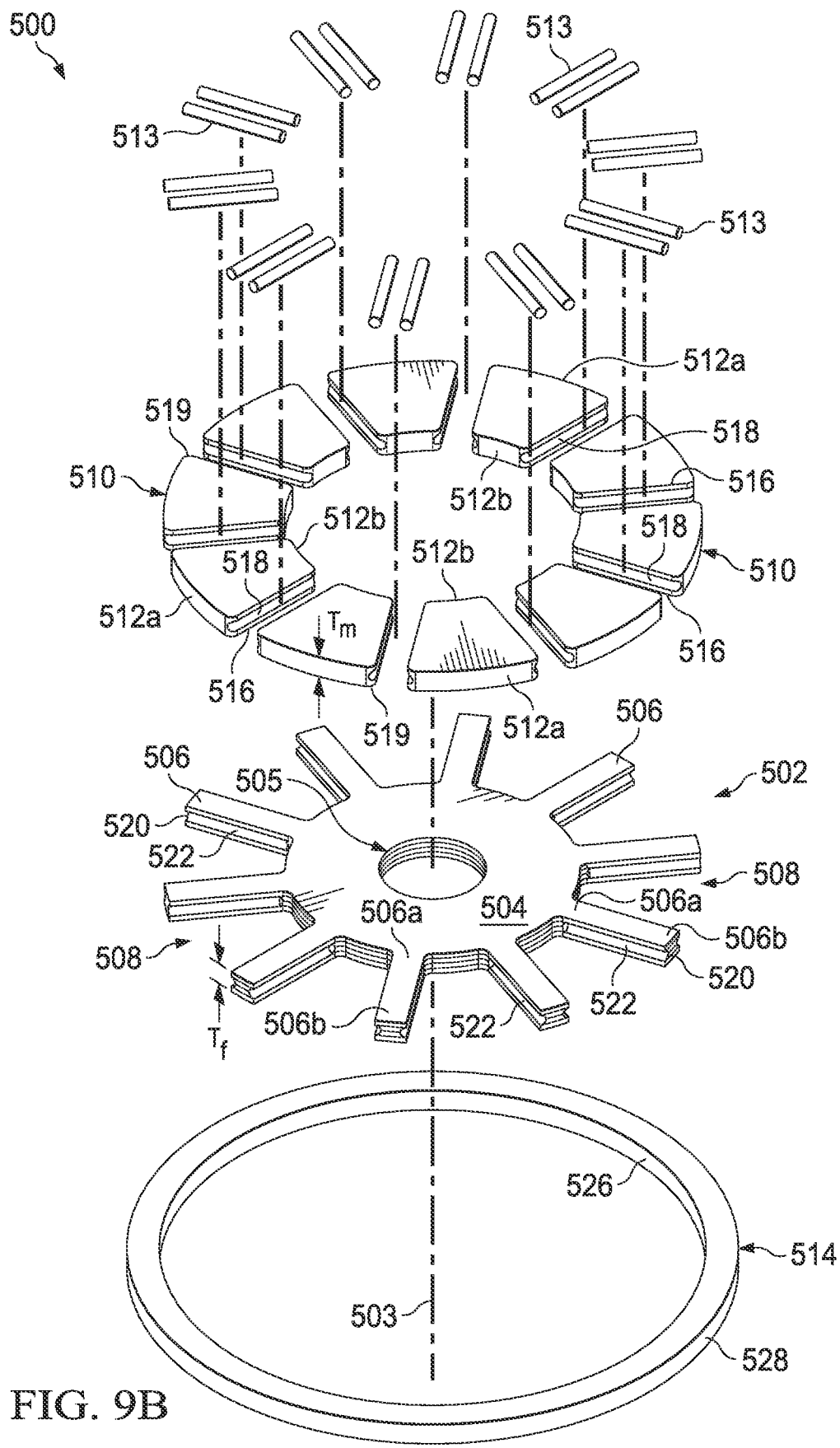
FIG. 9B is an exploded view of the rotor assembly of FIG. 9A.

FIG. 9B is an exploded view of rotor assembly 500 where it can be seen that each magnet 510 may be supported in a magnet pocket 508 by connectors 513.

In the illustrated embodiments, fingers 506 are generally rectangular in shape forming magnet pockets 508 that are generally wedge shaped. As such, in this illustrated embodiment, magnets 510 are generally wedge shaped, where each magnet 510 has a radial outer edge 512a of a greater length than a radial inner edge 512b which radial edges 512a, 512b are joined by side edges 516. The radial outer edge 512a and/or the radial inner edge 512b may be arcuate. In one or more embodiments, at least one and preferably each magnet side edge 516 includes a magnet groove or slot 518 extending along at least a portion of the length of side edge 516 between radial outer edge 512a and radial inner edge 512b. In the illustrated embodiment, each groove 518 fully extends between radial outer edge 512a and radial inner edge 512b. Magnet groove 518 is not limited to a particular shape but in some embodiments may be arcuate or rectangular in cross-section.

To reduce stress on magnets 510, the outer corners 519 of each magnet 510 may also be rounded. Similarly, each finger 506 has a side edge 520 that extends from a proximal finger end 506a adjacent the hub 504 to a distal finger end 506b at the periphery of the rotor core 502. In the illustrated embodiments, each side edge 520 of a finger 506 includes a finger groove or slot 522 extending along at least a portion of the length of side edge 520 between the proximal finger end 506a and the distal finger end 506b. Finger groove 522 is not limited to a particular shape but in some embodiments may be arcuate or rectangular in cross-section. Moreover, in one or more embodiments finger groove 522 has the same cross-sectional shape as magnet groove 518 so as to mirror one another.

Fingers 506 may be characterized as having a thickness Tf and magnets 510 may be characterized as having a thickness Tm. In one or more embodiments, finger thickness Tf and magnets thickness Tm are the same. In yet other embodiments, finger thickness Tf and magnets thickness Tm may differ to allow formation of cooling channels to be formed in rotor assembly 500.

In one or more embodiments, rotor ring 514 is a preformed ring that is positioned around rotor core 502. Rotor ring 514 has a radial inner edge 526 and a radial outer edge 528, where radial inner edge 526 may abut fingers 506 when rotor ring 514 is positioned around rotor core 502.

Connector 513 is disposed to engage each of finger groove 522 and magnet groove 518. Although connector 513 is not limited to a particular shape, where finger groove 522 and magnet groove 518 are each semi-circular in cross-section, then connector 513 may be a round pin, such as is shown. Likewise, where finger groove 522 and magnet groove 518 are each rectangular in cross-section, then connector 513 may be a square pin or rectangular blade.

Figure 9C:
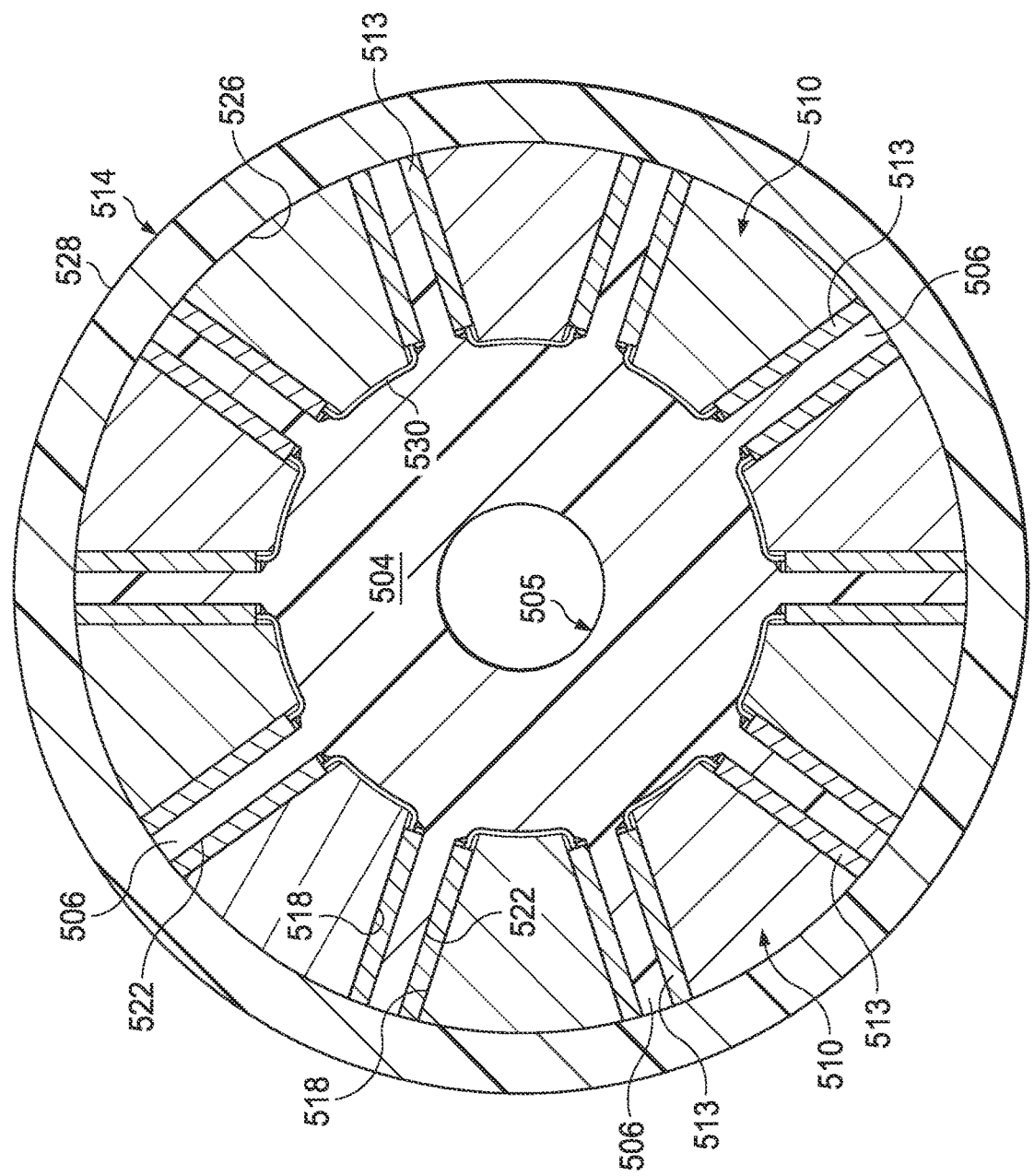
FIG. 9C is a cut-away elevation view of the rotor assembly of FIG. 9A.
Figure 9D:
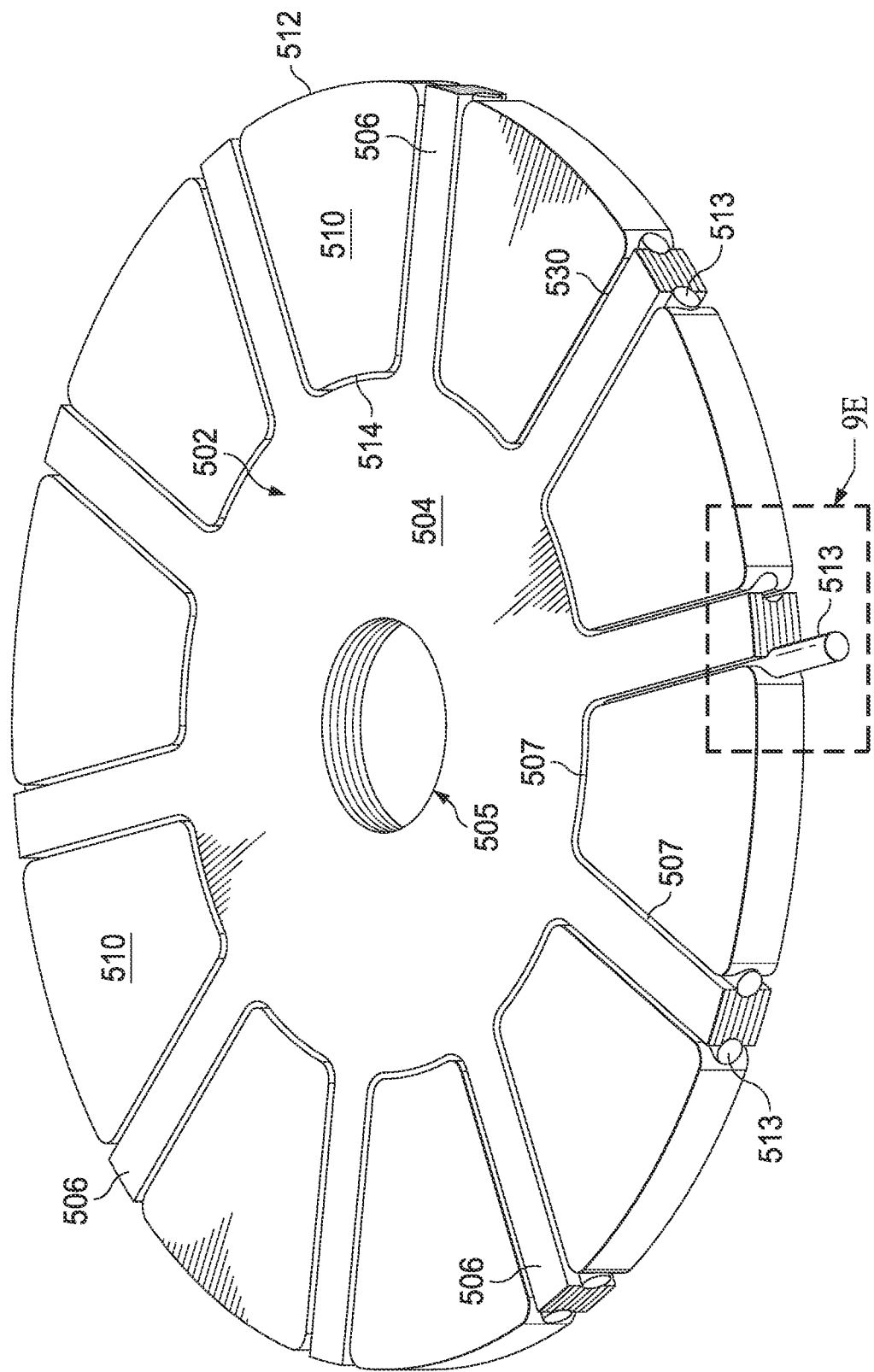
FIG. 9D is a perspective view of the partially assembled rotor assembly of FIG. 9A.
Figure 9E:
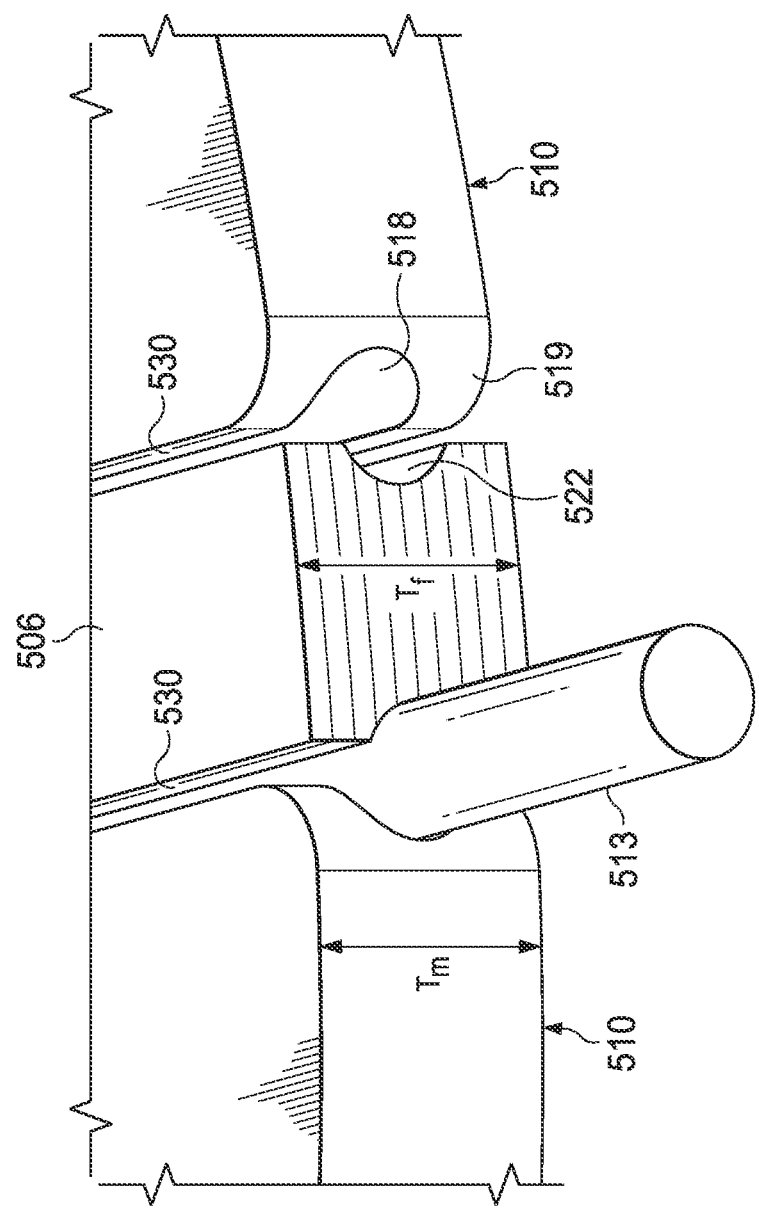
FIG. 9E is an enlarged perspective view of the connection between magnets and fingers of the rotor assembly of FIG. 9A.

Turning to FIGS. 9C, 9D and 9E, rotor assembly 500 is shown partially assembled, but with rotor ring 514 removed in FIGS. 9D and 9E thereby illustrating the positioning of magnets 510 in magnet pockets 508. Each magnet 510 is positioned in a magnet pocket 508 so that finger grooves 522 align with magnet grooves 518 permitting a connector 513 to be inserted therebetween. In one or more embodiments, magnets 510 are positioned in magnet pockets 508 so as to be spaced apart from adjacent fingers 506 such that a gap 530 is formed between each magnet edge 516 and each finger side edge 520. It has been found that by holding magnet 510 in spaced apart relationship to fingers 506, stresses on magnets 510 are reduced, particularly during the high RPMs to which rotor assembly 500 is subjected to during operation. Regardless of whether magnets 510 abut fingers 506 or are spaced apart from fingers 506, a connector 513 is inserted into the aligned grooves 522, 518 to secure magnet 510 within magnet pocket 508. Where a gap 530 is formed, connectors 513 are also utilized to maintain the spaced apart relationship between each magnet 510 the adjacent fingers 506 forming a finger pocket 508 in which the magnet 510 is positioned.

Although the embodiments of FIGS. 9A-9E are shown with connectors 513, in other embodiments, connector 513 can be eliminated. In such case, it will be appreciated that during manufacturing, an adhesive or bonding material may flow into the finger groove 522 and magnet groove 518, as well as any gap 530, and upon curing and hardening of the adhesive or bonding material, the magnets 510 are secured in pockets 508 by the hardened material.

Figure 10A:
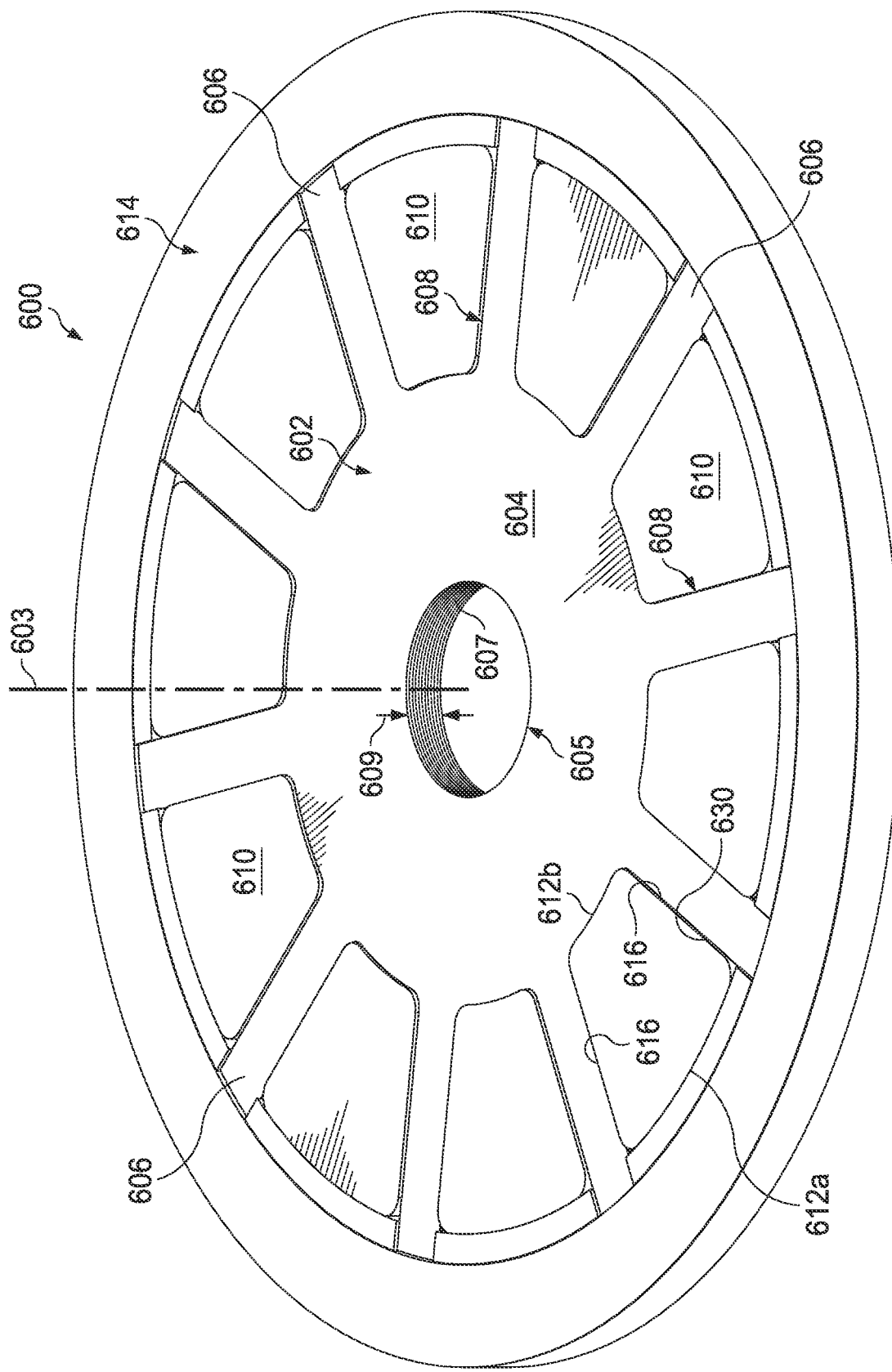
FIG. 10A is a perspective view of an embodiment of a rotor assembly with stress relief spacers between each magnet and the outer ring.
Figure 10B:
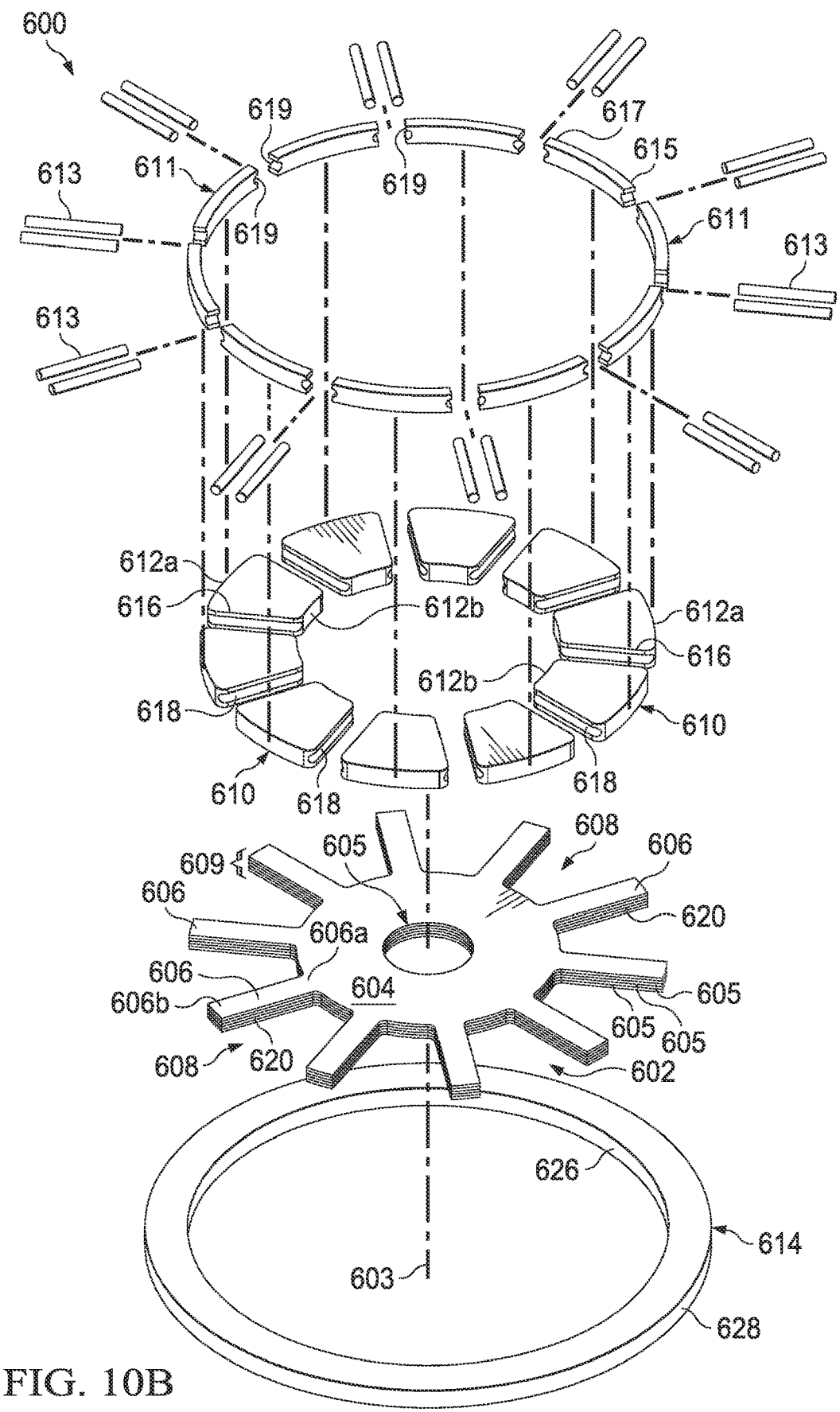
FIG. 10B is an exploded view of the rotor assembly of FIG. 10A.

FIGS. 10A and 10B illustrate another embodiment of a rotor assembly 600. In this embodiment, rotor assembly 600 includes a spider shaped rotor core 602 formed along a rotor axis 603 and having a central hub 604 from which fingers 606 radially extend. Although not necessary, in this embodiment, rotor core 602 is shown as having a plurality of fiber layers 605 formed together in a fiber layer stack 609 as generally described above. Fingers 606 are spaced apart from one another around the perimeter of hub 604 so as to form magnet pockets 608 between adjacent fingers 606. Each magnet pocket 608 is disposed to receive a magnet 610. A rotor ring 614 is disposed radially outward from fingers 606. In addition, an outer radial element 611 is positioned as spacers between each magnet 610 and the rotor ring 614, much in the same way as described above with respect to FIGS. 6B and 8.

Each magnet 610 has a radial outer edge 612a of a greater length than a radial inner edge 612b which radial edges 612a, 612b are joined by side edges 616. In one or more embodiments, at least one and preferably each magnet side edge 616 includes a magnet groove or slot 618 extending along at least a portion of the length of side edge 616. Magnet groove 618 is not limited to a particular shape but in some embodiments may be arcuate or rectangular in cross-section.

Similarly, each finger 606 has a side edge 620 that extends from a proximal finger end 606a adjacent the hub 604 to a distal finger end 606b at the periphery of the rotor core 602. In the illustrated embodiments, the side edges 620 of fingers are smooth, but in other embodiments, may include a finger groove or slot as described in FIG. 9.

In one or more embodiments, rotor ring 614 is a preformed ring that is positioned around rotor core 602. Rotor ring 614 has a radial inner edge 626 and a radial outer edge 628, where radial inner edge 626 abuts outer radial element 611 when rotor ring 614 is positioned around rotor core 602.

A connector 613 is disposed to seat in each magnet groove 618. In this embodiment, connector 613 may be semicircular in cross-section with an arcuate face that engages groove 618 and a flat face that abuts the smooth edge 620 of finger 606.

Outer radial elements 611 are elongated with a first end 615 and a second end 617, and generally arcuate in shape to engage the radial inner edge 626 of rotor ring 614 as specifically shown in FIG. 10B. One or both ends 615, 617 may also include a notch 619 to allow a connector 613 to pass therethrough. In one or more embodiments, in addition to securing magnet 610 as described above, connector 613 may also secure outer radial element 611 within a magnet pocket 608 between a magnet 610 and the rotor ring 614.

Figure 11A:
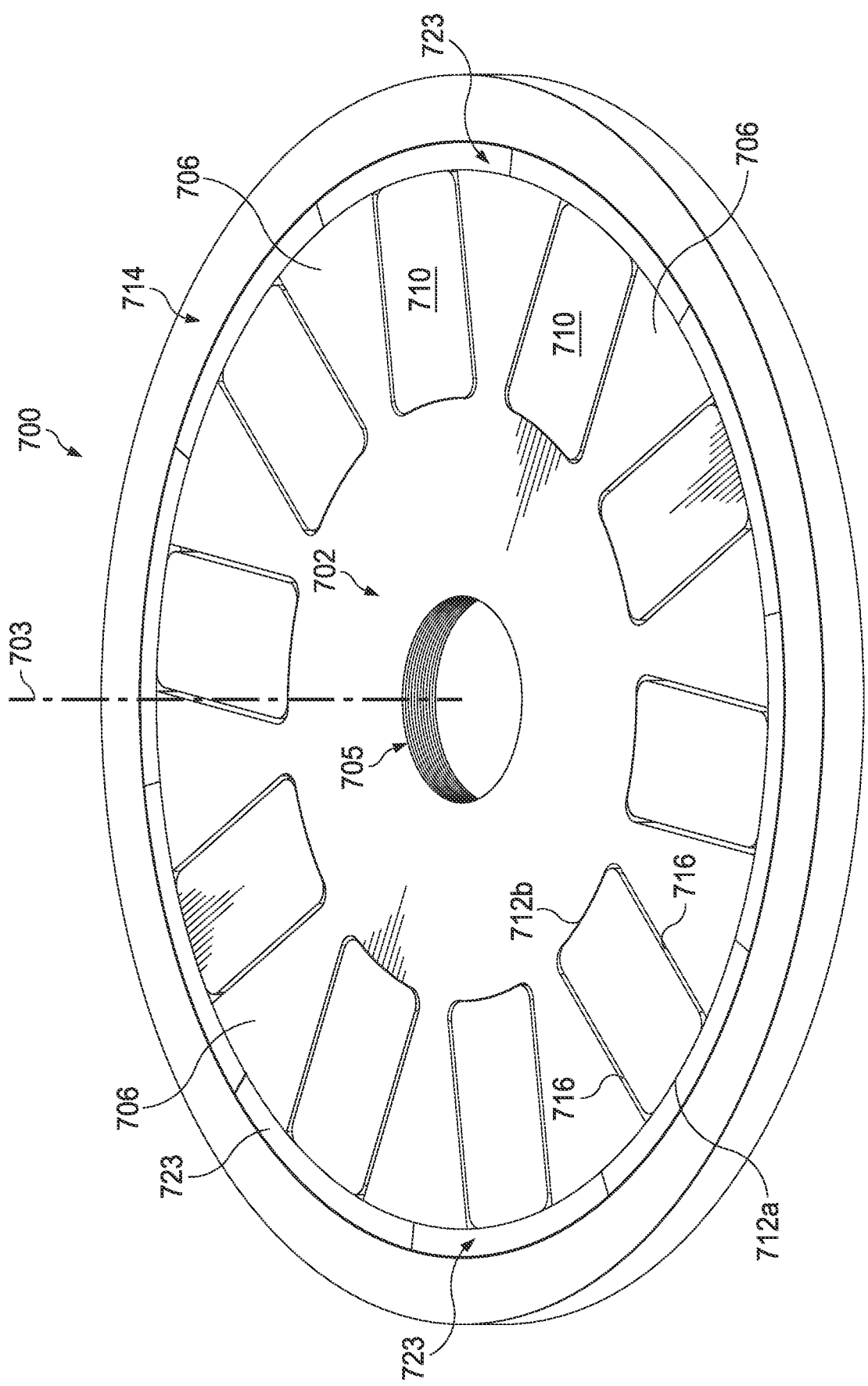
FIG. 11A is a perspective view of another embodiment of a rotor assembly with stress relief spacers between each magnet and the outer ring.
Figure 11B:
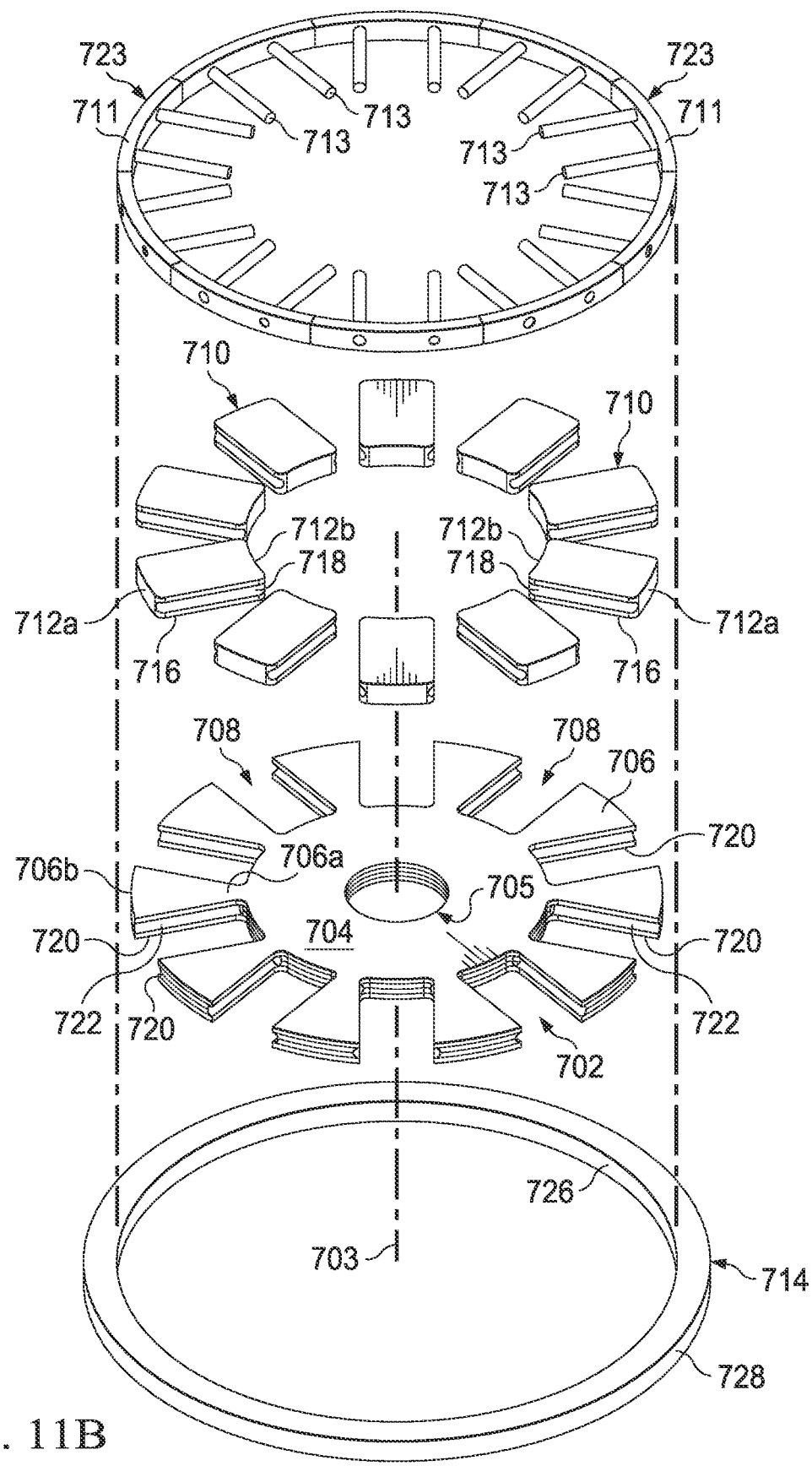
FIG. 11B is an exploded view of the rotor assembly of FIG. 11A.

FIGS. 11A and 11B illustrate another embodiment of a rotor assembly 700 in assembled and exploded, respectively. In this embodiment, as shown in FIG. 11A, rotor assembly 700 includes a spider shaped rotor core 702 formed along a rotor axis 703 and having a central hub 704 from which fingers 706 radially extend. Fingers 706 are spaced apart from one another around the perimeter of hub 704 so as to form magnet pockets 708 between adjacent fingers 706. Each magnet pocket 708 is disposed to receive a magnet 710. A rotor ring 714 is disposed radially outward from fingers 706. Each magnet 710 is supported in a magnet pocket 708 by at least one connector assembly 723 positioned between the magnet 710 and the rotor ring 714.

In one or more embodiments, rotor core 702 may be formed of a plurality of fiber layers bonded together in a fiber layer stack as generally described above, while in other embodiments, rotor core 702 may be formed in other ways.

With reference to FIG. 11B and ongoing reference to FIG. 11A, each magnet 710 has a radial outer edge 712a and a radial inner edge 712b which radial edges 712a, 712b are joined by side edges 716. In one or more embodiments, at least one and preferably each magnet side edge 716 includes a magnet groove or slot 718 extending along at least a portion of the length of side edge 716. Magnet groove 718 is not limited to a particular shape but in some embodiments may be arcuate or rectangular in cross-section. In the illustrated embodiment, the radial side edges 716 of a magnet are substantially parallel so that each magnet 710 is generally rectangular in shape. In addition, one or both radial edges 712a, 712b may be arcuate as illustrated.

Similarly, each finger 706 has a side edge 720 that extends from a proximal finger end 706a adjacent the hub 704 to a distal finger end 706b at the periphery of the rotor core 702. Each finger 706 is generally triangular or wedge-shaped, such as discussed above with respect to FIG. 7. As such, the proximal end 706a of a finger 706 is substantially narrower in width than the distal end 706b of finger 706 as is also illustrated above in FIG. 7. It will be appreciated that because each finger 706 is wedged shaped, when arranged around rotor core 702, each set of adjacent wedged shaped fingers 706 that define a magnet pocket 708 have opposing side edges 720 that are substantially parallel such that the magnet pocket 708 formed by the adjacent fingers 706 is substantially rectangular for receipt of a substantially rectangular magnet 710.

In the illustrated embodiments, each side edge 720 of a finger 706 includes a finger groove or slot 722 extending along at least a portion of the length of side edge 720 between the proximal finger end 706a and the distal finger end 706b. Finger groove 722 is not limited to a particular shape but in some embodiments may be arcuate or rectangular in cross-section. Moreover, in one or more embodiments finger groove 722 has the same cross-sectional shape as magnet groove 718 so as to mirror one another.

Each connector assembly 723 includes an outer radial element 711 from which extends two connectors 713 so as to be parallel to one another. A connector 713 is disposed to engage the opposing finger groove 722 and magnet groove 718 of a magnet pocket 708. Although connector 713 is not limited to a particular shape, where an opposing finger groove 722 and magnet groove 718 are each semi-circular in cross-section such as is shown in FIG. 1/A, then connector 713 may be a round pin, such as is shown. Likewise, where an opposing finger groove 722 and magnet groove 718 are each rectangular in cross-section, then connector 713 may be a square pin or rectangular blade.

Figure 11C:
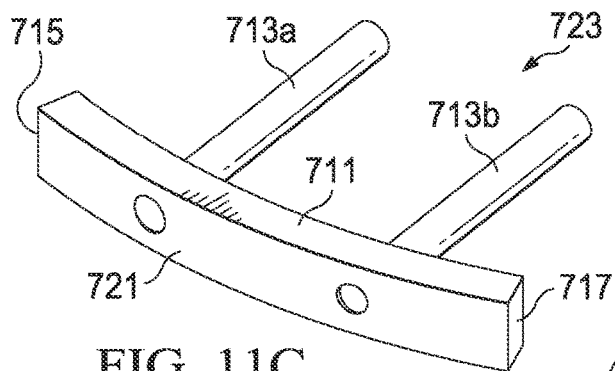
FIG. 11C is an enlarged perspective view of the connection between magnets and fingers of the rotor assembly of FIG. 11A.
Figure 11D:
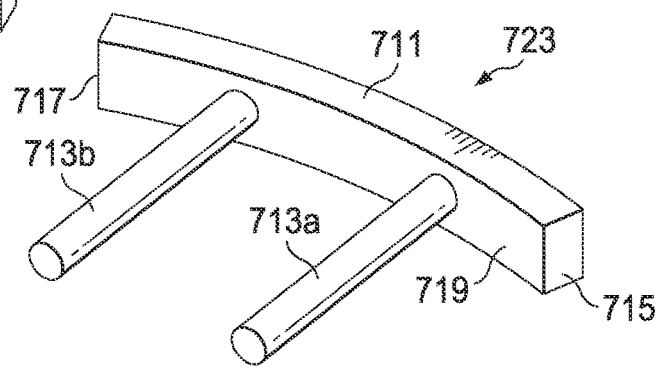
FIGS. 11D and 11E are perspective views of a connector assembly utilized in the rotor assembly of FIG. 11A.

As best seen in FIGS. 11C and 11D, in the illustrated embodiment, the two connectors 713a, 713b of a connector assembly 723 are disposed to extend from outer radial element 711. More specifically, each outer radial element 711 includes two spaced apart, substantially parallel connectors 713a, 713b extending from the outer radial element 711, thereby forming a connector assembly 723. Each outer radial element 711 is elongated, with a first end 715 and a second end 717, and an inner surface 719 and an outer surface 721, where one or both surfaces, 719, 721 in some embodiments may be generally arcuate in shape. In such embodiments, an arcuate outer surface 721 may be disposed to engage the radial inner edge 726 of rotor ring 714 as specifically shown in FIG. 11B. The first and second connectors 713a, 713b of a connector assembly 723 are parallel to one another and extend from the inner surface 719 of an outer radial element 711. In this embodiment, first and second connectors 713a, 713b are spaced inwardly from the first and second ends 715, 717, respectively, of the outer radial element 711.

Figure 11E:
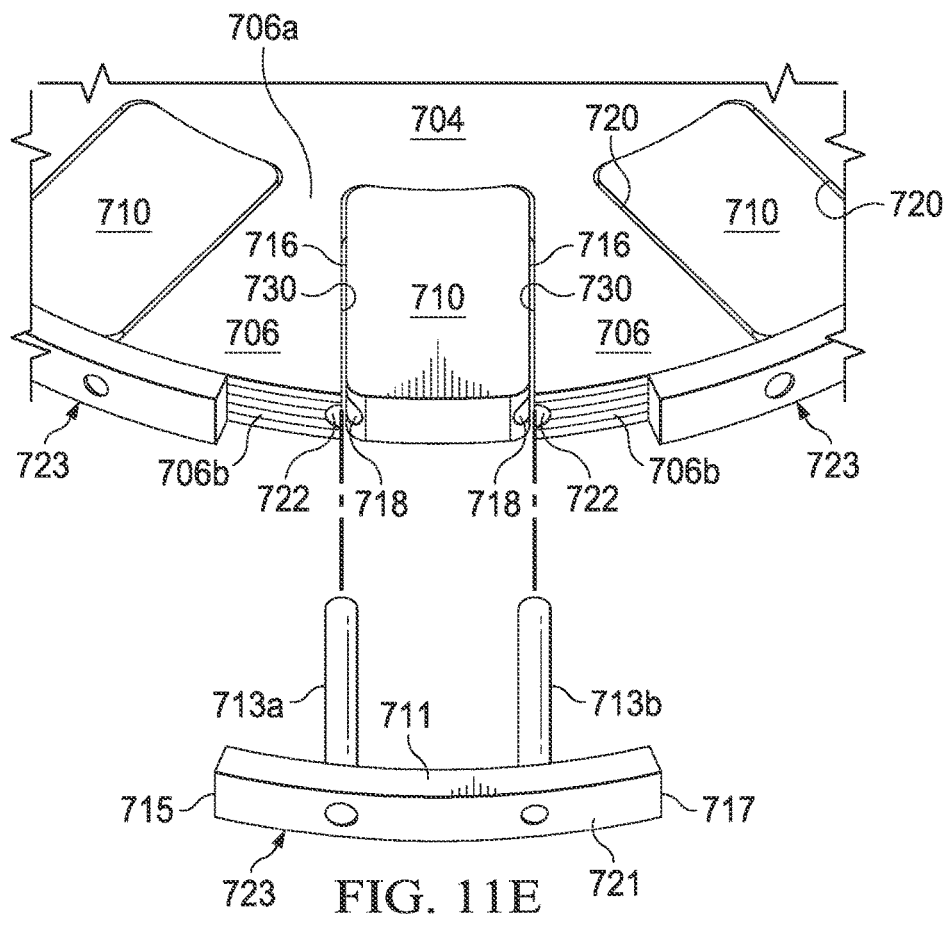

Turning FIG. 11E, rotor assembly 700 is shown partially assembled, but with rotor ring 714 removed thereby illustrating the positioning of magnets 710 in magnet pockets 708. Each magnet 710 is positioned in a magnet pocket 708 so that finger grooves 722 align with magnet grooves 718. In one or more embodiments, magnets 710 are positioned in magnet pockets 708 so as to be spaced apart from adjacent fingers 706 such that a gap 730 is formed between each magnet edge 716 and each finger side edge 720. It has been found that by holding magnet 710 in a spaced apart relationship to finger 706, stresses on magnets 710 are reduced, particularly during the high RPMs to which rotor assembly 700 is subjected to during operation. Regardless of whether magnets 710 abut fingers 706 or are spaced apart from fingers 706, a set of connectors 713a, 713b of a connector assembly 723 are inserted into the aligned grooves 722, 718 to secure the magnet 710 within a magnet pocket 708. Where a gap 730 is formed, connectors 713a, 713b are also utilized to maintain the spaced apart relationship between each magnet 710 the adjacent fingers 706 forming a finger pocket 708 in which the magnet 710 is positioned.

As best seen in FIGS. 11A and 11C, in the illustrated embodiment the length of each outer radial element 711 is selected so that it overlays the outer radial edge 712 of a magnet 710 a portion of the distal finger end 706b of two adjacent fingers 706 that form a magnet pocket 708.

Figure 12A:
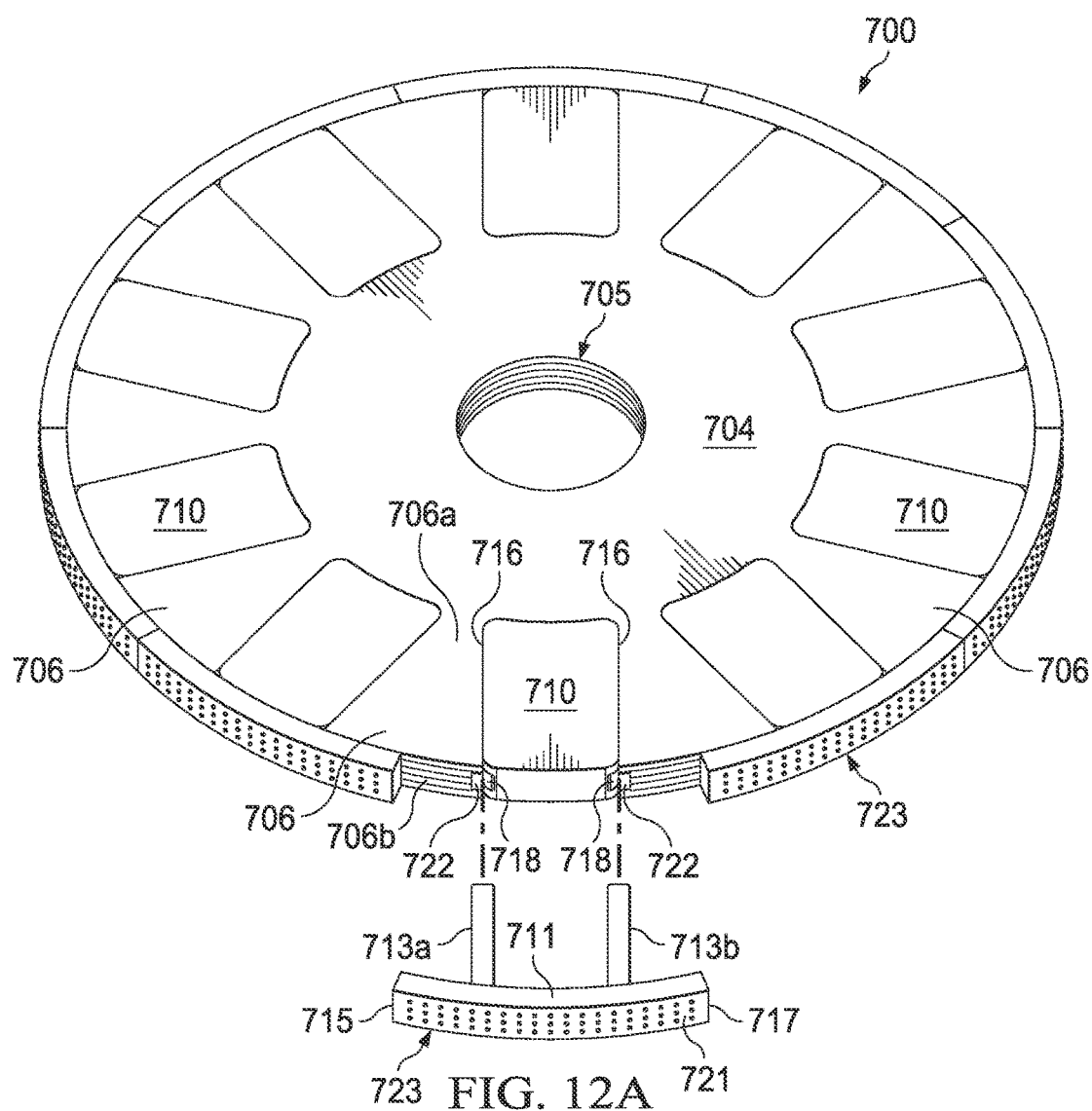
FIG. 12A is a partial assemble perspective view of another embodiment of the rotor assembly of FIG. 11C but with alternative connector assemblies.
Figure 12B:
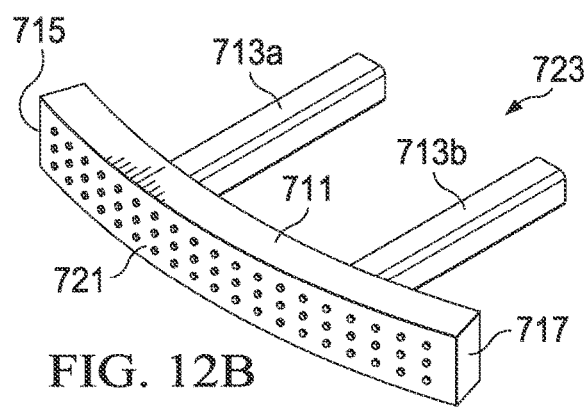
FIGS. 12B and 12C are perspective views of a connector assembly utilized in the rotor assembly of FIG. 12A.
Figure 12C:
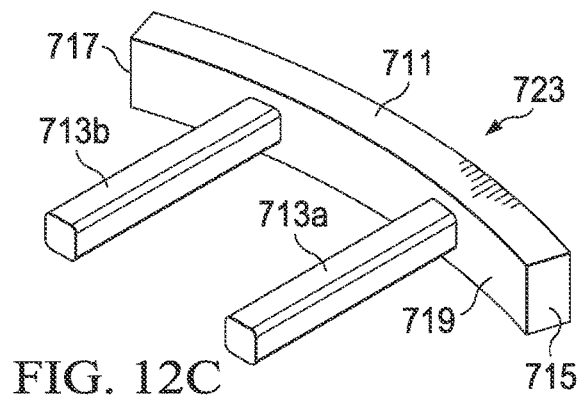

FIGS. 12A, 12B and 12C illustrate another embodiment of rotor assembly 700 and connector assemblies 723 shown in FIGS. 11A-11D, but with connectors 713 being a square pin to engage rectangular shaped finger grooves 722 and magnet grooves 718.

FIGS. 12C and 12D illustrate another embodiment of rotor assembly 700 and connector assemblies 723 shown in FIGS. 12A and 12B, but where each finger 706 includes a notch 725 formed in the side edge 720 at the distal finger end 706b. In such case, the length of each outer radial element 711 is selected so that connector assembly 725 seats in opposing notches 725 and fits between opposing fingers 706 forming a magnet pocket 708. In this embodiment, first and second connectors 713a, 713b are adjacent the first and second ends 715, 717, respectively, of the outer radial element 711.

Figure 13A:
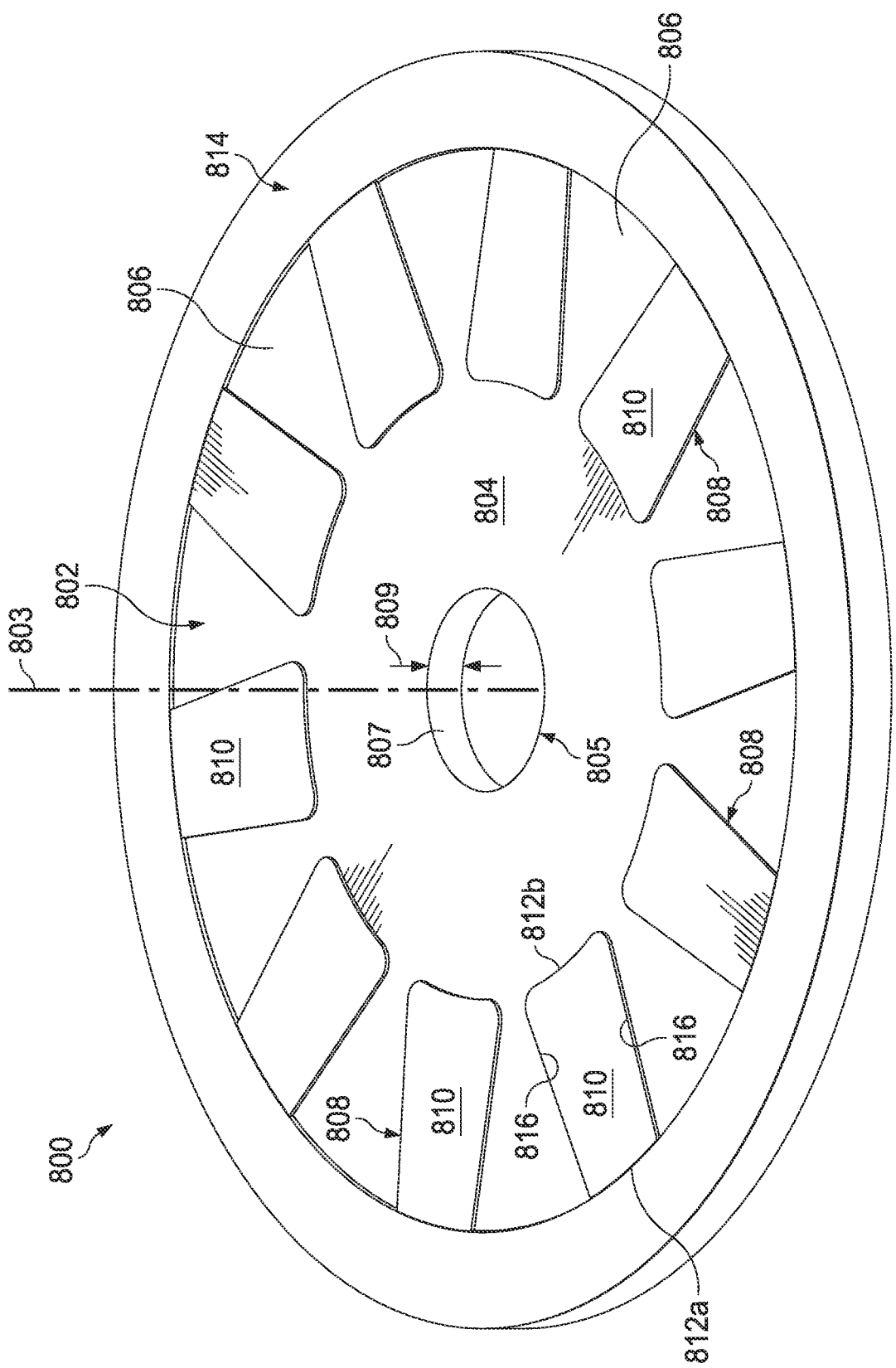
FIG. 13A is a perspective view of an embodiment of a rotor assembly with trapezoidal shaped magnets and magnet pockets.
Figure 13B:
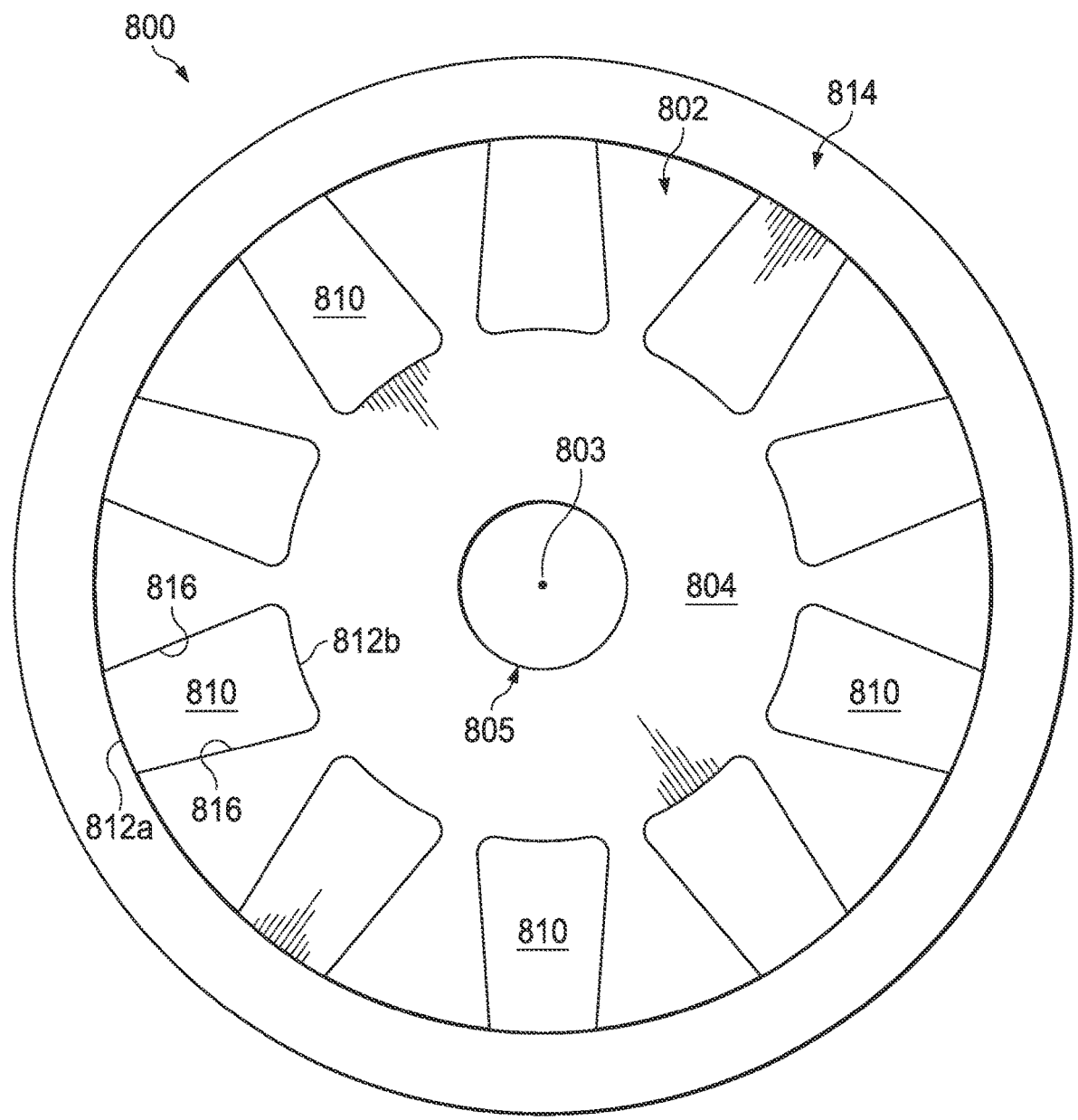
FIG. 13B is plan view of the rotor assembly of FIG. 13A.

FIGS. 13A-13D illustrate another embodiment of a rotor assembly 800. In FIGS. 13A and 13B, rotor assembly 800 includes a spider shaped rotor core 802 formed along a rotor axis 803 and having a central hub 804 from which fingers 806 radially extend. In one or more embodiments, rotor core 802 may be formed of a plurality of fiber layers 807 compressed together in a fiber layer stack 809 as generally described above, while in other embodiments, rotor core 802 may be formed in other ways, such as machining. An aperture 805 may be formed in central hub 804 for receipt of a rotor shaft (see FIG. 1). Fingers 806 are wedge or triangular in shaped and spaced apart from one another around the perimeter of hub 804 so as to form trapezoidal shaped magnet pockets 808 between adjacent fingers 806. Each magnet pocket 808 is disposed to receive a trapezoidal shaped magnet 810. A rotor ring 814 is disposed radially outward from fingers 806.

Figure 13C:
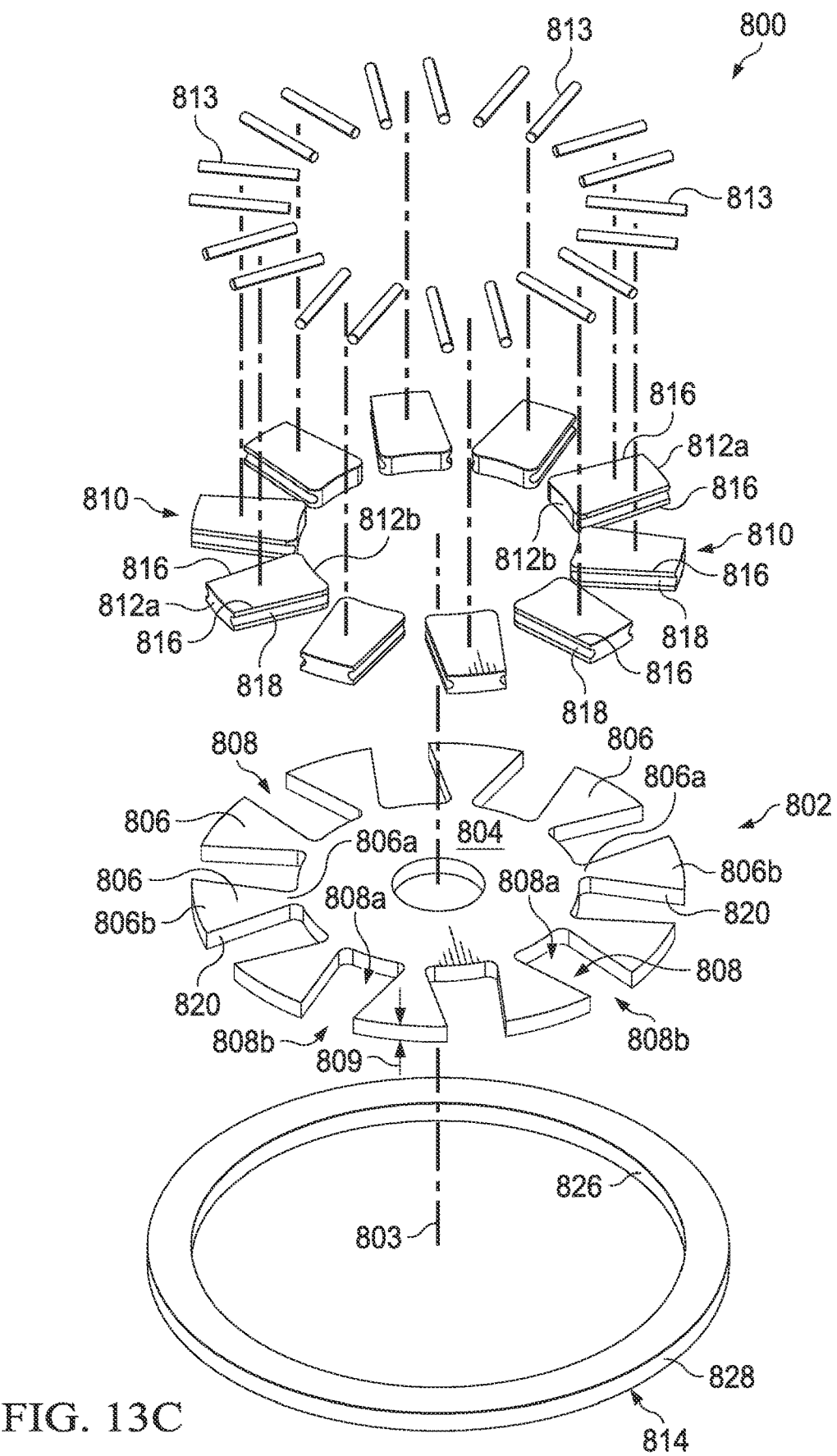
FIG. 13C is an exploded view of the rotor assembly of FIG. 13A.

FIG. 13C is an exploded view of rotor assembly 800 where it can be seen that each magnet 810 may be supported in a magnet pocket 808 by at least one connector 813. In other embodiments of rotor assembly 800, connector 813 may be eliminated, as generally described above.

Each magnet 810 has a radial outer edge 812a and a radial inner edge 812b which radial edges 812a, 812b are joined by side edges 816. The radial inner edge 812b of a magnet 810 has a greater length than the radial outer edge 812a such that the magnet 810 is trapezoidal in shape. In one or more embodiments, at least one and preferably each magnet side edge 816 includes a magnet groove or slot 818 extending along at least a portion of the length of side edge 816. Magnet groove 818 is not limited to a particular shape but in some embodiments may be arcuate or rectangular in cross-section. In the illustrated embodiment, each radial side edges 816 of a magnet angles or tapers inward from the radial inner edge 812b. In addition, one or both radial edges 812a, 812b may be arcuate as illustrated.

In one or more embodiments, magnets 810 may be positioned in magnet pockets 808 so as to be spaced apart from adjacent fingers 806 and/or central hub 804 so as to form a gap therebetween as generally described above.

Each finger 806 has a side edge 820 that extends from a proximal finger end 806a adjacent the hub 804 to a distal finger end 806b at the periphery of the rotor core 802. Each finger 806 is generally triangular or wedge-shaped. As such, the proximal end 806a of a finger 806 is substantially narrower in width than the distal end 806b of finger 806. In the illustrated embodiment, the side edges 820 of each finger 806 angle outwardly from proximal end 806a to define a magnet pocket 808 that is trapezoidal in shape, being wider at the base of the magnet pocket 808 adjacent hub 804 and narrower adjacent the distal end 806b of fingers 806. In the illustrated embodiments, the side edges 820 of fingers are smooth, but in other embodiments, may include a finger groove or slot as described in FIG. 9.

Connector 813 is disposed to seat in each magnet groove 818. In this embodiment, connector 813 may be semicircular in cross-section with an arcuate face that engages groove 818 and a flat face that abuts the smooth edge 820 of finger 806.

It will be appreciated that because magnets 810 are trapezoidal in shape, magnet pockets 808 are likewise trapezoidal in shape so that each magnet pocket 808 is wider at a proximal end 808a and narrower at a distal end 808b (as opposed to the rectangular shaped magnet pockets shown in FIGS. 11A-11E).

In any event, because of their trapezoidal shape, magnets 810 may be secured in magnet pockets 808 by fingers 806 without the need for connectors 813 or even a rotor ring 813 to secure magnets 810 within magnet pockets 808. Thus, as described above, in some embodiments of rotor assembly 800, connectors 813, and even magnet grooves 818 may be eliminated. Likewise, for this reason, rotor ring 814 may be eliminated.

While unnecessary to secure magnets 810 within magnet pockets 808, in some embodiments, rotor ring 814 may be provided to strength rotor assembly 800 and in particular to provide support for fingers 806. In such embodiments, magnets 810 may be sized so that the radial outer edge 812a of a magnet 810 is spaced apart from the radial inner edge 826 of rotor ring 814 so as to form a radial gap between the magnet 810 and the rotor ring 814, reducing the likelihood of stress on magnets 810 from rotor ring 814 during operation. In other embodiments, rotor ring 814 may abut the radial outer edge 812a of magnet 810.

Figure 14A:
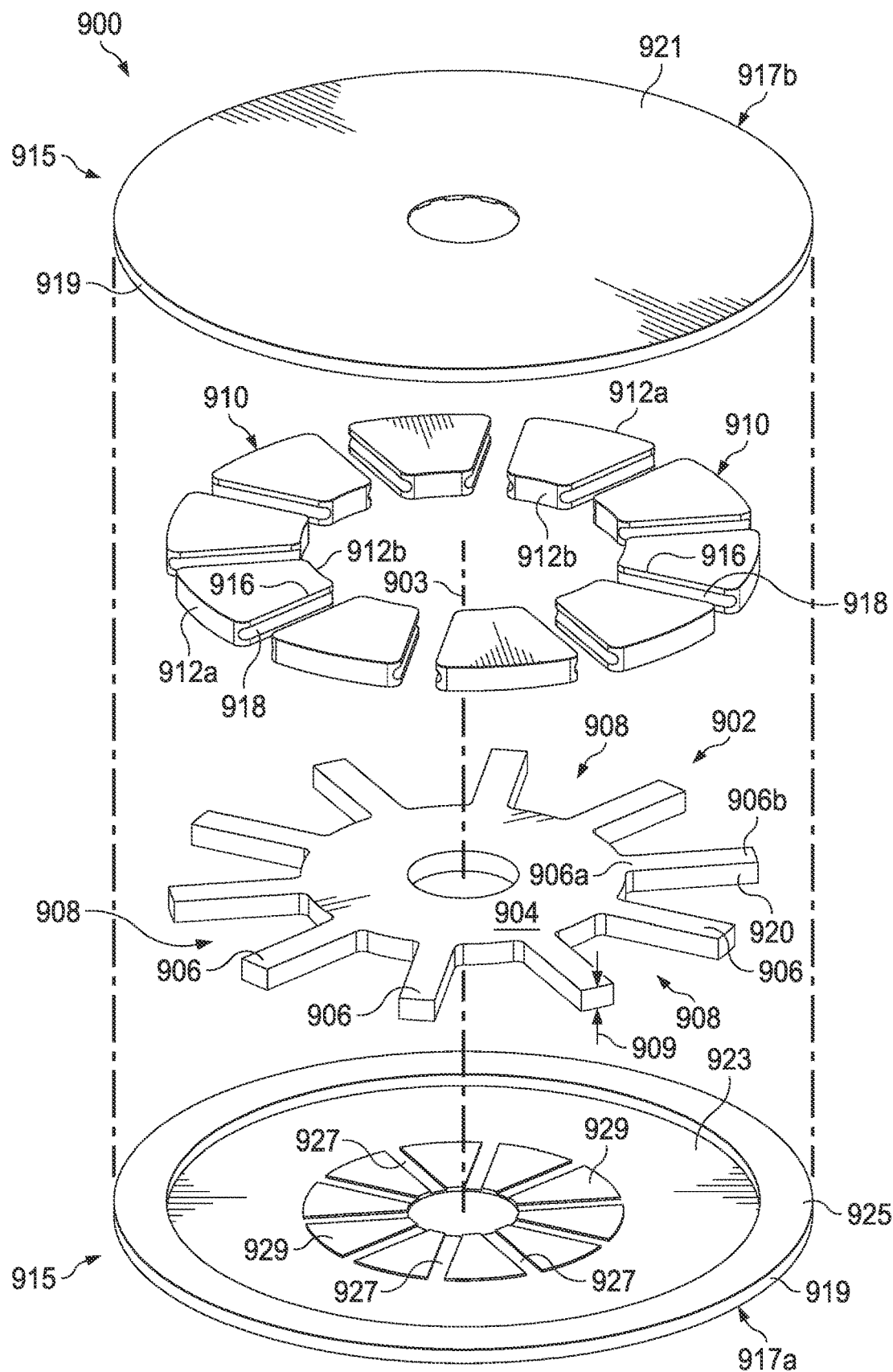
FIG. 14A is an exploded view of another embodiment of a rotor assembly of the disclosure.

FIG. 14A is an exploded view of another embodiment of a rotor assembly 900 where rotor assembly 900 includes a spider shaped rotor core 902 disposed about an axis 903 and having a central hub 904 from which fingers 906 radially extend. In one or more embodiments, rotor core 902 may be formed of a plurality of fiber layers 907 bonded together in a fiber layer stack 909 as generally described above, while in other embodiments, rotor core 902 may be formed in other ways. Fingers 906 are spaced apart from one another around the perimeter of hub 904 so as to form magnet pockets 908 between adjacent fingers 906. Each magnet pocket 908 is disposed to receive a magnet 910. A retaining cover assembly 915 having a first plate 917a and a second plate 917b may be utilized to axially enclose and secure rotor core 902 and magnets 910 axially relative to one another.

Figure 14B:
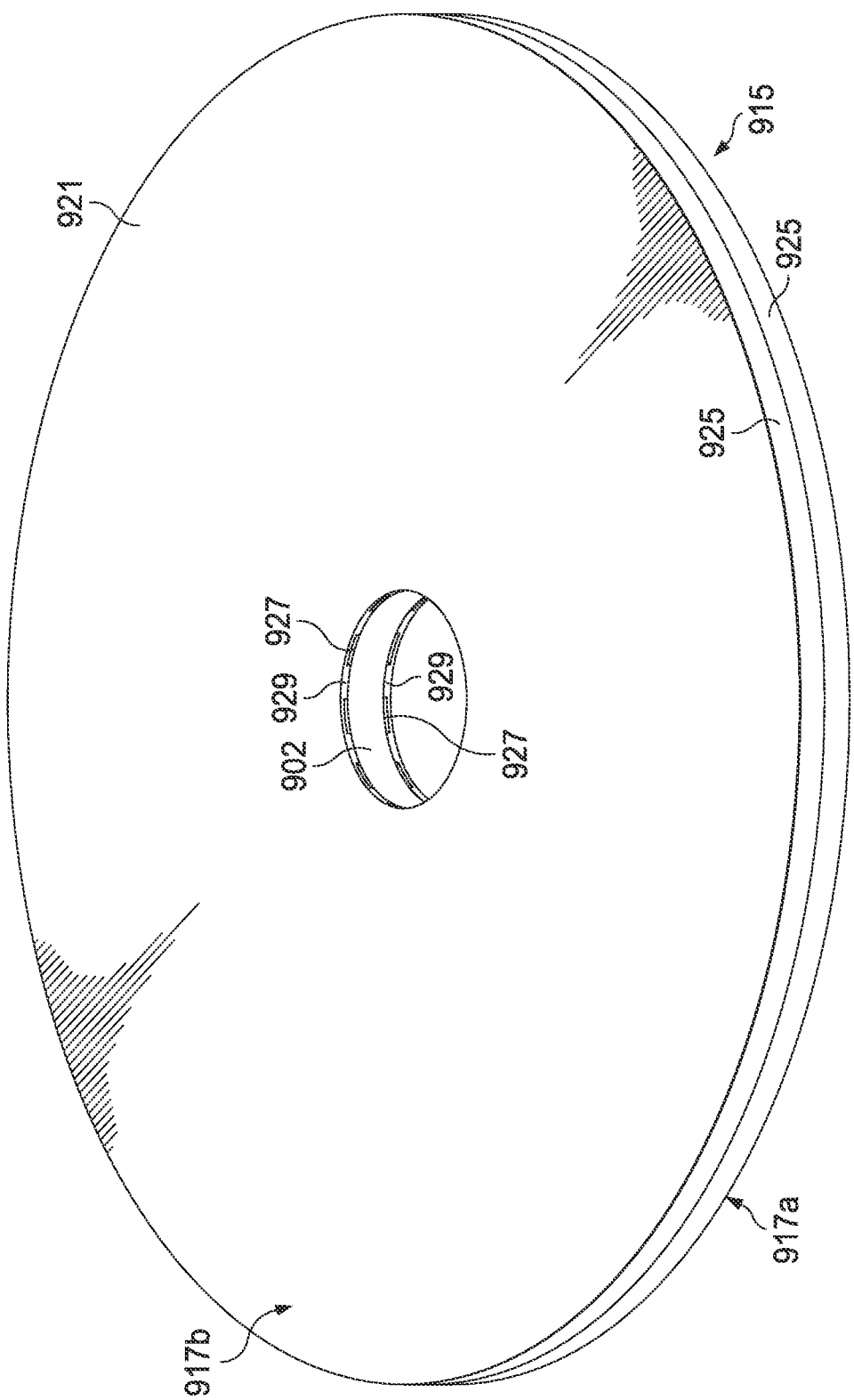
FIG. 14B is a perspective view of the rotor assembly of FIG. 14A.

Each plate 917 is circular and includes an outer radial edge 919, an outer surface 921 and an inner surface 923. Retaining cover assembly 915 may be utilized in one or more of the rotor assembly embodiments described above to provide axial support to rotor core 902 and magnets 910 along axis 903. In some embodiments of rotor assembly 900, a rotor ring such as described above may be disposed radially outward of fingers 906 and cooperate with retaining cover assembly 915. In this regard, in some embodiments, the opposing plates 917a, 917b also may axially enclose the rotor ring to provide axial support to the rotor ring. In other embodiments, the outer radial edge 919 of the plates 917a, 917b abuts the inner radial edge of the rotor ring. In the embodiment shown in FIG. 14A, each plate 917 includes an outer radial lip 925 integrally formed on the inner surface 923 of plate 917 adjacent the outer radial edge 919. In such embodiments, the outer radial lip 925 of each plate 917 may replace the rotor ring described in other embodiments above. In this regard, as best seen in FIG. 14B, when rotor assembly 900 is assembled, retaining cover assembly 915 fully encloses rotor core 902 and magnets 910 both in the axial and radial directions, and specifically, the radial lip 925 of the two opposing plates 917a, 917b abut one another.

In one or more embodiments, rotor assembly 900 includes internal rotor cooling channels 927 formed to allow air to flow between magnets 910. In some embodiments, cooling channels 927 may be formed by providing seats 929 on the inner surface 923 of one or both plates 917a, 917b.

In embodiments of rotor assembly 900, each magnet 910 may be supported in a magnet pocket 908 in a variety of different ways as generally described above, whether with connectors or the shape of fingers 907 or with a rotor ring or even with radial lips 925, and embodiments of rotor assembly 900 with internal rotor cooling channels 927 is not limited in this regard.

Each magnet 910 has a radial outer edge 912a and a radial inner edge 912b which radial edges 912a, 912b are joined by side edges 916. In one or more embodiments, at least one and preferably each magnet side edge 916 includes a magnet groove or slot 918 extending along at least a portion of the length of side edge 916.

Similarly, each finger 906 has a side edge 920 that extends from a proximal finger end 906a adjacent the hub 904 to a distal finger end 906b at the periphery of the rotor core 902. Each side edge 920 of a finger 906 may include a finger groove or slot (not shown in FIG. 14A but described above in various embodiments) extending along at least a portion of the length of side edge 920 between the proximal finger end 906a and the distal finger end 906b.

A connector (not shown in FIG. 14A but as described above in various embodiments) may be disposed to engage the opposing finger groove and magnet groove 918.

Formed on the inner surface 923 of a plate 917 are one or more raised seats 929 supporting rotor core 902. In one or more embodiments, a plurality of spaced apart raised seats 929 are formed around axis 903. Each raised seat 929 is spaced apart from an adjacent seat 929 to partially define a cooling channel 927 therebetween. In the illustrated embodiment, a plurality of wedge-shaped raised seats 929 are formed on the inner surface 923 of plate 917 centrally about axis 903 and extend radially outward towards outer radial edge 919, thereby defining a plurality of cooling channels 927. In this embodiment, the raised seats 929 are also spaced apart from outer radial edge 919 of plate 917. Rotor core 902 is positioned on the raised seats 929 so that the central hub 904 engages the raised seats 929 and fingers 906 align with the cooling channels 927 so that each finger 906 extends along a cooling channel 927. Thus, in some embodiments, each raised seat 929 is formed to extend radially outward no more than the outer diameter of central hub 904 when central hub 904 is seated against plate 917. In any event, when rotor core 902 abuts raised seats 929 as described, fingers 906 are spaced apart from the inner surface 923 of plate 917 such that the cooling channels 927 continue to extend outward along the length of fingers 906. In one or more embodiments, the seats 929 may be wedge-shaped and positioned around an aperture 933 formed in plate 917.

In one or more embodiments, as best seen in FIGS. 14C and 14D, magnet thickness Tm is greater than finger thickness Tf so that the cooling channel 927 defined along a finger 906 extends between successive magnets 910 when magnets 910 are positioned radially outward of raised seats 929 in magnet pockets 908 formed between adjacent fingers 906. It will be appreciated that in such an embodiment, a cooling channel 927 extends along a portion of each side edge 916 of a magnet 910. Where a plate 917 includes a radial lip 925, each magnet 910 may be positioned and secured radially between a raised seat 929 and the radial lip 925. In such case, magnet 910 abuts the inner surface 923 of plate 917. Where both plates 917a, 917b include raised seats 929 as described, rotor assembly 900 defines four cooling channels 927 around each magnet 910. Finally, in one or more embodiments, cooling channels 927 are radially extending. Alternatively, or in addition thereto, cooling channels may also be circumferentially extending channels 931 formed in seat 929. Such circumferentially extending channels 931 may interconnect radially extending cooling channels. While not shown, in other embodiments, additional seats 929 may be formed on the interior surface 923 of a plate 917 adjacent the distal end 906b of each finger to provide additional support to a finger 906.

Thus, a rotor assembly for an axial flux motor has been described. In one or more embodiments, the rotor assembly generally includes a rotor hub with a plurality of radially extending, spaced apart fingers with adjacent fingers forming a magnet pocket therebetween; a magnet positioned in each magnet pocket of the rotor core; and a rotor ring extending around the periphery of the rotor core, wherein the rotor core comprises a plurality of fiber layers formed together in a fiber layer stack, with each fiber layer having a set of primary fibers extending in a select direction and wherein the sets of primary fibers of adjacent fiber layers extend in different directions. In other embodiments, the rotor assembly may include a rotor core having a rotor hub with a plurality of radially extending, spaced apart fingers with adjacent fingers forming a magnet pocket therebetween; a magnet positioned in each magnet pocket of the rotor core; and a rotor ring extending around the periphery of the rotor core, wherein the rotor core comprises a plurality of material layers formed together in a material layer stack. Likewise, an axial flux motor has been described. In one or more embodiments, the axial flux motor may include at least one stator assembly disposed along an axis; a rotor assembly disposed along the axis and spaced apart from the at least one stator assembly, the rotor assembly comprising a rotor core having a rotor hub with a plurality of radially extending, spaced apart fingers with adjacent fingers forming a magnet pocket therebetween; a magnet positioned in each magnet pocket of the rotor core; and a rotor ring extending around the periphery of the rotor core, wherein the rotor core comprises a plurality of fiber layers formed together in a fiber layer stack, with each fiber layer having a set of primary fibers extending in a select direction and wherein the sets of primary fibers of adjacent fiber layers extend in different directions. In other embodiments, the rotor assembly generally includes a rotor core having a rotor hub with a plurality of radially extending, spaced apart fingers forming a magnet pocket between adjacent fingers; a magnet positioned in each magnet pocket of the rotor core; wherein the rotor core comprises a plurality of fiber layers formed together in a fiber layer stack, with each fiber layer comprises a material having a set of primary fibers extending in a select direction and wherein the sets of primary fibers of adjacent fiber layers extend in different directions. In yet other embodiments, the rotor assembly may include a rotor core having a rotor hub with a plurality of radially extending, spaced apart fingers forming a magnet pocket between adjacent fingers; a magnet positioned in each magnet pocket of the rotor core; wherein the rotor core comprises a plurality of fiber layers formed together in a fiber layer stack. In yet other embodiments, the rotor assembly may include a rotor core having a rotor hub with a plurality of radially extending, spaced apart fingers forming a magnet pocket between adjacent fingers; a magnet positioned in each magnet pocket of the rotor core; a rotor ring extending around the periphery of the rotor core; and a spacer positioned radially outward of each magnet between the magnet and the rotor ring. In yet other embodiments, the rotor assembly may include a rotor core having a rotor hub with a plurality of radially extending, spaced apart fingers forming a magnet pocket between adjacent fingers; a magnet positioned in each magnet pocket of the rotor core; and a rotor ring extending around the periphery of the rotor core; wherein each magnet has a radial outer edge and a radial inner edge which radial edges are joined by side edges; and wherein each side edge has a groove formed therein along at least a portion of the length of the side edge. In yet other embodiments, the rotor assembly may include a rotor core having a rotor hub with a plurality of radially extending, spaced apart fingers forming a magnet pocket between adjacent fingers; a magnet positioned in each magnet pocket of the rotor core, wherein each magnet has a radial outer edge and a radial inner edge which radial edges are joined by side edges; and wherein each side edge has a groove formed therein along at least a portion of the length of the side edge; a rotor ring extending around the periphery of the rotor core; and a hardened bonding material between each finger and an adjacent magnet side edge, the hardened bonding material disposed in the groove of the adjacent magnet. In yet other embodiments, the rotor assembly may include a rotor core having a rotor hub with a plurality of radially extending, spaced apart fingers forming a magnet pocket between adjacent fingers, wherein each finger has two finger side edges extending from a proximal finger end adjacent the rotor hub to a distal finger end at a periphery of the rotor core, and wherein each finger side edge has a finger groove formed therein along at least a portion of the length of the finger side edge; a magnet positioned in each magnet pocket of the rotor core, wherein each magnet has a radial outer edge and a radial inner edge which radial edges are joined by magnet side edges; and wherein each side edge has a magnet groove formed therein along at least a portion of the length of the magnet side edge, wherein at least one finger groove of the fingers aligns with at least one magnet groove of the magnets; a rotor ring extending around the periphery of the rotor core; and a connector inserted in the aligned finger groove and magnet groove. In yet other embodiments, the rotor assembly may include a rotor core having a rotor hub with a plurality of radially extending, spaced apart fingers forming a magnet pocket between adjacent fingers, wherein each finger has two finger side edges extending from a proximal finger end adjacent the rotor hub to a distal finger end at a periphery of the rotor core; a magnet positioned in each magnet pocket of the rotor core, wherein each magnet has a radial outer edge and a radial inner edge which radial edges are joined by magnet side edges; and a rotor ring extending around the periphery of the rotor core; wherein the magnet side edge is spaced apart from the finger side edge on each side of each magnet. In yet other embodiments, the rotor assembly may include a rotor core having a rotor hub with a plurality of radially extending, spaced apart, wedge shaped fingers forming a magnet pocket between adjacent fingers, wherein each finger has two finger side edges extending from a proximal finger end adjacent the rotor hub to a distal finger end at a periphery of the rotor core, wherein the finger side edges of adjacent fingers forming a magnet pocket are parallel with one another, and wherein each finger side edge has a finger groove formed therein along at least a portion of the length of the finger side edge; a magnet positioned in each magnet pocket of the rotor core, wherein each magnet has a radial outer edge and a radial inner edge which radial edges are joined by magnet side edges that are parallel to one another, and wherein each magnet side edge has a magnet groove formed therein along at least a portion of the length of the magnet side edge, wherein at least one finger groove of the fingers aligns with at least one magnet groove of the magnets; and a connector assembly adjacent the radial outer edge of each magnet; wherein each connector assembly comprises an outer radial element from which extends a first connector spaced apart from a second connector, wherein the first and second connectors are parallel to one another. In yet other embodiments, the rotor assembly may include a rotor core having a rotor hub with a plurality of radially extending, spaced apart, wedge shaped fingers forming a magnet pocket between adjacent fingers, wherein each finger has two finger side edges extending from a proximal finger end adjacent the rotor hub to a distal finger end at a periphery of the rotor core; and a magnet positioned in each magnet pocket of the rotor core, wherein each magnet has a radial outer edge of a first width and a radial inner edge of a second width, which radial edges are joined by magnet side edges, where the first width is less than the second width so that the magnet is trapezoidal in shape. In yet other embodiments, the rotor assembly may include a rotor core having a rotor hub with a plurality of radially extending, spaced apart fingers forming a magnet pocket between adjacent fingers, wherein each finger has two finger side edges extending from a proximal finger end adjacent the rotor hub to a distal finger end at a periphery of the rotor core; a magnet positioned in each magnet pocket of the rotor core, wherein each magnet has a radial outer edge and a radial inner edge, which radial edges are joined by magnet side edges; and a cooling channel formed along at least one finger between adjacent magnets. In yet other embodiments, the axial flux motor may include at least one stator assembly disposed along an primary axis; a rotor assembly disposed along the primary axis and spaced apart from the at least one stator assembly; and a cooling mechanism on which the at least one stator assembly is supported, wherein the cooling mechanism comprises a plate having an exterior surface and an interior surface, wherein the stator assembly is attached to the interior surface, and wherein a plurality of fluidically connected cooling channels are formed in the exterior surface. In yet other embodiments, the axial flux motor may include at least one stator assembly disposed along an primary axis; a rotor assembly disposed along the primary axis and spaced apart from the at least one stator assembly; and a cooling mechanism on which the at least one stator assembly is supported, wherein the cooling mechanism comprises a plate having an exterior surface and an interior surface, wherein the stator assembly is attached to the interior surface by fasteners that extend from the stator assembly and engage the interior surface of the plate but are spaced apart from the exterior surface of the plate.

For any of the foregoing embodiments, the rotor assembly may include any one of the following elements, alone or in combination with each other:

- The rotor core has a rotor core perimeter and comprises a hub with a plurality of fingers radially extending from the hub, each finger having a proximal end adjacent the hub and a distal end adjacent the rotor core perimeter, the plurality of fingers spaced circumferentially around the hub so as to be spaced apart from one another so as to form a magnetic pocket between adjacent fingers.
- A plurality of the material layers each have a set of primary fibers extending in a select direction.
- The cooling mechanism comprises a plate having an exterior surface and an interior surface, wherein a plurality of fluidically connected cooling channels are formed in the exterior surface.
- The set of primary fibers comprise glass fibers.
- The set of primary fibers comprise carbon fibers.
- The rotor core is spider shaped.

The magnet side edge is spaced apart from the finger side edge on each side of the magnet.

The magnet radial inner edge is spaced apart from the rotor hub.

The fasteners attaching the stator assembly extend only partially into the plate.

The plate wherein the stator assembly is attached to the interior surface by fasteners that extend from the stator assembly and engage the interior surface of the plate but are spaced apart from the exterior surface of the plate.

Each connector assembly engages a magnet so that the parallel first and second connectors of the connector assembly extend into aligned magnet and finger grooves and wherein the radial outer element of the connector assembly abuts the radial outer edge of the magnet.

Each connector assembly overlays only a portion of adjacent fingers forming a magnet pocket.

A cooling channel formed along each finger between adjacent magnets.

The cooling channel is radially extending.

A retaining cover assembly having a first plate axially spaced apart from a second plate, wherein each plate is circular and includes an outer radial edge, an outer surface and an inner surface, and wherein at least one plate includes spaced apart seats formed on the inner surface of one of the plates, the spaced apart seats at least partially forming a cooling channel.

The rotor core is formed of a hub from which fingers radially extend, wherein said fingers are spaced apart from one another around the perimeter of the hub so as to form magnet pockets between adjacent fingers.

The rotor assembly further comprises a rotor ring disposed radially outward from the fingers.

At least ten fingers and at least ten magnet pockets.

A plurality of fingers are each rectangular in shape and a plurality of magnet pocket are each wedge shaped.

A plurality of fingers are each wedge shaped and a plurality of magnet pocket are rectangular in shape.

Each magnet has a radially outer edge of a first length and a radially inner edge of a second length that is less than the first length.

Each magnet has a radially outer edge of a first length and a radially inner edge of a second length that is greater than the first length.

Each magnet has a radially outer edge of a first length and a radially inner edge of a second length that is the same as the first length.

Each magnet has side edges that extend from the radially outer edge to the radially inner edge of the magnet.

A groove extending along at least a portion of the length of a side edge of a magnet between said magnets radially outer edge and radially inner edge.

The groove fully extends between the radially outer edge and the radially inner edge of said magnet.

The groove extends from the radially outer edge and is spaced apart from radially inner edge of said magnet. Said groove is spaced apart from the radially outer edge and extends from radially inner edge of said magnet.

The groove is spaced apart from both the radially outer edge and the radially inner edge of said magnet.

A groove extending along at least a portion of the length of a side edge of a finger between the proximal end and the distal end of said finger.

The groove fully extends between the proximal end and the distal end of said finger.

The groove extends from the distal end and is spaced apart from proximal end of said of said finger.

The groove is spaced apart from the distal end and extends from the proximal end of said finger.

The groove is spaced apart from both the distal end and the proximal end of said finger.

A groove along each side edge of a magnet.

A groove along each side edge of a finger.

The groove is rectangular or square in shape and said connector is a blade.

The groove is semicircular in shape and said connector is a round pin.

A spacer radially positioned between an outer radial edge of a magnet and an outer ring.

Each magnet has a separate spacer radially positioned between an outer radial edge of the magnet and an outer ring.

A plurality of spacers positioned between the outer radial edges of the magnets and an outer ring.

The spacer comprises a spacer body.

The spacer body is arcuate in shape.

The spacer further comprises a connector extending radially inward from said spacer body.

Spacer further comprises spaced apart connectors extending radially inward from said spacer body.

The spaced apart connectors are parallel.

The grooves of adjacent finger edges are parallel.

The grooves of radially extending edges of a magnet are parallel.

An integrally formed rotor ring and rotor core, wherein the integrally formed rotor ring and rotor core comprises a plurality of radially extending fingers spaced apart from one another around the perimeter of a hub and extending to a ring disposed around the core, wherein adjacent fingers form a magnet pocket therebetween.

Each material layer in the material layer stack is shaped to comprises a plurality of radially extending fingers spaced apart from one another around the perimeter of a hub and extending to a ring disposed around the core, wherein adjacent fingers form a magnet pocket therebetween.

A rotor ring disposed radially outward from fingers.

A rotor ring disposed radially outward from the spacers.

The rotor ring is integrally formed with the fingers.

The rotor ring is a continuous ring.

The rotor ring has a radially inner edge and a radially outer edge, where the radially inner edge is adjacent the distal end of the fingers.

The rotor ring is formed of a first material at the radially inner edge and a second material at the radially outer edge.

The first material is glass fiber and the second material is carbon fiber.

Each finger has a proximal width adjacent the proximal end of said finger and a distal width adjacent the distal end of each finger, and the distal width is greater than the proximal width.

Each magnet pocket narrows in a radially outward direction.

The inner radial edge of each magnet is longer than the outer radial edge of each magnet.

The inner radial edge of each magnet is adjacent the proximal end of a finger and the outer radial edge of each magnet is adjacent the distal end of a finger.

Each magnet pocket is reverse trapezoidal in shape and wherein each magnet is trapezoidal in shape and disposed to seat in a reverse trapezoidal shaped pocket.

Each fiber layer having a set of primary fibers extending in a select direction and wherein the sets of primary fibers of adjacent fiber layers extend in different directions.

A rotor core having a rotor hub with a plurality of radially extending, spaced apart fingers forming a magnet pocket between adjacent fingers; and a magnet positioned in each magnet pocket of the rotor core;

The rotor core comprises a plurality of fiber layers formed together in a fiber layer stack, with each fiber layer comprises a material having a set of primary fibers extending in a select direction and wherein the sets of primary fibers of adjacent fiber layers extend in different directions.

A rotor core having a rotor hub with a plurality of radially extending, spaced apart fingers forming a magnet pocket between adjacent fingers, wherein each finger has two finger side edges extending from a proximal finger end adjacent the rotor hub to a distal finger end at a periphery of the rotor core;

A magnet positioned in each magnet pocket of the rotor core, wherein each magnet has a radial outer edge and a radial inner edge which radial edges are joined by magnet side edges;

A plurality of layers of material arranged into a layer stack, with each layer having a set of primary fibers extending in a select direction that is a different direction from the set of primary fiber layers of an adjacent layer in the layer stack.

Each magnet side edge is spaced apart from each finger side edge to form a gap between each magnet side edge and an finger side edge.

A connector, wherein at least one of the side edges of a magnet or a finer includes a groove formed therein along at least a portion of the length of the side edge; and wherein the connector is inserted into the groove to secure a magnet within a magnet pocket.

A rotor ring extending around a periphery of the rotor core.

A spacer positioned radially outward of each magnet between the magnet and the rotor ring.

A radially extending cooling channel formed along at least one finger between adjacent magnets.

The radial outer edge of each magnet has a first width, and the radial inner edge of each magnet has a second width, where the first width is less than the second width so that each magnet is trapezoidal in shape; and wherein each radially extending, spaced apart fingers forming a magnet pocket is wedge shaped so as to form a corresponding trapezoidal shaped magnet pocket for receipt of a trapezoidal shaped magnet.

The finger side edges of adjacent fingers forming a magnet pocket are parallel with one another; and the magnet side edges of each magnet are parallel to one another.

Each finger side edge has a finger groove formed therein along at least a portion of the length of the finger side edge; and wherein each side edge has a magnet groove formed therein along at least a portion of the length of the magnet side edge, wherein at least one finger groove of the fingers aligns with at least one magnet groove of the magnets.

A cooling channel formed along each finger between adjacent magnets.

Each magnet has a magnet thickness and each finger has a finger thickness, wherein the magnet thickness is greater than the finger thickness.

A plurality of spaced apart seats, wherein the seats are wedge-shaped and positioned around an aperture formed in the plate on which the seats are formed so that the cooling channels extend radially out from a center of the plate.

The rotor core abuts the plate so that the rotor hub engages the seats and each magnet abuts the inner surface of the plate.

Each plate further comprises an outer radial lip on the inner surface.

Thus, a method for manufacturing a rotor for an axial flux motor has been described. The method generally includes arranging a plurality of fiber layers into a fiber layer stack, with each fiber layer having a set of primary fibers extending in a select direction that is a different direction from the set of primary fiber layers of an adjacent fiber layer in the fiber layer stack; inserting a pre-formed rotor ring into a mold; inserting a plurality of magnets into the mold within the rotor ring; inserting the fiber layer stack into the mold; activating the mold to express bonding material from the fiber layer stack and to bond the rotor ring and magnets to the fiber layer stack. In another embodiment, the method may generally include arranging a plurality of layers of material into a layer stack, with each layer having a set of primary fibers extending in a select direction that is a different direction from the set of primary fiber layers of an adjacent layer in the layer stack; inserting a pre-formed rotor ring into a mold; inserting a plurality of magnets into the mold within the rotor ring; inserting the fiber layer stack into the mold; and activating the mold to express bonding material from the layer stack to bond the rotor ring and magnets to the layer stack. It yet another embodiment, the method may include cutting a plurality of layers from a material having a primary set of fibers aligned in a first direction; and arranging the layers into a layer stack, with each layer having its primary set of fibers extending in a select direction that is a different direction from an adjacent layer in the layer stack.

For any of the foregoing embodiments, the method may include any one of the following, alone or in combination with each other:

Applying heat and pressure to the layer stack to express bonding material from the stack to bond the layers to one another.

Inserting a pre-formed rotor ring into a mold; inserting a plurality of magnets into the mold within the rotor ring; inserting the layer stack into the mold; and activating the mold to express bonding material from the layer stack to bond the rotor ring and magnets to the layer stack.

Preheating the rotor ring before inserting it into the mold.

Preheating the magnets before inserting them into the mold.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed is:

1. A rotor assembly for an axial flux motor comprising:
a rotor core formed about a rotor axis and having a rotor hub with a plurality of spaced apart fingers radially extending from the rotor hub and forming a magnet pocket between adjacent fingers, wherein each finger has two finger side edges radially extending from a proximal finger end adjacent the rotor hub to a distal finger end at a periphery of the rotor core;
a magnet positioned in each magnet pocket of the rotor core, wherein each magnet has a radial outer edge and a radial inner edge which radial edges are joined by radially extending magnet side edges; and
an offset connector disposed between each finger side edge and adjacent magnet side edge;
wherein the rotor core comprises a plurality of layers of material arranged adjacent one another into a layer stack extending along the rotor axis, with each layer having a set of primary fibers extending in a select direction that is a different direction from the set of primary fiber layers of an adjacent layer in the layer stack;
wherein at least one finger side edge has a radially extending finger groove formed therein along at least a portion of the length of the at least one finger side edge;
wherein at least one magnet side edge has a magnet groove formed therein along at least a portion of the length of the at least one magnet side edge; and
wherein the at least one finger groove of the finger is in parallel alignment in the same plane with the at least one magnet groove of the magnet with an offset connector seated in the at least one finger groove of the finger and the at least one magnet groove of the magnet that are in parallel alignment with one another so as to maintain each finger side edge and adjacent magnet side edge in an offset, spaced apart relationship to one another.

2. The rotor assembly of claim 1, further comprising:
a connector; and
wherein the connector is inserted into the aligned finger and magnet grooves to secure a magnet within a magnet pocket so that the magnet side edges are spaced apart from the finger side edges of the pocket in which the magnet is inserted.

3. The rotor assembly of claim 1, further comprising a radially extending cooling channel formed along at least one finger between adjacent magnets.

4. The rotor assembly of claim 1, wherein the radial outer edge of each magnet has a first width, and the radial inner edge of each magnet has a second width, where the first width is less than the second width so that each magnet is trapezoidal in shape; and wherein each radially extending, spaced apart fingers forming a magnet pocket is wedge shaped so as to form a corresponding trapezoidal shaped magnet pocket for receipt of a trapezoidal shaped magnet.

5. The rotor assembly of claim 1, wherein the finger side edges of adjacent fingers forming a magnet pocket are parallel with one another; and the magnet side edges of each magnet are parallel to one another.

6. A rotor assembly for an axial flux motor comprising:
a rotor core formed about a rotor axis and having a rotor hub with a plurality of spaced apart fingers radially extending from the rotor hub and forming a magnet pocket between adjacent fingers, wherein each finger has two finger side edges extending from a proximal finger end adjacent the rotor hub to a distal finger end at a periphery of the rotor core; and
a magnet positioned in each magnet pocket of the rotor core, wherein each magnet has a radial outer edge and a radial inner edge which radial edges are joined by magnet side edges;
wherein the rotor core comprises a plurality of layers of material arranged adjacent one another into a layer stack extending along the rotor axis, with each layer having a set of primary fibers extending in a select direction that is a different direction from the set of primary fiber layers of an adjacent layer in the layer stack;
wherein each magnet side edge of a magnet disposed in a magnet pocket is in parallel alignment in a same plane but spaced apart from each adjacent finger side edge of the fingers forming the magnet pocket along the length of the respective side edges thereby forming, in said same plane as the side edges, a gap between each magnet side edge and each adjacent finger side edge within the magnet pocket along the length of the respective side edges so that each finger side edge and adjacent magnet side edge are in an offset, spaced apart relationship to one another.

7. A rotor assembly for an axial flux motor comprising:
a rotor core having a rotor hub disposed about a rotor axis, and a plurality of spaced apart fingers radially extending from the hub to form a magnet pocket between adjacent fingers, wherein each finger has two finger side edges extending from a proximal finger end adjacent the rotor hub to a distal finger end at a periphery of the rotor core; and
a magnet positioned in each magnet pocket of the rotor core, wherein each magnet has a radial outer edge and a radial inner edge, which radial edges are joined by magnet side edges; and
a retaining cover assembly having a first plate axially spaced apart from a second plate,
wherein each plate is circular and includes an outer radial edge, an outer surface and an inner surface, wherein the rotor core is positioned between the plates adjacent the respective inner surfaces, and wherein at least one plate includes a plurality of spaced apart seats formed on the inner surface of the at least one plate, the plurality of spaced apart seats at least partially forming cooling channels between the plurality of spaced apart seats.

8. The rotor assembly of claim 7, wherein each cooling channel is formed between adjacent magnets and is radially extending and adjacent to one of the plurality of spaced apart fingers.

9. The rotor assembly of claim 7, where each magnet has a magnet thickness and each finger has a finger thickness, wherein the magnet thickness is greater than the finger thickness.

10. The rotor assembly of claim 7, further comprising a plurality of spaced apart seats, wherein the seats are wedge-shaped and positioned around an aperture formed in the plate on which the seats are formed so that the cooling channels extend radially out from a center of the plate.

11. The rotor assembly of claim 10, wherein the rotor core is positioned between the first and second plates so that the rotor hub engages the seats and each magnet abuts the inner surface of the plates.

12. The rotor assembly of claim 7, wherein each plate further comprises an outer radial lip formed adjacent the outer radial edge.

13. A rotor assembly for an axial flux motor comprising:
a rotor core formed about a rotor axis and having a rotor hub with a plurality of spaced apart fingers radially extending from the rotor hub and forming a magnet pocket between adjacent fingers, wherein each finger has two finger side edges radially extending from a proximal finger end adjacent the rotor hub to a distal finger end at a periphery of the rotor core;

a magnet positioned in each magnet pocket of the rotor core, wherein each magnet has a radial outer edge and a radial inner edge which radial edges are joined by radially extending magnet side edges; and hardened bonding material disposed between each finger side edge and adjacent magnet side edge;

wherein the rotor core comprises at least five layers of composite material arranged face-to-face so as to form a layer stack extending along the rotor axis;

wherein at least one finger side edge is smooth along at least a portion of the length of the at least one finger side edge;

wherein at least one magnet side edge has a radially extending magnet groove formed therein along at least a portion of the length of the at least one magnet side edge with hardened bonding material disposed in each magnet groove of each magnet side edge; and wherein the at least one smooth finger side edge of a finger is in parallel alignment in the same plane with the at least one magnet groove of the magnet, with the hardened bonding material disposed in the at least one magnet groove of the magnet so as to maintain each finger side edge and adjacent magnet side edge in an offset, spaced apart relationship to one another.

14. The rotor assembly of claim 13, wherein each finger side edge is smooth along at least a portion of the length of the finger side edge.

15. The rotor assembly of claim 14, wherein each magnet side edge has a groove formed therein along at least a portion of the length of the magnet side edge.

* * * * *